United States Patent [19]
Frank et al.

[11] Patent Number: 5,341,483
[45] Date of Patent: Aug. 23, 1994

[54] DYNAMIC HIERARCHIAL ASSOCIATIVE MEMORY

[75] Inventors: Steven J. Frank, Hopkinton, Mass.; Paul A. Binder, Hollis, N.H.

[73] Assignee: Kendall Square Research Corporation, Waltham, Mass.

[21] Appl. No.: 531,506

[22] Filed: May 31, 1990

Related U.S. Application Data

[63] Continuation-in-part of Ser. No. 136,930, Dec. 22, 1987, Pat. No. 5,055,999, Ser. No. 509,480, Apr. 13, 1990, abandoned, Ser. No. 370,325, Jun. 22, 1989, abandoned, Ser. No. 370,341, Jun. 22, 1989, Pat. No. 5,297,265, Ser. No. 370,287, Jun. 22, 1989, Pat. No. 5,251,308, Ser. No. 499,182, Mar. 26, 1990, and Ser. No. 521,798, May 10, 1990, Pat. No. 5,282,201, said Ser. No. 509,480, is a continuation of Ser. No. 136,701, Dec. 22, 1987, abandoned, said Ser. No. 370,325, is a continuation-in-part of Ser. No. 136,930, Dec. 22, 1987, said Ser. No. 370,341, is a continuation of Ser. No. 136,930, Dec. 22, 1987, said Ser. No. 370,287, is a continuation-in-part of Ser. No. 136,930, Dec. 22, 1987, said Ser. No. 499,182, is a continuation-in-part of Ser. No. 136,930, Dec. 22, 1987.

[51] Int. Cl.⁵ ............................................. G06F 12/00
[52] U.S. Cl. ..................................... 395/400; 364/243; 364/243.1; 364/246; 364/215
[58] Field of Search ..................................... 395/400, 425

[56] References Cited

U.S. PATENT DOCUMENTS

| Re. 28,811 | 5/1976 | Pierce | 179/15 |
|---|---|---|---|
| 3,713,096 | 1/1973 | Comfort et al. | 340/172 |
| 3,723,976 | 3/1973 | Alvarez et al. | 395/425 |
| 3,731,002 | 5/1973 | Pierce | 370/85 |
| 3,735,362 | 5/1973 | Ashany et al. | 340/172 |
| 3,748,647 | 7/1973 | Ashany et al. | 340/172 |
| 3,800,291 | 3/1974 | Cocke et al. | 340/172.5 |
| 4,011,545 | 3/1977 | Nadir | 340/172 |
| 4,031,512 | 6/1977 | Faber | 340/147 |
| 4,077,059 | 2/1978 | Cordi et al. | 364/200 |
| 4,141,067 | 2/1979 | McLagan | 364/200 |
| 4,240,143 | 12/1980 | Besemer et al. | 364/200 |
| 4,245,306 | 1/1981 | Besemer et al. | 364/200 |
| 4,293,910 | 10/1981 | Flusche et al. | 364/200 |
| 4,322,795 | 3/1982 | Lange et al. | 364/200 |
| 4,334,305 | 6/1982 | Girardi | 370/86 |
| 4,358,823 | 11/1982 | McDonald | 364/200 |
| 4,394,731 | 6/1983 | Flusche et al. | 364/200 |
| 4,410,944 | 10/1983 | Kronies | 364/200 |
| 4,410,946 | 10/1983 | Spencer | 364/200 |

(List continued on next page.)

FOREIGN PATENT DOCUMENTS

0014926 2/1980 European Pat. Off.

(List continued on next page.)

OTHER PUBLICATIONS

Proc. of the 6th Annual Phoenix Conf. on Computer and Communications, Feb. 25–27, 1987, pp. 14–17.

(List continued on next page.)

Primary Examiner—Rebecca L. Rudolph
Attorney, Agent, or Firm—Lahive & Cockfield

[57] ABSTRACT

An associative memory having an associativity of $2^q$, where (q) is an integer greater than or equal to one, is provided for storing information relating to data. The memory includes (n) tables, each having a plurality of entries for storing signals associated with data descriptors having a common set portion and common other portions. The entries of table (k), where (k) represents successive integers between (1) and (n−1), store pointers to respective entries of table (k+1). The entries of table (1) are arranged for access as a function of the common set portion and the common portion (1) with which they are respectively associated. The entries of the other tables are arranged for access as a function of (i) a value of the common set portion, (ii) a value of a pointer-respresentative signal of the respective table (m−1) entry means, and (iii) the value of the common portion(m) with which such table(m) entry means is respectively associated. The entries of table(n) store information relating to one or more data having a common portion(n).

48 Claims, 28 Drawing Sheets

U.S. PATENT DOCUMENTS

| | | | |
|---|---|---|---|
| 4,468,733 | 8/1984 | Oka et al. | 364/200 |
| 4,476,524 | 10/1984 | Brown et al. | 364/200 |
| 4,484,262 | 11/1984 | Sullivan et al. | 364/200 |
| 4,488,256 | 12/1984 | Zolnowsky et al. | 364/900 |
| 4,503,497 | 3/1985 | Krygowski et al. | 364/200 |
| 4,510,492 | 4/1985 | Mori et al. | 370/85 |
| 4,598,400 | 7/1986 | Hillis | 370/60 |
| 4,604,694 | 8/1986 | Hough | 364/200 |
| 4,622,631 | 11/1986 | Frank et al. | 364/200 |
| 4,625,081 | 11/1986 | Lotito et al. | 379/88 |
| 4,646,271 | 2/1987 | Uchiyama et al. | 365/49 |
| 4,700,347 | 10/1987 | Rettberg et al. | 371/1 |
| 4,701,756 | 10/1987 | Burr | 370/60 |
| 4,706,080 | 11/1987 | Sincoskie | 370/94 |
| 4,730,249 | 5/1988 | O'Quinn II et al. | 364/200 |
| 4,734,907 | 3/1988 | Turner | 370/60 |
| 4,754,394 | 6/1988 | Brantley, Jr. et al. | 364/200 |
| 4,758,946 | 7/1988 | Shar et al. | 395/425 |
| 4,768,144 | 8/1988 | Winter et al. | 364/200 |
| 4,780,873 | 10/1988 | Mattheyses | 395/200 |
| 4,792,895 | 12/1988 | Tallman | 395/375 |
| 4,797,880 | 1/1989 | Bussey, Jr. et al. | 370/60 |
| 4,811,009 | 3/1989 | Orimo et al. | 370/85 |
| 4,811,203 | 3/1989 | Hamstra | 395/425 |
| 4,814,970 | 3/1989 | Barbagelata et al. | 364/200 |
| 4,829,227 | 5/1989 | Turner | 370/60 |
| 4,845,702 | 7/1989 | Melindo | 370/1 |
| 4,864,495 | 9/1989 | Inaba | 364/200 |
| 4,885,742 | 12/1989 | Yano | 370/94 |
| 4,888,726 | 12/1989 | Struger et al. | 364/900 |
| 4,928,224 | 5/1990 | Zulian | 364/200 |
| 4,930,106 | 5/1990 | Danilenko et al. | 364/200 |
| 4,951,193 | 8/1990 | Muramatsu et al. | 364/200 |
| 4,972,338 | 11/1990 | Crawford et al. | 395/400 |
| 4,980,816 | 12/1990 | Fukuzawa et al. | 395/400 |
| 5,025,365 | 6/1991 | Mathur et al. | 364/200 |
| 5,055,999 | 10/1991 | Frank et al. | 395/425 |
| 5,060,186 | 10/1991 | Barbagelata et al. | 364/200 |
| 5,067,071 | 11/1991 | Schanin et al. | 395/275 |
| 5,101,402 | 3/1992 | Chiu et al. | 370/17 |
| 5,101,485 | 3/1992 | Perazzoli, Jr. | 395/400 |
| 5,119,481 | 6/1992 | Frank et al. | 395/425 |
| 5,136,717 | 8/1992 | Morley et al. | 395/800 |
| 5,212,773 | 5/1993 | Hillis | 395/200 |
| 5,226,039 | 7/1993 | Frank et al. | 370/60 |
| 5,226,109 | 7/1993 | Dawson et al. | 395/120 |
| 5,226,175 | 7/1993 | Deutsch et al. | 395/119 |

FOREIGN PATENT DOCUMENTS

| | | |
|---|---|---|
| 0095033 | 11/1983 | European Pat. Off. . |
| 0214718 | 3/1987 | European Pat. Off. . |
| 0233993 | 9/1987 | European Pat. Off. . |
| 0262750 | 4/1988 | European Pat. Off. . |
| 0332818 | 1/1989 | European Pat. Off. . |
| 0322117 | 6/1989 | European Pat. Off. . |
| 59-103166 | 6/1984 | Japan . |
| 8808652A | 11/1988 | PCT Int'l Appl. . |
| 8909446 | 10/1989 | PCT Int'l Appl. . |
| 9000283 | 1/1990 | PCT Int'l Appl. . |
| 2065941 | 7/1981 | United Kingdom . |
| 2178205 | 2/1987 | United Kingdom . |
| 2176918 | 7/1987 | United Kingdom . |

OTHER PUBLICATIONS

*MCS–80/85 Family User's Manual* (Oct. 1979), Intel.

Titus, 8080/8085 Software Design.

Lovett et al., Proceedings 1988 Int'l. Conf. on Parrell Proc., vol. 1, Penn State Univ. Press (Conf. Aug. 15–19, 1988) et seq.

Kai Li et al., Proceedings 1989 Int'l. Conf. on Parallel Processing, Penn State Univ. Press (Conf. Aug. 8–12, 1989) pp. I–125 et seq.

Papamarcos et al., Proc. of 11th Annual Symposium on Computer Architecture (Conf. Jun. 5–7, 1984) pp. 348 et seq (IEEE).

"High Performance/High Availability Interprocessor Communication Method," IBM Technical Disclosure Bulletin, vol. 31, No. 2, Jul., 1988 pp. 41–42.

Schwartz, Telecommunications Network, "Introduction & Overview" pp. 1–20, Layered Architectures in Data Networks pp. 71–117.

Haridi et al, "The Cache Coherence Protocol of the Data Diffusion Machine" Parallel Architectures Proceedings, vol. I, pp. 1–18 (1989).

Warren et al, "Data Diffusion Machine–A Scalable . . . ", Proceedings of the International Conference on Fifth . . . , 1988, pp. 943–952.

Hagersten, "Some Issues on Cache-Only Memory Architecture," Scalable Shared–Memory Multiprocessors, May, 1990, p. 12.

Hagersten et al, "The Data Diffusion Machine and its Data Coherency Protocols", Proceedings of the IFIP, pp. 127–148 (1990).

(List continued on next page.)

OTHER PUBLICATIONS

Ciepielewsik et al., "A Formal Model for Or-Parallel . . .", Proc. of the IFIP 9th World Computer Confress (1983) pp. 299–305.

Censier et al., "A New Solution to Coherence . . .", IEEE Transaction on Computers, vol. c–27, No. 12 (Dec. 1978) pp. 1112–1118.

Eggers et al., "Evaluating the Performance of Four . . .", Proc. of the 16th Annual Int'l Symposium on Computer Archit. (1989) pp. 2–15.

Gehringer et al., "The Cm* Hardware Architecture", Parallel Proc. the Cm* Experience, Digital Press, pp. 11–28, 432, 438.

Goodman et al., "The Wisconsin Multicube: A New . . .", Proc. of the 15th Annual Int'l Symposium on Computer Archit. (1988) pp. 422–431.

Mizrahi et al., "Introducing Memory into the Switch . . .", Proc. of the 16th Annual Int'l Symposium on Computer Archit. (1989) pp. 158–166.

Pfister et al., "The IBM Research Parallel Processor . . .", IEEE Proc. of the 1985 Int'l Conf. on Parallel Proc. (1985) pp. 764–771.

Tabak, "Chapter 8 Bus-Oriented Systems", Multiprocessors, Prentice Hall (1990) pp. 92–102.

Wilson, Sr. Editor, "Increased CPU Speed Drives Changes in Multiprocessor Cache and Bus Designs", Computer Design, (Jun. 1987) p. 20.

Ali et al., "Global Garbage Collection for Distributed . . .", Int'l Jo. of Parallel Programming, vol. 15, No. 5 (1986) pp. 339–387.

| Ring:1 Pending State | Ring:0 Subpage State | | | |
|---|---|---|---|---|
| | Invalid | ReadOnly | Nonexclusive | Exclusive |
| PlNone | InvPlNone | RoPlNone | NexPlNone | ExPlNone |
| PlWait | InvPlWait | RoPlWait | NexPlWait | ExPlWait |
| PlReissue | InvPlRei | RoPlRei | NexPlRei | ExPlRei |
| PlReissueMrgRo | — | RoPlReiMrgRo | NexPlReiMrgRo | ExPlReiMrgRo |
| PlReissueMrgEx | — | — | NexPlReiMrgEx | ExPlReiMrgEx |
| PlReissueMrgAt | — | — | NexPlReiMrgAt | ExPlReiMrgAt |
| PlReadOnly | — | RoPlRo | NexPlRo | ExPlRo |
| PlReadOnlyMrgRo | — | RoPlRoMrgRo | NexPlRoMrgRo | ExPlRoMrgRo |
| PlExclusive | — | — | NexPlEx | ExPlEx |
| PlExclusiveMrg | — | — | NexPlExMrg | ExPlExMrg |
| PlAtomic | — | — | NexPlAt | ExPlAt |
| PlAtomicMrg | — | — | NexPlAtMrg | ExPlAtMrg |
| PlRecombine | — | — | — | — |
| PlMrsp | — | RoPlMrsp | NexPlMrsp | ExPlMrsp |
| PlMrspMrgRo | — | RoPlMrspMrgRo | NexPlMrspMrgRo | ExPlMrspMrgRo |
| PlMrspMrgEx | — | — | NexPlMrspMrgEx | ExPlMrspMrgEx |
| PlMrspMrgAt | — | — | NexPlMrspMrgAt | ExPlMrspMrgAt |
| PlInvalidate | — | RoPlInv | | |
| PlInvalidateMrg | — | RoPlInvMrg | — | — |

FIG. 17

| Ring:O Pending State | Ring:O Subpage State | | | |
|---|---|---|---|---|
| | Invalid | ReadOnly | Nonexclusive | Exclusive |
| PONone | InvPONone | RoPONone | NexPONone | ExPONone |
| POWait | InvPOWait | RoPOWait | NexPOWait | ExPOWait |
| POReissue | InvPORei | RoPORei | NexPORei | ExPORei |
| POReissueMrgRo | InvPOReiMrgRo | — | | — |
| POReissueMrgEx | InvPOReiMrgEx | RoPOReiMrgEx | — | — |
| POReissueMrgAt | InvPOReiMrgAt | RoPOReiMrgAt | — | — |
| POReadOnly | InvPORo | — | — | — |
| ROReadOnlyMrgRo | InvPORoMrgRo | | — | — |
| POExclusive | InvPOEx | RoPOEx | — | — |
| POExclusiveMrg | InvPOExMrg | RoPOExMrg | — | — |
| POAtomic | InvPOAt | RoPOAt | — | — |
| POAtomicMrg | InvPOAtMrg | RoPOAtMrg | — | — |
| PORecombine | InvPORec | | — | — |
| POMrsp | — | | — | — |
| POMrspMrgRo | — | | — | — |
| POMrspMrgEx | — | | — | — |
| POMrspMrgAt | — | | — | — |
| POInvalidate | — | | NexPOInv | — |
| POInvalidateMrg | — | | — | — |

FIG. 18

DYNAMIC HIERARCHIAL ASSOCIATIVE MEMORY

REFERENCE TO RELATED APPLICATIONS

This application is a continuation in part of the following co-pending and commonly assigned applications:

1) U.S. patent application Ser. No. 136,930 filed Dec. 22, 1987, now U.S. Pat. No. 5,055,999 issued Oct. 8, 1991 for "MULTIPROCESSOR DIGITAL DATA PROCESSING SYSTEM;"
2) U.S. patent application Ser. No. 509,480 filed Apr. 13, 1990, now abandoned for "INTERCONNECTION SYSTEM FOR MULTIPROCESSOR STRUCTURE, a continuation of U.S. patent application Ser. No. 136,701, filed Dec. 22, 1987 now abandoned;
3) U.S. patent application Ser. No. 370,325 filed Jun. 22, 1989, now abandoned, for "MULTIPROCESSOR SYSTEM WITH MULTIPLE INSTRUCTION SOURCES," a continuation-in-part of U.S. patent application Ser. No. 136,930, filed Dec. 22, 1987;
4) U.S. patent application Ser. No. 370,341 filed Jun. 22, 1989, now U.S. Pat. No. 5,297,265 issued Mar. 22, 1994 for "IMPROVED MEMORY SYSTEM FOR A MULTIPROCESSOR, a continuation of U.S. patent application Ser. No. 136,930, filed Dec. 22, 1987;
5) U.S. patent application Ser. No. 370,287 filed Jun. 22, 1989, now U.S. Pat. No. 5,251,308, issued Oct. 5, 1993 for "IMPROVED MULTIPROCESSOR SYSTEM," a continuation-in-part of U.S. patent application Ser. No. 136,930, filed Dec. 22, 1987; and
6) U.S. patent application Ser. No. 499,182 filed Mar. 26, 1990, for "HIGH-SPEED PACKET SWITCHING APPARATUS AND METHOD," a continuation-in-part of U.S. patent application Ser. No. 136,930, filed Dec. 22, 1987.

This application is also a continuation in part of U.S. patent application Ser. No. 521,798, filed May 10, 1990, now U.S. Pat No. 5,282,201, issued Jun. 25, 1994, for "DYNAMIC PACKET ROUTING NETWORK" and is related to U.S. patent application Ser. No. 526,396 filed May 18, 1990, now U.S. Pat. No. 5,226,039, issued Jul. 6, 1993 for "PACKET ROUTING SWITCH."

The teachings of the above-cited patent applications are incorporated herein by reference.

BACKGROUND OF THE INVENTION

This invention relates to digital data communications networks and more particularly to packet switched networks for use, for example, with high-speed distributed multiprocessing systems.

Multiple instruction/multiple data (MIMD) parallel processing computers can be categorized according to address space, memory organization and memory hierarchy. With respect to the former, a system may be characterized as utilizing a single or a multiple address space. A single address space is commonly referred to as shared memory and implies implicit communication as part of any memory access. A multiple private address spaces implies explicit communication by, for example, message passing.

Memory organization may be characterized as centralized or distributed. In a system based on centralized memory, a common memory element is centrally located, with access time to any physical memory location being the same for all processors. In a distributed memory system, on the other hand, system memory is divided into modules with some placed near each processor.

Memory hierarchy may be characterized as static, mixed or dynamic. A hierarchy is classified as static where system data is divided among local and/or global memory units, with each datum having an explicitly assigned address based at least in part on the locale of the unit in which it is stored. In a fully dynamic system, on the other hand, individual datum are not assigned physical memory location-based addresses by which they are accessed. Mixed memory hierarchies contain static local and/or global memory, where a portion of the memory hierarchy is dynamic (e.g., a cache memory) and another portion is static.

The art provides a number of architectures where a single address space, i.e., shared memory, is organized in a centralized manner. Processing units in such systems communicate via high-bandwidth shared buses or switching networks. A problem with such architectures is that the shared memory forms a bottleneck, impeding system performance, except in instances where there are relatively few processors.

To avoid this problem, Frank et al, U.S. Pat. No. 4,622,631, discloses a multiprocessing system in which a plurality of processors, each having an associated private memory, or cache, share data contained in a main memory element. Data within that common memory is partitioned into blocks, each of which can be owned by any one of the main memory and the plural processors. The current owner of a data block is said to have the correct data for that block.

While the solution suggested in the aforementioned patent permits an increase in the number of processors which can be supported without a bottleneck, the centralized memory system is not scalable.

In order to achieve scalability, a distributed memory organization must be used since it theoretically allows parallel high bandwidth access to memory to grow in proportion to the number of processor and memory modules. The art provides two alternative programming models for such an organization: the multiple address space model and the single address space module. Both models present a dilemma for computer system designers and programmers.

From the programmers viewpoint, the single address architecture is a simpler programming model since data movement is implicit in memory operations. Whereas, in the multiple address architecture explicit message passing is required for a multiple address architecture. The multiple address architecture, moreover, requires explicit data localization, explicit memory allocation and deallocation, explicit replication and explicit coherency to produce a correct parallel program. These aspects are theoretically handled implicitly in a single address architecture.

As discovered by designers in the prior art, from a hardware perspective simultaneous access to a single address space, i.e., a logically shared memory, is prohibitively expensive. This is due to the complexity of the switching network, as well as the lack and potential complexity of a general high performance solution for memory coherency. In consequence, most scalable distributed memory systems such as Intel/IPSC have historically implemented a multiple address architecture.

The performance of a single address architecture is dependent on the memory hierarchy. A static memory hierarchy requires the programmer to explicitly manage the movement of data for optimal performance in a manner similar to the multiple address architecture. Two examples of a distributed memory organization which implement a single address architecture using a static memory hierarchy are the BBN Butterfly and IBM RP3. Such implementations require the programmer to explicitly manage coherency.

Mixed hierarchies necessarily include communication bottlenecks which limit scalability, while still requiring the programmer to partially manage data movement. One such hierarchical approach is disclosed by Wilson Jr. et al, United Kingdom Patent Application No. 2,178,205, wherein a multiprocessing system is said to include distributed cache memory elements coupled with one another over a first bus. A second, higher level cache memory, attached to the first bus and to either a still higher level cache or to the main system memory, retains copies of every memory location in the caches, if any, and system main memory, in turn, retain copies of each memory location of cache below them. The Wilson Jr. et al processors are understood to transmit modified copies of data from their own dedicated caches to associated higher level caches and to the system main memory, while concurrently signalling other caches to invalidate their own copies of that newly-modified data.

Notwithstanding solutions proposed by the prior art, none has achieved a high performance, fully dynamic, coherent shared memory programming environment with unlimited scalability.

An object of this invention is to provide such a system. More particularly an object of the invention is to provide a multiple instruction/multiple data parallel processing system utilizing a shared memory addressing model and a distributed organization with improved coherency.

A further object is to provide a fully dynamic memory hierarchy achieving high performance within a distributed system utilizing a shared memory address model.

A still further object is to provide an improved digital data communications network.

Yet another object is to provide a packet switch network for use, for example, in high-speed distributed multiprocessing systems.

Still another object is to provide an improved switching mechanism for use in routing data and data requests through a digital communications network.

SUMMARY

These and other objects are attained by the invention which provides an improved digital data communications network, packet switch and associative directory for use, for example, with a multiprocessing computer system.

In one aspect, the system includes two groups of processing cells and a routing cell that transfers digital information packets between those groups based upon the identity of data referenced in the packets and data requested by or allocated to a first one of those processing groups, or routed between both groups.

Each processing group has a plurality of processing cells, e.g., central processing units and associated local cache memories, that communicate by transferring data and request packets over an associated group bus. The individual cells have allocated to them data or data copies identifiable by unique descriptors. Cache control units in the processing cells generate packets requesting data, as well as those providing data or data copies in response to such requests. Each packet includes a descriptor corresponding to the requested or supplied data.

The routing element includes first input and output sections connected with the bus of the first processing group, along with second input and output sections connected to the bus of the second processing group, for receiving and transmitting packets to the cells of those groups. Request and response packets received at the first and second inputs are routed to one or both of the outputs according to whether the data identified by the descriptors in those packets are allocated to cells of the first processing group.

To facilitate determining where to route packets received by the routing cell, an associative memory-based directory stores a list of descriptors corresponding to data allocated to cells of the first processing group. The directory additionally stores a list of descriptors of data requested by those cells and routed to the second processing group for handling, as well as a list of descriptors of data requested by cells in the second group and routed to the first for handling. Along with these descriptors, the directory maintains information about the access state of the data. This includes, for example, invalid, read-only, non-exclusive ownership, exclusive ownership, and atomic states, in addition to pending states.

According to related aspect of the invention, the aforementioned second processing group itself includes a plurality of further processing groups, themselves interconnected via routing cells and network buses and each comprising a plurality of processing cells interconnected by intra-group buses. By way of example, in a two-level system, each of further groups is associated with a routing cell that selectively transfers information packets to and from the individual group buses. A higher-level bus, referred to below as a level:1 bus, connects these further routing cells with the routing cell associated with the first processing group.

In another related aspect, the invention provides a hierarchical digital data communications network having a plurality of packet transfer levels, each including a plurality of transfer segments made up of interconnected processing cells. The cells have allocated to them data, or data copies, each identifiable by a unique descriptor. The cells also include cache control units that can generate request and response packets referencing data by their respective descriptors. The number of transfer segments decreases at each higher transfer level, there being only one segment at the highest level.

Within the network, routing cells provide communications between the processing cells at each level with those of the higher levels. The routing cells, which transfer information packets between the transfer level segments, selectively route request packets based upon the association of data requested in that packet and the cells of the descendant transfer segments. Particularly, these routing cells route to higher transfer segments those packets requesting data that is not associated with a descendant segment, while routing to lower segments those packets requesting data that is associated with a descendant segment.

According to another aspect of the invention, a request packet can include a requestor-ID field identifying the processing cell that generated the request. A cell generating a response to that request copies the requestor-ID into the response packet. The routing cells route such a response packet back to the requestor in accord with the value of the requestor-ID field.

In addition, the routing cells can route to one requesting processing cell a response packet that includes data requested in a previous, unrelated packet—that is, a request packet generated by another cell. Thus, for example, a response packet containing a read-only copy of a datum requested independently by two processing cells may be routed to both, notwithstanding that the requestor-ID of only one of them is included in the response packet.

These and other aspects of the invention are discussed in the detailed description which follows in the attached drawings.

BRIEF DESCRIPTION OF THE ILLUSTRATED EMBODIMENT

A fuller understanding of the invention may be attained by reference to the drawings, in which:

FIG. 17 is a table showing RDU:0 states in an alternative embodiment of the invention;

FIG. 18 is a table showing RDU:1 states in an alternative embodiment of the invention.

Figure 9:
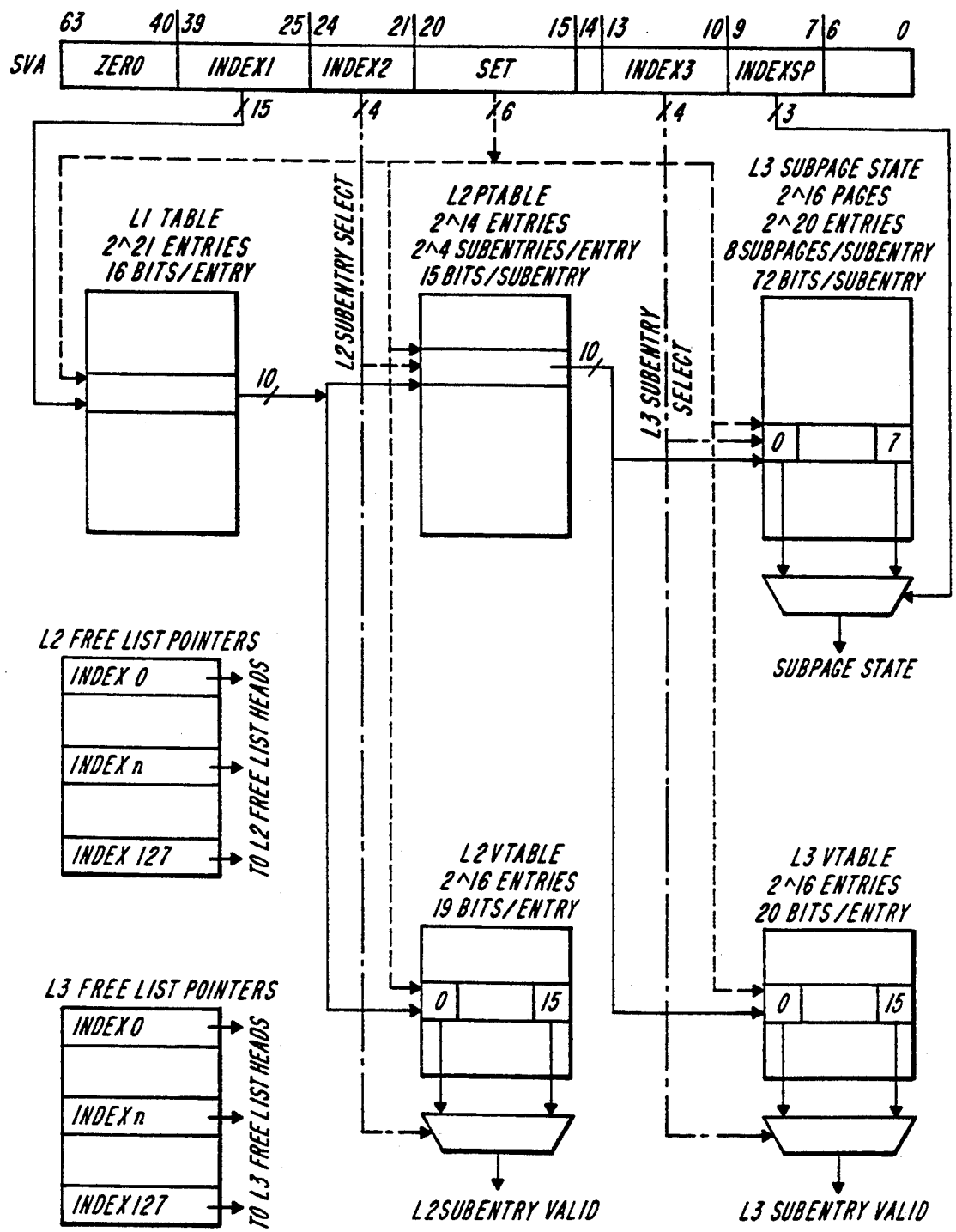

FIGS. 20–26 depiction the operation of the routing directory of FIG. 9 constructed in accord with a preferred embodiment of the invention.

DETAILED DESCRIPTION OF THE ILLUSTRATED EMBODIMENT

Overview

A preferred digital data processing system utilizing a switching network constructed in accord with the invention comprises a plurality of processing cells arranged in a hierarchy of rings, each including one or more routing interconnects coupled by way of a ring-like bus to zero, one or more processing cells. Routing cells linking the interconnects provide pathways for selectively transferring information packets between the rings. Directories in the routing cells track data (and requests) transferred through the associated cells, thereby determining routing pathways for subsequent routing of subsequent packets.

In one preferred embodiment, the processing cells include central processing units coupled with local memory elements, or caches, each having a physical data and control signal store, a directory, and a control element. Groups of cells are interconnected along unidirectional intercellular bus rings, forming units referred to as segments. These segments together form a larger unit referred to as information transfer level:0."

Communications between cells of different level:0 segments are carried out over higher level information transfer levels, e.g., information transfer level:1 and information transfer level:2. These higher levels are themselves made up of one or more segments, each comprising a plurality of routing cells coupled via a unidirectional bus ring. Each routing cell is connected with an associated segment of the next lower information transfer level. These connected lower segments are referred to as "descendants."

Every information transfer level includes fewer segments than the next lower level. Apart from the single segment of the system's highest level, signals are transferred between segments of each information transfer level via segments of the next higher level.

The routing cells each include a directory of descriptors corresponding to the data allocated to the memory elements of the descendant segments. By way of example, a routing cell connecting a level:0 segment to a level:1 segment includes a directory of all data allocated to cells in that level:0 segment, while a routing cell connecting a level:1 segment to a level:2 segment includes a directory of data allocated to all cells in the level:0 segments connected to that level:1 segment.

Along with descriptors, the directories store the access states of data allocated in the descendant segments. These states include, among others, an ownership state, a read-only state, and an invalid state. The ownership state, like the atomic state, is associated with datum which can be modified only by the local processor; however, unlike atomic state data, ownership state data can be accessed—e.g., for generating read-only copies—by other processing cells. The read-only state is associated with data which may be read, but not modified, by the local central processing unit. The invalid state is associated with invalid data copies.

In this regard, it will be appreciated that a preferred digital data processing system constructed in accord with the invention does not utilize a main memory element, i.e., a memory element coupled to and shared by the multiple processing cells. Rather, data is distributed, both on exclusive and shared bases, among the local memory elements associated with each of those processors. Modifications to datum stored exclusively in any one processing cell need not be communicated along the network to the other processing cells. As a result, only that data which the cells dynamically share is transmitted on network, i.e., along the ring buses and routing cells, thereby reducing bus contention and bottlenecks.

The routing cell directories also store descriptors corresponding to data requested in packets routed by the associated routing cells. As above, along with these descriptors, the directories store pending state information indicating requested access states of the data.

In view of the above, it will be appreciated that the contents of the routing cell directories—to wit, the allocated data and pending request lists—reflect the prior history of routings of data and data requests routed between the processing groups.

The routing cells use their directories of descriptors and states to determine whether specific information packets travelling along the level segments should be passed onwards to other processing cells in the segment in which the packet originated or, instead, routed upwards or downwards to other segments.

To further understand this routing function, it will be appreciated that in a preferred multiprocessor system constructed in accord with the invention, data access requests are handled within the processing cell that originated them whenever possible. Particularly, a controller coupled with each memory monitors the cell's internal bus and responds to local processor requests by comparing the request with descriptors listed in a local cache directory. If found, matching data from the cache itself is transmitted back along the internal bus to the requesting processor.

In the event a datum request cannot be resolved locally, the processing cell generates an information request packet that is transferred by a local cache control unit to local ring bus. As that packet travels along the ring, control elements of processing cells adjacent the requester check their own directories, passing the requested data, if found, in a response packet.

When an unresolved request passes the routing element of the segment to which the requesting processing cell belongs, that element too checks its directory. If that directory shows that the requested data is present in local ring in the proper access state, the routing cell permits the request packet to continue along the local ring bus. If not, the routing cell extracts the packet and passes to the associated level:1 segment.

The unresolved request packet travels along the level:1 segment in a similar fashion, i.e., it is compared with the directories of the associated level:1 routing cells. If one of those directories lists the requested data in the proper access state in a descendant level:0 segment, the request is passed to that segment. Otherwise, the request packet may pass to a higher level, if any, in the hierarchy or be returned to the requester unresolved.

Packets containing requested data are routed back to requesting cells by differing mechanisms. A first mechanism relies on the address, or ID, of the requesting cell. Here, each requesting cell includes within its request packet an ID uniquely identifying that cell. Once that packet reaches the responding cell, that cell copies the requestor-ID, along with the datum and corresponding descriptor, into the response packet. As the response packet travels along the segments rings, the routing cells examine the requestor-ID to determine whether the requesting cell is in a descendant or parent segment and route the packet accordingly.

A second mechanism is used in conjunction with response packets that include data requested by processing cells but not specifically generated in response to those requests. By way of example, the mechanism applies in instances where two or more requesting cells generate requests for read-only copies to a specific datum held in a remote cell.

Presuming, in accord with one preferred practice of the invention, that the network prevents at least some, but not all, of those requests from reaching a processing cell having a copy of that datum, the responding cell generates response packets bearing only the requestor-ID of a request packet that reached it.

As the response packet is routed along the network, routing cells compare the packet's descriptor and access-state information with pending request entries in their directories. If that comparison reveals that routing cell previously received a request for datum of the type in the packet, that packet (or a copy thereof) may be routed to one of the requesting cells. In this manner, a single packet containing, for example, a read-only copy of a datum may effectively serve as a response to a plurality of outstanding read-only requests.

System Structure

Figure 1:
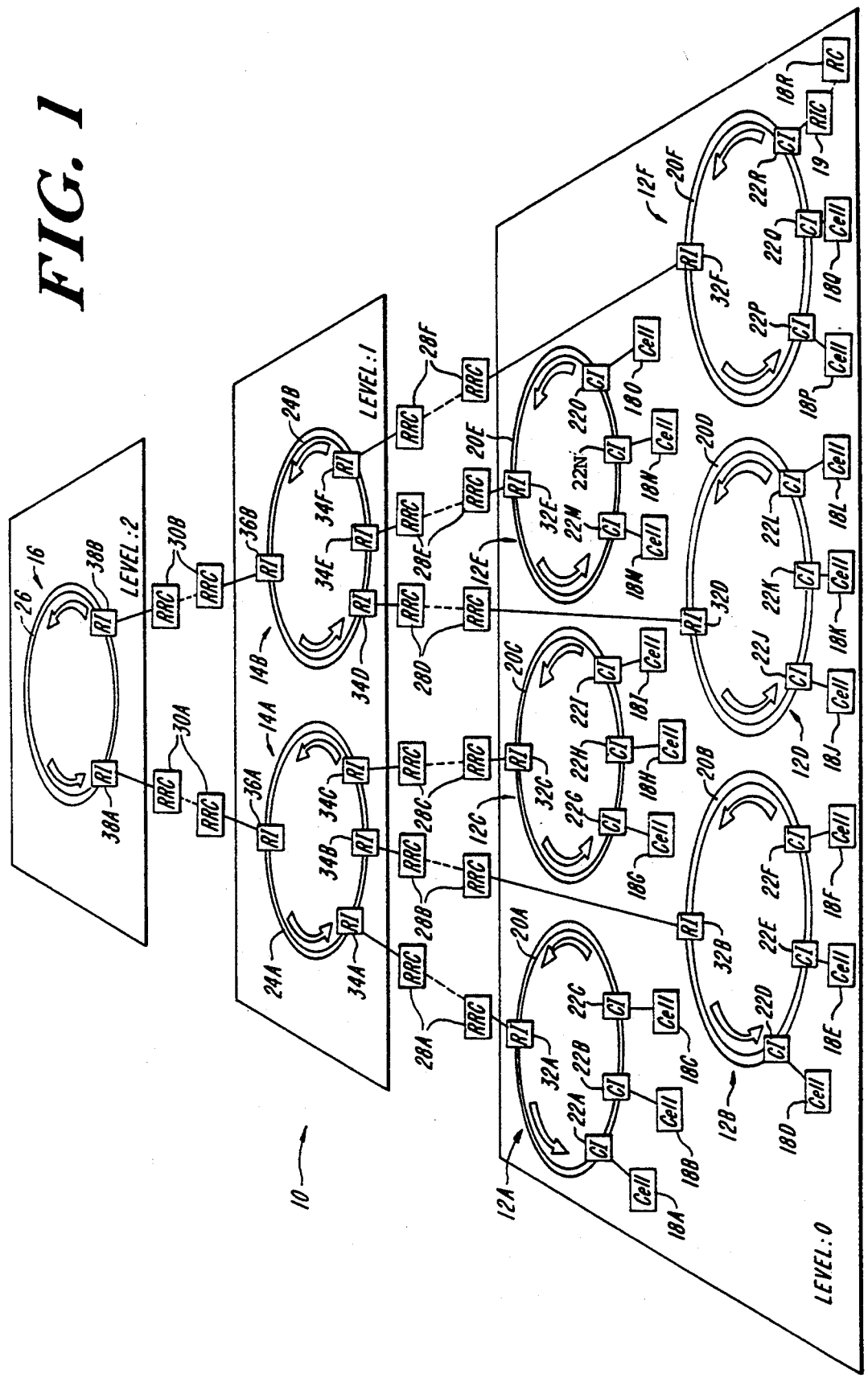
FIG. 1 depicts the structure of a preferred multiprocessing system constructed in accord with the invention.

FIG. 1 depicts a preferred multiprocessing system utilizing a communications network constructed in accord with the invention. The illustrated system 10 includes three information transfer levels: level:0, level:1, and level:2. Each information transfer level includes one or more level segments, characterized by a bus element and a plurality of interface elements. Particularly, level:0 of the illustrated system 10 includes six segments, designated 12A, 12B, 12C, 12D, 12E and 12F, respectively. Similarly, level:1 includes segments 14A and 14B, while level:2 includes segment 16.

Each segment of level:0, i.e., segments 12A, 12B, ... 12F, comprise a plurality of processing cells. For example, segment 12A includes cells 18A, 18B and 18C; segment 12B includes cells 18D, 18E and 18F; and so forth. Each of those cells include a central processing unit and a memory element, interconnected along an intracellular processor bus (not shown). In accord with the preferred practice of the invention, the memory element contained in each cells stores all control and data signals used by its associated central processing unit.

As further illustrated, each level:0 segment may be characterized as having a bus element providing a communication pathway for transferring information packets between the cells of the segment. Thus, illustrated segment 12A is characterized by bus 20A, segment 12B by 20B, segment 12C by 20C, et cetera. As described in greater detail below, digital information packets are passed between the cells 18A, 18B and 18C of exemplary segment 12A by way of the memory elements associated with each of those cells. Specific interfaces between those memory elements and the bus 20A are provided by cell interface units 22A, 22B and 22C, as shown. Similar direct communication pathways are established in segments 12B, 12C and 12D between their respective cells 18D, 18E, . . . 18R by cell interface units 22D, 22E, . . . 22R, as illustrated.

As shown in the illustration and noted above, the remaining information transfer levels, i.e., level:1 and level:2, each include one or more corresponding level segments. The number of segments in each successive segment being less than the number of segments in the prior one. Thus, level:1's two segments 14A and 14B number fewer than level:0's six 12A, 12B . . . 12F, while level:2, having only segment 16, includes the fewest of all. Each of the segments in level:1 and level:2, the "higher" levels, include a bus element for transferring packets within the respective segments. In the illustration, level:1 segments 14A and 14B include bus elements 24A and 24B, respectively, while level:2 segment 16 includes bus element 26.

The routing cells themselves provide a mechanism for transferring information between associated segments of successive levels. Routing cells 28A, 28B and 28C, for example, provide a means for transferring information to and from level:1 segment 14A and each of level:0 segments 12A, 12B and 12C, respectively. Similarly, routing cells 28D, 28E and 28F provide a means for transferring information to and from level:1 segment 14B and each of level:0 segments 12D, 12E and 12F, respectively. Further, routing cells 30A and 30B provide an information transfer pathway between level:2 segment 16 and level:1 segments 14A and 14B, as shown. As discussed in further detail below, the routing cells each comprise two like processing sections.

The routing cells interface their respective segments via interconnections at the bus elements. Thus, routing cell 28A interfaces bus elements 20A and 24A at ring interconnects 32A and 34A, respectively, while element 28B interfaces bus elements 20B and 24B at ring interconnects 32B and 34B, respectively, and so forth. Similarly, routing cells 30A and 30B interface their respective buses, i.e., 24A, 24B and 26, at ring interconnects 36A, 36B, 38A and 38B, as shown.

FIG. 1 illustrates further a preferred mechanism interconnecting remote levels and cells in a digital data processing system constructed in accord with the invention. Cell 18R, which resides at a point physically remote from bus segment 20F, is coupled with that bus and its associated cells (18P and 18O) via a fiber optic transmission line, indicated by a dashed line. A remote interface unit 19 provides a physical interface between the cell interface 22R and the remote cell 18R. The remote cell 18R is constructed and operated similarly to the other illustrated cells and includes a remote interface unit for coupling the fiber optic link at its remote end.

In a like manner, level segments 12F and 14B are interconnected via a fiber optic link from their parent segments. As indicated by dashed lines, the respective sections of the routing cells 28F and 30B are physically separated, yet coupled for example by a fiber optic link. With respect to routing unit 28F, for example, a first part is linked directly via a standard bus interconnect with routing interface 34F of segment 14B, while a second part is linked directly with routing interface 32F of segment 12F. As above, a physical interface between the routing unit parts and the fiber optic media is provided by a remote interface unit (not shown).

Figure 2A:
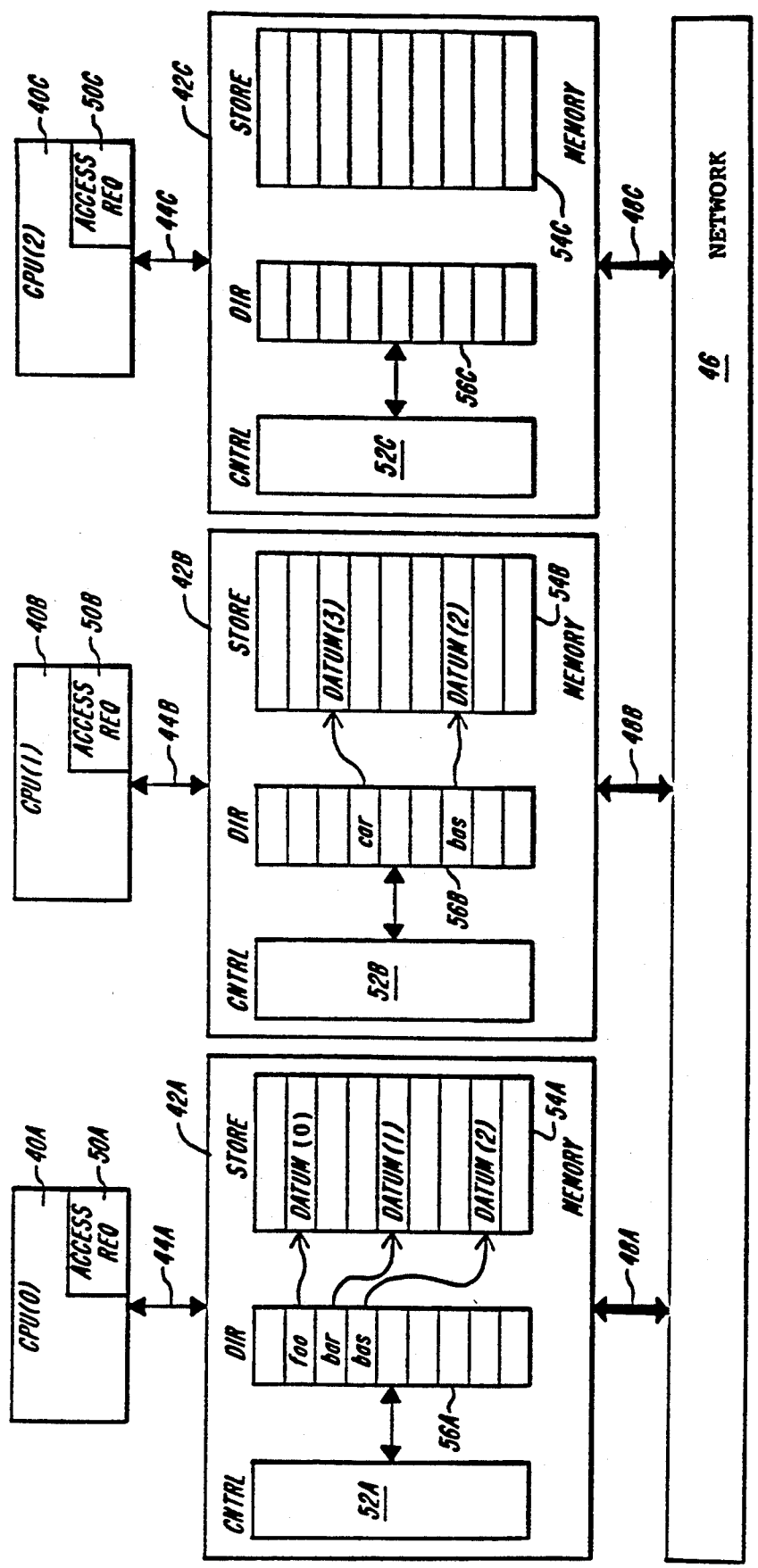
FIG. 2A depicts a preferred memory configuration providing data coherence in a multiprocessing system the type shown in FIG. 1.

FIG. 2A illustrates a preferred mechanism for maintaining data coherence in a multiprocessing system of the type described above. The illustrated system includes plural central processing units 40(A), 40(B) and 40(C) coupled, respectively, to associated memory elements 42(A), 42(B) and 42(C). Communications between the processing and memory units of each pair are carried along buses 44A, 44B and 44C, as shown. Network 46, representing the aforementioned level segments and routing cells, transfers information packets (passed to the network 46 over buses 48(A), 48(B) and 48(C)) between the illustrated processing cells 42A–42C.

In the illustrated embodiment, the central processing units 40A, 40B and 40C each include an access request element, labelled 50A, 50B and 50C, respectively. These access request elements generate requests for access to data stored in the memory elements 42A, 42B and 42C. Among access requests signals generated by elements 50A, 50B and 50C is the ownership-request, representing a request for exclusive, modification access to a datum stored in the memory elements. In a preferred embodiment, access request elements 50A, 50B and 50C comprise a subset of an instruction set implemented on CPU's 40A, 40B and 40C. This instruction subset is described below.

The memory elements 40A, 40B and 40C include control elements 52A, 52B and 52C, respectively. Each of these control units interfaces a data storage area 54A, 54B and 54C via a corresponding directory element 56A, 56B and 56C, as shown. Stores 54A, 54B and 54C are utilized by the illustrated system to provide physical storage space for data and instruction signals needed by their respective central processing units. Thus, store 54A maintains data and control information used by CPU 40A, while stores 54B and 54C maintain information used by central processing units 40B and 40C, respectively. The data maintained in each of the stores are identified by unique descriptors corresponding to system addresses. Those descriptors are stored in address storage locations of the corresponding directory. While the descriptors are considered unique, multiple copies of some descriptors may exist among the memory elements 42A, 4B and 42C where those copies themselves identify copies of the same data element.

Access requests generated by the central processing units 40A, 40B and 40C include, along with other control information, a descriptor or SVA ("system virtual address") request portion matching that of the requested datum. The control elements 52A, 52B and 52C respond to access requests generated their respective central processing units 40A, 40B and 40C by determining whether the requested datum is stored in the corresponding storage element 54A, 54B 54C. If so, that item of information is transferred for use by the requesting processor. If not, the control unit 52A, 52B, 52C transmits a packet including the request to the network 46 along lines 48A, 48B and 48C.

The control units 52A–52C also monitor the network 46 to determine whether they can satisfy remote access requests (i.e., requests received from other processing cells). As above, these control units compare the descriptor and state of an access request received on the network 46 with descriptors stored in their directories. If the requested datum is found in the requested state, it is transferred in a response packet back onto the network 46 for routing to the requesting unit. If a requested datum does not reside in any of the system's processing cells, the operating system can search the system peripheral devices.

Data coherency is maintained by cooperative action of the processing cells in response to data requests and transfers. More particularly, concurrent with generation of an ownership-access request packet by a first processing cell, the associated memory allocates in its store physical space to hold the requested data. Likewise, concurrent with the transfer of a requested datum from the processing cell in which it was previously stored, the associated memory deallocates physical storage space which had been previously allocated for storage of the requested datum.

Figure 2B:
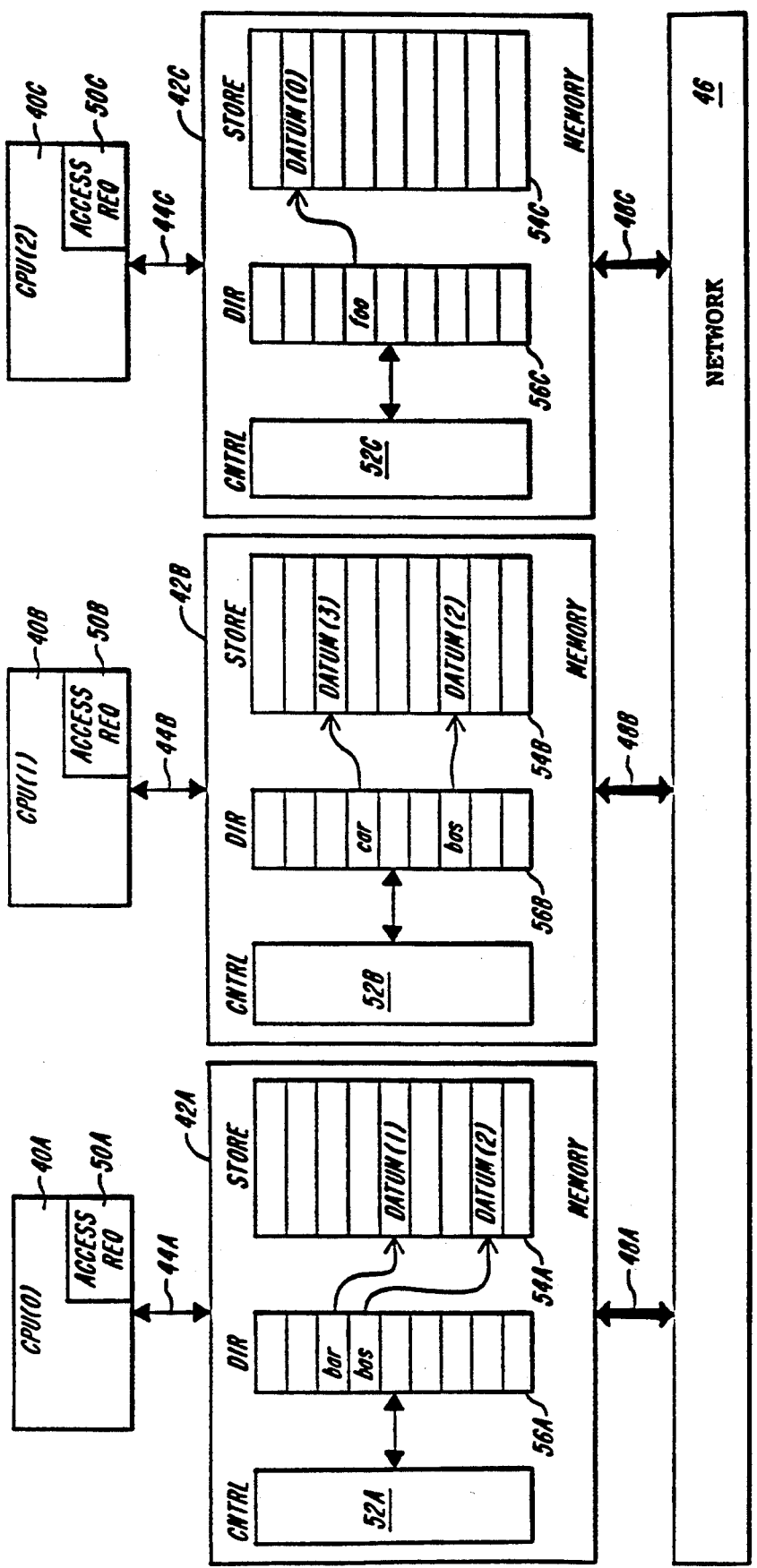
FIG. 2B illustrates datum movement in conjunction with an ownership request by processing cell which does not already have access to that datum in a preferred multiprocessing system constructed in accord with the invention.

These cooperative actions are illustrated in FIGS. 2A and 2B. In the first of those drawings, DATUM(0), DATUM(1) and DATUM(2) are retained in the store of the memory element 42A partnered with CPU 40A. Descriptors "foo," "bar" and "bas" which correspond, respectively, to those data stored in directory 56A. Each such descriptor includes a pointer indicating the location of its associated information signal in the store 42A.

The memory element 42B partnered to CPU 40B stores DATUM(3) and DATUM(2). Corresponding to each of those data elements are descriptors "car" and "bas," retained in directory 56B. DATUM(2), and its descriptor "bas," are copied from store 42A and, therefore, retain the same labels.

The system illustrated in FIG. 2A does not store any data in the memory element 54C partnered to CPU 40C.

FIG. 2B illustrates how a datum moves in conjunction with an ownership for it by processing cell which does not already have access to that datum. In particular, the illustration depicts the movement of DATUM(0) following issuance of an unresolved request for ownership for it by the processing cell made up of CPU 40C and memory 42C. At the outset, concurrent with the request, the control unit 52C allocates physical storage space in the store 54C of memory element 42C. A response packet generated by memory 42A transfers the requested data, DATUM(0), from store 54A, where it had previously been stored, to the requestor's store 54C. Concurrently the control unit 52A deallocates that space in store 54A which had previously held the requested datum. At the same time, the control unit 52A effects invalidation of the descriptor "foo" in directory 56A (where it had previously been used to identify DATUM(0) in store 54A), while control unit 52C reallocates that same descriptor in directory 56C, where it will subsequently be used to identify the signal in store 54C.

In addition to descriptors, the memory elements 42A–42C assign access state information to the data and control signals in their respective stores. These access states, which include the invalid, read-only, ownership and atomic states, govern the manner in which data may be accessed by specific processors. A datum which is stored in a memory element whose associated CPU maintains modification access over that datum is assigned an ownership state. While, a datum which is stored in a memory element whose associated CPU does not maintain priority access over that datum is assigned a read-only state. Further, a purported datum which associated with "bad" data is assigned the invalid state.

A further appreciation of preferred structures for maintaining memory coherence in a digital data processing system constructed in accord with the invention may be had by reference to the above-cited related applications, e.g., U.S. Ser. No. 136,930 now U.S. Pat. No. 5,055,999 and U.S. Ser. No. 370,287 now U.S. Pat. No. 5,251,308.

Figure 3:
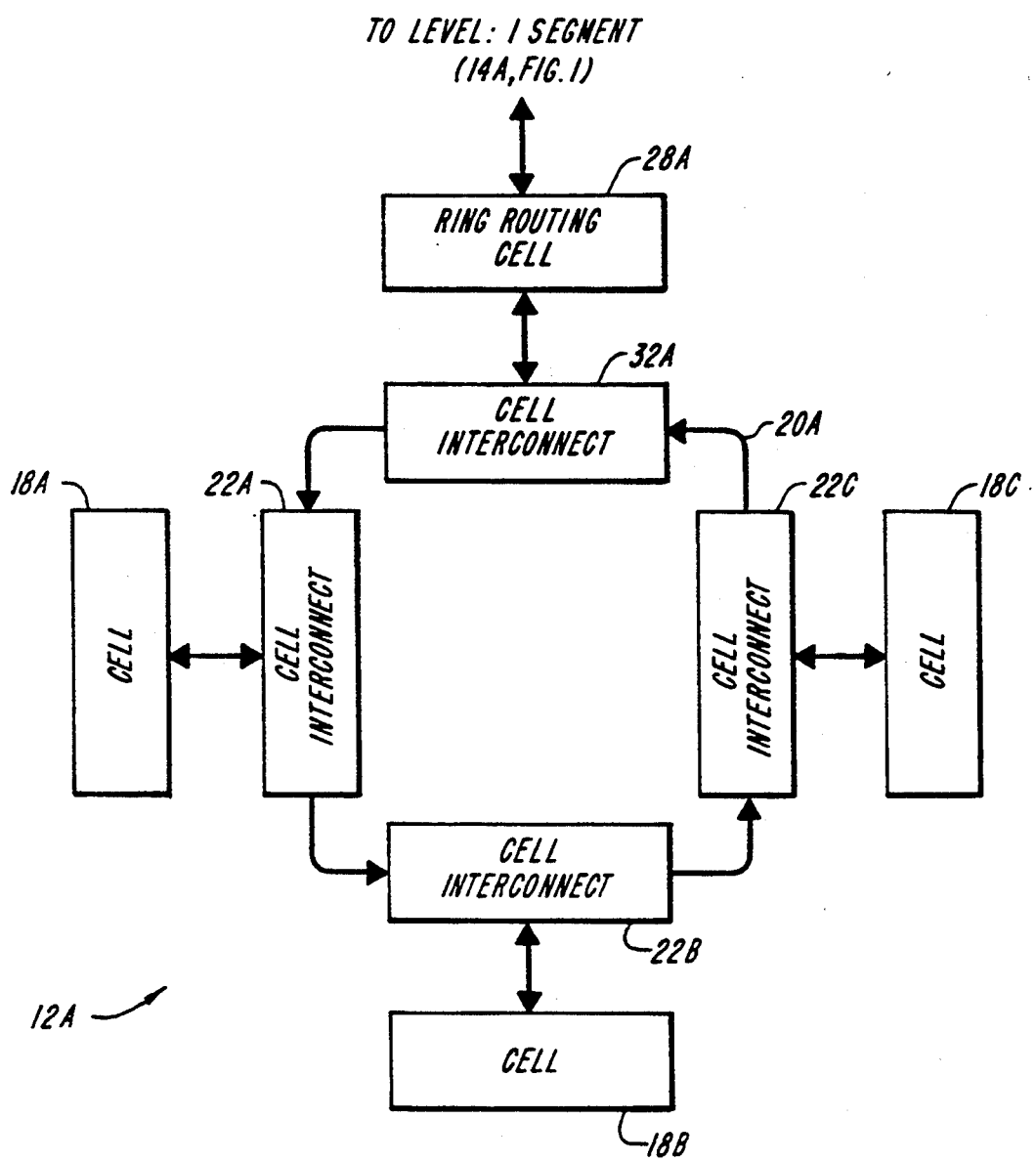
FIG. 3 depicts a preferred configuration for an exemplary level:0 segment of FIG. 1.

FIG. 3 depicts a preferred configuration for exemplary level:0 segment 12A of FIG. 1. The segment 12A includes processing cells 18A, 18B and 18C interconnected by cell interconnects 22A, 22B and 22c along bus segment 20A. Routing unit 28A provides an interconnection between the level:0 segment 12A and if parent, level:1 segment 14a of FIG. 1. This routing unit 28A is coupled along bus 20A by way of cell interconnect 32A, as shown. The structure of illustrated bus segment 20A, as well as its interrelationship with cell interconnects 22A, 22B, 22C and 32A, may be fully appreciated by reference to the above-cited related applications, e.g., U.S. patent application No. 509,480, filed Apr. 13, 1990 now abandoned.

Figure 4:
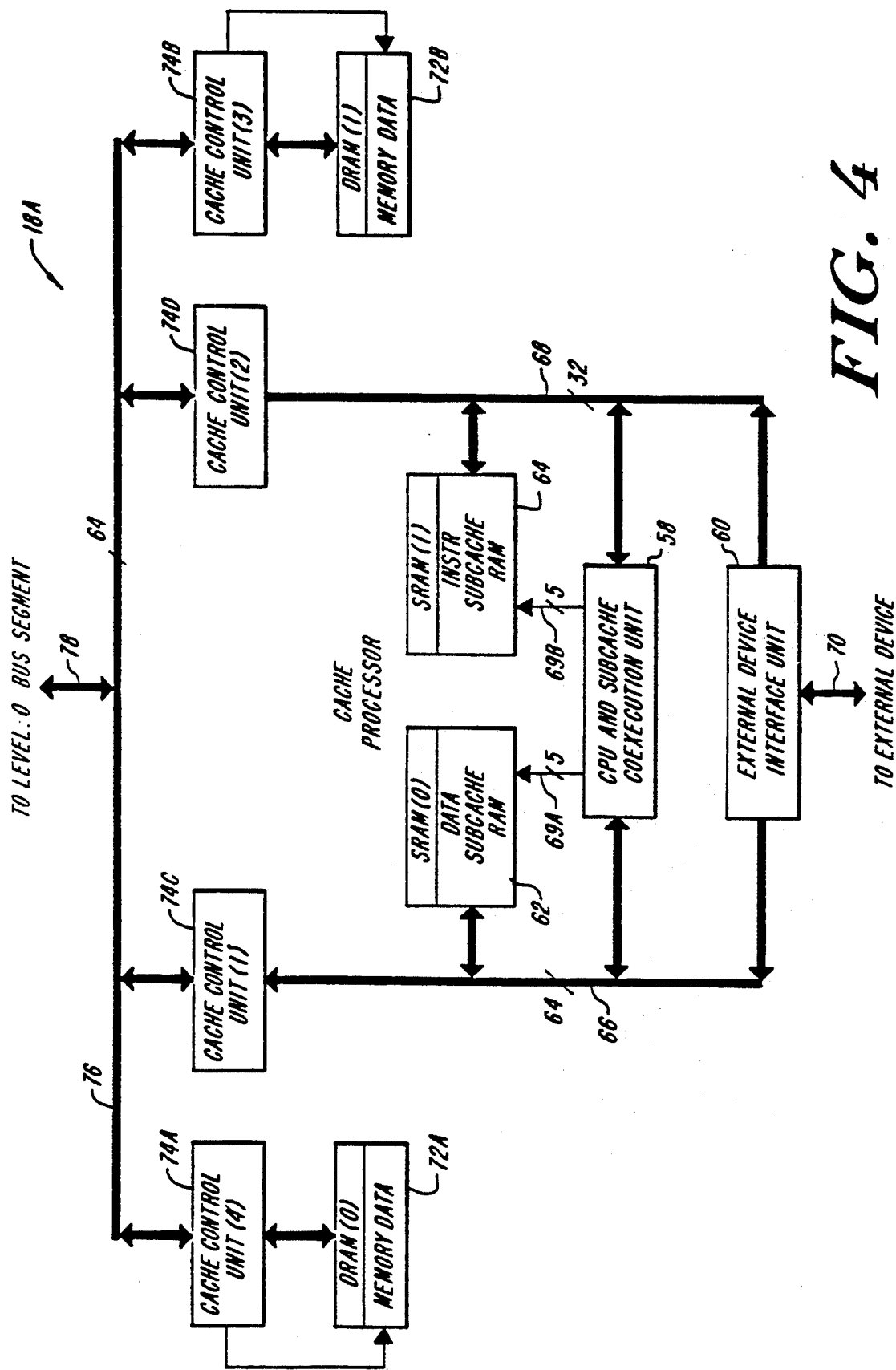
FIG. 4 depicts a preferred structure for processing cells used in practice of the invention.

FIG. 4 depicts a preferred structure for an exemplary processing cell 18A of the illustrated embodiment. The illustrated processing cell 18A includes a central processing unit 58 coupled with external device interface 60, data subcache 62 and instruction subcache 64 over processor bus 66 and instruction bus 68, respectively. A more complete understanding of the circuitry illustrated in this drawing may be attained by reference to the above-cited related patent applications, e.g., Ser. Nos. 136,930, filed Dec. 22, 1987 509,480, filed Apr. 13, 1990 370,325, filed Jun. 22, 1989, and 499,182, filed Mar. 26, 1990.

The Memory System

As discussed above, a multiprocessing system 10 constructed in accord with a preferred embodiment of the invention permits access to individual data elements allocated to processing cells 18A, 18B, ... 18R by reference to a unique descriptor, based on a system virtual address (SVA), associated with each datum. In the illustrated system 10, implementation of this capability is provided by the combined actions of the processing cell memory units in connection with their transfer of request and response packets over the network 46. In the discussion which follows, this is collectively referred to as the "memory system."

A complete understanding of the structure and operation of the memory system may be attained through recognition of its architectural features, enumerated below:

(1) Data Storage—The memory in each cache is divided into pages, each of which may be dynamically assigned to some page of SVA space. The memory system maintains usage and status information about the data in each cache to facilitate efficient migration to and from secondary storage.

(2) Data Locality—The memory system keeps data recently referenced by a processor in the subcache or cache in the same cell of that processor.

(3) Data Movement—The memory system moves data to the cache of the processor referencing it.

(4) Data Sharing—The memory system keeps copies of SVA data in more than one cache to facilitate efficient data sharing by parallel programs.

(5) Data Coherence—The memory system implements the strongly ordered coherent memory model and the transaction model.

Those skilled in the art will appreciate that a system is "sequentially consistent" if the result of any execution is the same as if the operations of all the processors were executed in some sequential order, and the operations of each individual processor appear in this sequence in the order specified by its program.

Moreover, storage accesses are considered "strongly ordered" if accesses to data by any one processor are initiated, issued and performed in program order and; if at the time when a store by processor I is observed by processor K, all accesses to data performed with respect to I before the issuing of the store must be performed with respect to K. By contrast, storage accesses are weakly ordered if accesses to synchronizing variables are strongly ordered and; if no access to synchronizing variable is issued in a processor before all previous data accesses have been performed and; if no access to data is issued by a processor before a previous access to a synchronizing variable has been performed.

A coherent system with strong ordering of events is sequentially consistent.

The organization of SVA space within the illustrated system is a major departure from ordinary virtual memory schemes. Conventional architectures include a software controlled page-level translation mechanism that maps system addresses to physical memory addressor generates missing page exceptions. In these schemes, the software is responsible for multiplexing the page table(s) among all the segments in use. In the architecture of the illustrated system, there is no software controlled page-level translation mechanism. The memory system can handle a significant portion of the address space management normally performed by software in conventional architectures. These management responsibilities include:

(1) maintaining page usage and status information,
(2) reusing old pages,
(3) synchronizing and ensuring coherence of shared data access amongst multiple processors,
(4) migrating data and copies of data on a subpage basis from place to place in the system to keep data nearest to the processors that are using it most frequently,
(5) directly implementing a sparse representation of the entire SVA space, by migrating the SVA of data along with the data, and
(6) moving the page between referencing cells (no fixed home for a page).

The illustrated system's processors, e.g., processors 40A, 40B, 40C, communicate with the memory system via two primary logical interfaces. The first is the data access interface, which is implemented by the load and store instructions. In data access mode, the processor presents the memory system with an SVA and access mode information, and the memory system attempts to satisfy that access by finding the subpage containing the data and returning it.

The second logical interface mode is control access, which is implemented by memory system control instructions. In control access, the processor instructs the memory system to perform some side effect or return some information other than the actual data from a page. In addition to the primary interfaces, system software uses control locations in SPA space for configuration, maintenance, fault recovery, and diagnosis.

Hierarchy

The memory system implements a hierarchy of storage. In the illustrated, preferred embodiment, each processing cell contains a central processing unit (or CEU) which has a subcache that stores 0.5 MBytes of data. Those processing cells also include caches, which store 32 MBytes of data. Moreover, a preferred level:0 having, for example, 15 processing cells stores a total of 480 MBytes. While, a preferred level:1 having, for example, 32 level:0's has a total of 15360 MBytes.

Cache Structure

The memory system stores data in units of pages and subpages. Each individual cache describes 32 Mbytes of SVA space, subdivided into 2048 pages. Pages contain $2^{14}$ (16384) bytes, divided into 128 subpages of $2^7$ (128) bytes. The memory system allocates storage in the caches on a page basis, and each page of SVA space is either entirely represented in the system or not represented at all. The memory system shares data between caches in units of subpages.

When a page of SVA space is resident in the system, the following are true:

(1) One or more caches allocates a page of storage to the page, each subpage of the page is stored on one or more of the caches with space allocated, but
(2) Each cache with space allocated for a page may or may not contain a copy of all of the page's subpages.

The associations between cache pages and SVA pages are recorded by each cache in its cache directory. Each cache directory is made up of descriptors. There is one descriptor for each page of memory in a cache. At a particular time, each descriptor is said to be valid or invalid. If a descriptor is valid, then the corresponding cache memory page is associated with a page of SVA space, and the descriptor records the associated SVA page address and state information. If a descriptor is invalid, then the corresponding cache memory page is logically not in use. There is no explicit validity flag associated with a descriptor; a descriptor may be considered invalid if the anchor and held fields are both clear, and there are no valid subpages present for the SVA page.

Each cache directory acts as a content-addressable memory. This permits a cache to locate a descriptor for a particular page of SVA space without an iterative search through all of its descriptors. Each cache directory is implemented as a 16 way set-associative memory with 128 sets. All of the pages of SVA space are divided into 128 equivalence classes, each associated with a cache directory set. A descriptor for a page can only be stored in the set of a cache directory that corresponds to the page's equivalence class. The equivalence class is selected by SVA[20:14]. At any given time, a cache can describe no more than 16 pages with the same value for SVA[20:14], since there are 16 elements in each set.

Subpages and Data Sharing

When a page is resident in the memory system, each of its subpages is resident in one or more of the caches. When a subpage is resident in a cache, the descriptor (in that cache) for the containing SVA page records the presence of that subpage in one of several states. The state of the subpage in a cache determines two things:

(1) What operations that cache's local processor may perform on the data present in the subpage; and (2) What responses, if any, that cache makes to requests for that subpage received over the levels from other caches.

The states of subpages in caches change over time as programs request operations that require particular states. A set of transition rules specify the changes in subpage states that result from processor requests and inter-cache level communications.

In order for a processor to complete an instruction or data reference, several conditions must be simultaneously satisfied:

(1) For instruction references, the subblock containing the data must be present in the instruction subcache. For most data operations, the subblock containing the data must be present with the appropriate state in the data subcache;

(2) The subpage containing the data must be present in the local cache; and (3) The local cache must hold the subpage in the appropriate state.

If the data is not present with the required state in the subcache, but is present in the local cache with correct state, the CEU obtains the data from the cache. If the local cache does not have the data in the correct state, it communicates over the levels to acquire a copy of the subpage and/or to acquire the necessary state for the subpage. If the cache fails to satisfy the request, it returns an error indication to the processor, which signals an appropriate exception.

The instruction set includes several different forms of load and store instructions that permit programs to request subpage states appropriate to the expected future data reference pattern of the current thread of control, as well as protocol between different threads of control in a parallel application. This section first describes the states and their transitions in terms of processor instructions and their effect on the caches.

Subpage States

The subpage states and their transition rules provide two general mechanisms to programs:

(1) They transparently implement the strongly ordered sequentially consistent model of memory access for ordinary load and store accesses by the processors of the system; and (2) They provide a set of transaction primitives that are used by programs to synchronize parallel computations. These primitives can be applied to a variety of traditional and non-traditional synchronization mechanisms.

The basic model of data sharing is defined in terms of three classes of subpage states: invalid, read-only, and owner. These three classes are ordered in strength according to the access that they permit. Invalid states permit no access. Read-only state permits load and instruction-fetch access. There are several owner states: all permit load access and permit the cache to respond to a data request from the interconnect; some permit store access. Only one cache may hold a particular subpage in an owner state at any given time. The cache that holds a subpage in an owner state is called the owner of the subpage. Ownership of each subpage moves from cache to cache as processors request ownership via store instructions and special load instructions that request ownership.

The sections below describe the state classes and how they interact to implement the strongly ordered sequentially consistent model of memory access.

Invalid States

When a subpage is not present in a cache, it is said to be in an invalid state with respect to that cache. If a processor requests a load or store to a subpage which is in an invalid state in its local cache, then that cache must request a copy of the subpage in some other state in order to satisfy the data access. There are two invalid states: invalid-descriptor and invalid.

When a particular cache has no descriptor for a particular page, then all of the subpages of that page are said to be in invalid-descriptor state in that cache. Thus, subpages in invalid-descriptor state are not explicitly represented in the cache.

When the CEU references a subpage in invalid-descriptor state, the local cache must allocate one of the descriptors (in the correct set) to the SVA. After the descriptor allocation is complete, all subpages in the page have invalid state.

When the local cache has a descriptor for a particular page, but a particular subpage is not present in that cache, then that subpage is in invalid state. The local cache will attempt to obtain the subpage data by communicating with other caches.

Read-Only State

There is only one read-only state: read-only. Any number of caches may hold a particular subpage in read-only state, provided that the owner of the subpage holds the subpage in non-exclusive state. If the owner of the subpage has any other state (i.e. an exclusive-ownership state, one of: exclusive, atomic, or transient-atomic), then no read-only copies can exist in any cell. The CEU cannot modify a subpage which is in read-only state.

Owner States

There are two basic owner state types: non-exclusive and exclusive-ownership. When a particular cache holds a particular subpage in non-exclusive state, then some other caches may be holding that subpage in read-only state. Programmatically, non-exclusive state is the same as read-only state. The CEU cannot modify a subpage which is in non-exclusive state. Non-exclusive state is basically a book-keeping state used by the memory system; it defines the ownership of the subpage.

The exclusive-ownership states are exclusive, atomic, and transient-atomic. When a particular cache holds a particular subpage in an exclusive-ownership state, then no other cache may hold a read-only or non-exclusive copy of the subpage. If the local cache has a subpage in an exclusive-ownership state, the CEU can modify subpage data provided that the STT grants write access to the segment and the descriptor.no_write flag is clear.

Atomic State

Atomic state is a stronger form of ownership than exclusive state. Subpages only enter and leave atomic state as a result of explicit requests by programs.

Fundamentally, atomic state can be used to single-thread access to any subpage in SVA space. When a processor executes a gsp.nwt (get-subpage, no-wait) instruction to request that a subpage enter atomic state, the instruction will only complete normally if the subpage is not in atomic state already. Thus, atomic state on a subpage can be used as a simple lock. The lock is locked when the gsp.nwt instruction completes normally by first obtaining the subpage in exclusive state and then changing state from exclusive to atomic. The lock is unlocked by executing the rsp (release-subpage) instruction. The rsp instruction requires that the subpage exist in some cache with atomic or transient-atomic state. The local cache obtains the subpage and then changes the subpage from atomic or transient-atomic state to exclusive state. (If the subpage has transient-atomic state, the operation is more complex, but the effect is programmatically the same.)

It is important to note that atomic state is associated only with a subpage; there is no association with a particular operating system process (typically a user program) or to a particular cell. It is possible for a process to execute a gsp instruction to get a subpage in atomic state and subsequently be switched by system software so that it continues execution on another cell. That process continues execution on the second cell and eventually executes an rsp instruction to release the subpage. Between those two instructions, the there will only be a single copy of the subpage in the entire memory system, and it will be in atomic or transient-atomic state. As various processors execute instructions which reference the subpage, that single valid copy will move from cell to cell. It is also possible for a particular process to get atomic state, and another process to release atomic state.

Atomic state is simply an additional flag associated with a subpage; it is possible to implement protocols which use atomic state in addition to the data state of the subpage. Just as a protocol which is implemented using only data can have errors, it is possible for an atomic-state protocol to be defective. The hardware does not impose any checking on the use of atomic state beyond access control imposed by the STT and descriptor.no_atomic.

Transient-Atomic State

The gsp.nwt instruction always completes within its defined execution time, but it can succeed or fail (depending upon the current state of the subpage in the memory system). A second form of the instruction is gsp.wt (get-subpage, wait), which will not complete until the subpage is obtained in exclusive state and changed to atomic state. The gsp.wt instruction relieves the programmer of the burden of determining whether or not the gsp instruction was successful. If the subpage is already in atomic or transient-atomic state when a processor executes gsp.wt, the processor will stall until the subpage is released, obtained by the local cache, and changed back from exclusive state to atomic or transient-atomic state. Use of the gsp.wt instruction can reduce the number of messages sent between caches as a cell waits for the opportunity to 'lock the lock'.

Transient-atomic state is used automatically by the memory system to allow gsp.wt to function efficiently. Its use is entirely transparent to the programmer. If a subpage is in atomic state and another cache executes gsp.wt on that subpage, that subpage enters transient-atomic state in the holding cache. When the subpage is later released with an rsp instruction, the transient-atomic state forces the subpage to be expelled onto the interconnect in a special release state. The releasing caches changes its own state for the subpage to invalid. Any cache which is executing a gsp will see the subpage and accept it. The accepting cache will then be able to complete its gsp instruction and the subpage will enter transient-atomic state in that cache. This operation will happen for each succeeding gsp and rsp until such time as an expelled subpage is not accepted by any other cache. At that time, the cache performing the release will change its subpage state back from invalid state (set when the subpage was released) back to exclusive state.

It is also possible that the packet with release state will be accepted by a cache whose CEU is performing a load or store instruction. The original cache sees that the subpage was accepted, and leaves its subpage in invalid state. The accepting cache allows its CEU to execute a single instruction before it retracts the subpage, sets its own subpage state to invalid, and sends the subpage out with release state. The cache which was executing the load or store is now the owner of the page, for purposes of this release. As before, if no other cache accepts the data, this cache will change the subpage state to exclusive state and retain ownership.

Preferably, there is no limit to the time which a gsp.wt instruction may wait. The process which has issued the instruction will wait until the subpage is released. The instruction may be interrupted by various XIU signals; when such an event occurs, the CCUs abandon the attempt to gain atomic access. If the subpage is released in the interim, and there is no other requestor, it will change from transient-atomic state release state and finally to exclusive state. Since the typical system software action is to service the interrupt and restart the interrupted instruction, the CCU will again issue the request. It may succeed or be forced to wait, as before.

State Transition

This section provides some examples of subpage data and state flow.

The basic mechanism by which data moves from some owning cache to other caches is by instruction fetches and the execution of load and store instructions by the processors local to those other caches. The different load and prefetch instructions permit programs to request that their local cache acquire read-only or an exclusive-ownership state; a store instruction always requires that the subpage have an exclusive-ownership state. In some circumstances, a cache may acquire a read-only copy of a subpage as it passes by on the interconnect. The post-store-subpage (pstsp) instruction broadcasts a read-only copy of a subpage to all interested caches. Finally, the owning cache may send ownership state on the interconnect as part of recombining a page (described later).

Instruction fetches and load instructions can result in the local cache requesting a read-only copy of the subpage. This request is answered by the cache which owns the subpage. If the owning cache has the subpage in non-exclusive state, it supplies a read-only copy to the requesting cache, but does not change its own state. If the owning cache has the subpage in exclusive state, it changes its own subpage state to non-exclusive and then supplies the read-only copy to the requester. If the owning cache has the subpage in atomic or transient-atomic state, it supplies the subpage with that state and invalidates its own copy.

When a cache requests exclusive-ownership, the owning cache yields its copy of the subpage. If the subpage is owned with non-exclusive state, it is possible that there are read-only copies in other caches. All such caches react to the exclusive-ownership request by invalidating their read-only copies.

When a cache acquires a subpage with an exclusive-ownership state in order to satisfy a store instruction, it does not grant ownership or a read-only copy to another cache until the store instruction is complete. This rule provides the strongly ordered nature of the memory system, in that it ensures readers of a memory location see modifications in the order that they are made.

When a subpage is in atomic state it may change to transient-atomic state, but it will never change to any other state as a result of any load or store instruction. If some other cache requests the subpage, it will always obtain the subpage in atomic or transient-atomic state. After the subpage has been released to exclusive state, the transitions between exclusive and non-exclusive state may again occur, and read only copies may exist when the subpage is owned non-exclusively.

When a particular subpage is in invalid state in a particular cache (i.e., a descriptor is already allocated, but the particular subpage is not present), and a copy of that subpage is available on the information transfer level interconnection due to a request from some other cache, the cache with invalid state will acquire a read-only copy of the subpage. The effect of this mechanism is to accelerate parallel computations, since it can remove the latency associated with requesting a copy of a subpage from another cache.

It is important to note that the basic mechanisms provide the strongly ordered memory access model to programs that use simple load and store instructions. Programs may use the forms of the load, store, and prefetch instructions that request particular states in order to improve their performance, and it is expected that in many cases compilers will perform the necessary analysis. However, this analysis is optional.

In simple transactions, subpage atomic state is used purely as a lock. The data in the subpage is not relevant. Some of the more sophisticated forms of synchronization mechanisms make use of the data in a subpage held in atomic state. One technique is to use atomic state on a subpage as a lock on the data in that subpage. Programs take one or more subpages into atomic state, manipulate their contents, and release them.

Data Copying Strategy

The interaction among states is a tradeoff between time, cache space, and information transfer level bandwidth spent when a load waits for a copy from another cache and the time and bandwidth spent invalidating copies in other caches when a store or gsp instruction is executed. When there are many read-only copies of a subpage in the system, then the chances that a read will find the data already in the local cache are increased. However, if there are any read-only copies in the system, then the owner must first invalidate those copies (by sending a single message) when modifying the subpage. The following heuristics attempt to dynamically distinguish between multiple read/writer sharing from single read/writer access on a short-term basis.

Multiple read/writer sharing is multiple read-only copies with high temporal locality and write updates with lower temporal locality. Retaining read-only copies is most efficient since multiple copies are read multiple times between updates. The modifying CEU can gain an exclusive-ownership state with a single information transfer level operation; it can then broadcast the changed data using the pstsp instruction to distribute the data to interested caches.

Single read/writer access is multiple read-only copies with low temporal locality and write updates with much higher locality. Retaining read-only copies is less efficient since copies are updated multiple times between reads. A single read/write copy (exclusive-ownership state) does not require a information transfer level operation for writes.

The strategy for balancing these considerations is as follows:

(1) When a copy of a subpage is sent across the information transfer levels to satisfy a request, any cache that has a descriptor for the page but no copy of the subpage picks up a read-only copy from the message. This mechanism accelerates applications with high locality of reference.

(2) When a cache with non-exclusive or read-only state needs to update a subpage, every other cache with a copy of the subpage invalidates that copy and exclusive ownership moves to the modifying cell. The modifying cell can use pstsp to broadcast the change. Any subsequent attempt by another cache to read the subpage can result in copies being distributed to interested caches.

Cache Layout

Figure 5:
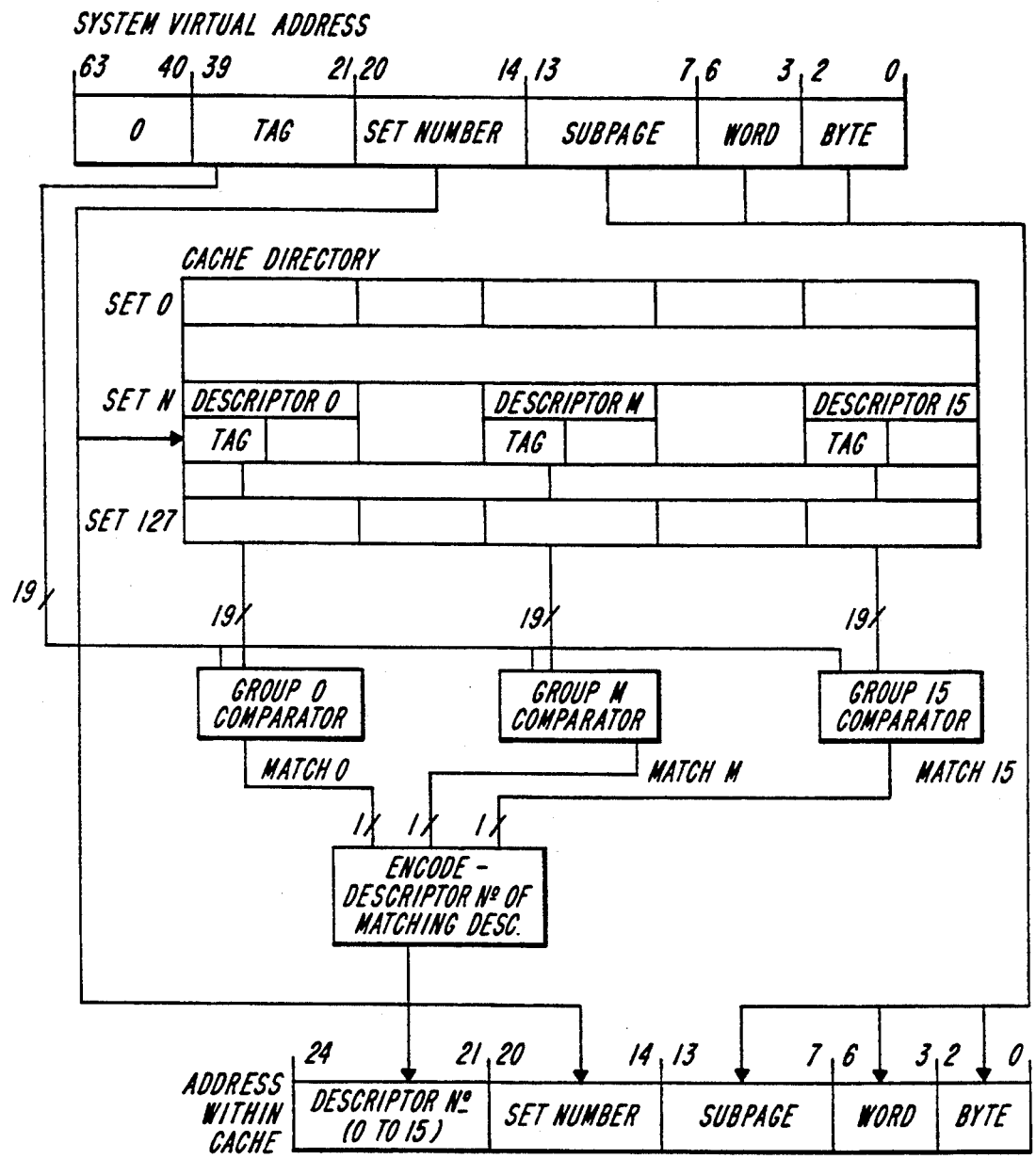
FIG. 5 depicts a preferred structure of a cache directory in a processing cell constructed in accord with the invention.

A preferred organization of a cache directory is shown in FIG. 5. When a reference to an SVA is made, the cache must determine whether or not it has the required information. This is accomplished by selecting a set within the cache, and then examining all the descriptors of that set. SVA[20:14] selects a set. In the general architecture, each of the descriptors in the selected set is simultaneously compared against SVA[63:21]. In a preferred embodiment having a 240 Mbyte SVA space, this implies a comparison with SVA[39:21]. If one of the elements of the set is a descriptor for the desired page, the corresponding comparator will indicate a match. The index in the set of the matching descriptor, concatenated with the set number, identifies a page in the cache.

If more than one descriptor matches, the cache signals a multiple descriptor$_{13}$ match exception. If no descriptor matches, the cache allocates a descriptor and requests data from the interconnect. It is possible that either the allocation or data request will fail, and the cache will indicate an error to the CEU.

The use of SVA[20:14] to select a set is effectively a hash function over SVA addresses. System software must assign SVA addresses so that this hash function gives good performance in common cases. There are two important distribution cases: referencing many pages of a single segment and referencing the first page of many segments. This set selector produces good cache behavior for contiguous groups of pages, since 128 contiguous pages will reside in 128 distinct sets. However, this selector will produce poor hashing behavior for many pages with the same value in SVA[20:14]. System software can avoid the latter situation by varying the logical origin of data within segments. For example, each per-process user stack can be started at a different segment offset.

Contents of a Descriptor

When a cell responds to a request for a subpage, it supplies the subpage data and the values of certain descriptor fields in the local cache. When the response returns to the requestor it either copies those fields to descriptor fields (if it has no other valid subpages) or logically ors those fields into descriptor fields. Some descriptor fields are never supplied by the responder nor updated by the requestor.

In a preferred embodiment, the descriptor fields are defined as follows:

descriptor.tag (19 bits)
Bits [39:21] of an SVA. This field identifies the particular page of SVA space specified by the corresponding descriptor. For a given set in a given cell, this field must be unique among all 16 descriptors. Software 'sets' this field when it creates an SVA page. (It is also set by software during cache initialization.)

descriptor.atomic_modified (1 bit)
A cache sets this bit flag to one when any subpage of this page undergoes a transition into or out of atomic state because a gsp or rsp instruction was successfully executed. It is also set when a subpage changes from atomic state to transient-atomic state. This flag is not set if a gsp fails because the subpage is already in atomic state or if a rsp fails because the subpage was not in atomic state. This flag is not set if the gsp or rsp fails because descriptor.no_atomic is set. System software sets this flag to zero to indicate that it has noted the atomic state changes. This field is propagated from cache to cache.

descriptor.modified (1 bit)
A cache sets this bit flag to one when any data is modified in the page. System software sets descriptor.modified to zero to indicate that it has noted the modification of the page. This flag is not set if an attempt to modify data fails because descriptor.no_write is set. This field is propagated from cache to cache.

descriptor.LRU_Position (4 bits)
The cache maintains this field as the current position of the descriptor in its set from Most Recently Used (0) to Least Recently Used (15).

descriptor.anchor(1 bit)
Software sets the field to indicate that data requests from other caches may not be honored nor may the descriptor be invalidated. Any read or get request from another cache returns unresponded to the requestor, and is treated as if the page were missing. This field is set by system software as part of creating or destroying an SVA page, and as part of modifying the page descriptor.

descriptor.held (1 bit)
Software sets the field to indicate that the descriptor may not be invalidated by the cache even if no subpages are present in the cache.

descriptor.no_atomic (1 bit)
Software sets this field to prevent any cache from changing the atomic state of any subpage of this page. An attempt to execute a gsp or rsp fails, and is signalled back to the processor. The processor signals a page_no_atomic exception. descriptor.no_atomic can be altered even when some subpages have atomic state. This flag simply prevents attempt to change atomic state, in the same way that descriptor.no_write simply prevents attempts to change data state. This field is propagated from cache to cache.

descriptor.no_write (1 bit)
Software sets this field to prevent modifications to the page by the local processor. An attempt to modify the page fails, and is signalled back to the processor. The processor signals a page_no_write exception. Ths flag does not affect the ability of any cache to acquire the subpage in exclusive or atomic/transient-atomic state. This field is propagated from cache to cache.

descriptor.summary (3 bits)
Summarizes subpage state field of a set of subpages. There is one three-bit summary field for each set of subpages. The summary sometimes overrides the contents of the individual subpage_state fields for the subpages within the summary set.

descriptor.subpage_state (4 bits)
The subpage state consists of a three-bit state field and a single bit subcached status field. It is set by the cache to record the state of each subpage and to indicate whether or not any portion of the subpage is present in the CEU subcache It is possible for flags in descriptors to be incorrect or out-of-date. There are two reasons for this: latency between a CEU and its local CCUS, and latency between the CCUs of different cells. The former can occur when a page which was previously unmodified is modified by the CEU. Until the modified subblock leaves the subcache, the local CCUs are not aware that a modification has occurred. The latter can occur because many caches may each contain a descriptor for a particular SVA page, and a state change affected by one cache is not automatically broadcast to all other caches.

Because there is no valid bit associated with a descriptor, a descriptor always has the tag of some SVA page. However, if all the cache descriptors which have tags denoting a particular SVA page have no valid subpages in their descriptors, then the SVA page does not exist in the memory system. Similarly, if no cache descriptor has a tag denoting a particular SVA page, then that page does not exist in the memory system. It is possible to read the descriptor fields for such a page, but since the SVA page has logically been destroyed, the field values are not valid.

For example, consider two caches with descriptors for a page; cache A has all the subpages in exclusive state, and descriptor.modified is clear; no other cache has a descriptor for the page. The CEU of cell B executes a store instruction to modify subpage data. CEU B requests the subpage with an exclusive-ownership state from its local cache. The cache allocates a descriptor for the page and then requests the subpage using the ring. The owner (cell A) responds by yielding exclusive ownership to cell B. After the subpage arrives, cell B copies descriptor.modified (which is clear) from the response. Then the CEU of B loads a subblock from the subpage into its data subcache and modifies the subblock. At this point, the CEU subcache indicates that the subblock has been modified, but the local cache still shows the subpage as unmodified. At some later time, CEU B will send the subblock data from its subcache to the local cache. This can occur because the CEU requires the subcache block for other data, because the CEU is using idle cycles to write-back modified subblocks, or because some other cell has requested the subpage. Then the cell B cache sets the descriptor.modified flag. Throughout this time, descriptor.modified is clear on cell A.

As a second example, assume that the system software running on cell A now destroys the SVA page. The page is destroyed by gathering up all subpages in exclusive state in cache A and then altering A's descriptor such that the SVA page no longer has any valid subpages. However, cache B still has a descriptor for the page. Fields such as descriptor.modified are meaningless. Even if some other cache subsequently recreates the SVA page, cache B's descriptor will be out of date until the first subpage arrives.

System software must ensure that the SVA page is really present in the memory system when it attempts to use descriptor information. One method of accomplishing this is to always set the page anchor and obtain at least one valid subpage in the local cache. To be absolutely certain that the modified and atomic_modified fields are not set, software must first obtain every subpage in exclusive state. The anchor prevents any other cache from asynchronously acquiring any subpage already obtained. When the operation is complete, system software clears descriptor.anchor in the local cache. Then other cache requests for subpages of that page will again be honored.

System software also needs to ensure that an SVA page does not really exist in the memory system before it creates the page. As noted above, the simple existence of a descriptor with the correct tag value does not indicate that the SVA page actually exists in the memory system. Software can verify non-presence by setting the page anchor and then attempting to fetch a subpage with exclusive state. If the fetch succeeds, software has lost a race, and the page exists in the memory system. Otherwise, software can create the page using the mpdw instruction to establish the SVA page address with all subpages owned exclusively. Note that there still needs to be a software interlock against the simultaneous use of mpdw for this purpose.

Cache Descriptor Usage and Replacement

The caches of the illustrated system 10 can be used by system software as part of a multilevel storage system. In such a system, physical memory is multiplexed over a large address space via demand paging. The caches include features that accelerate the implementation of a multi-level storage system in which software moves data between the caches and secondary storage in units of SVA pages.

All of the caches together make up a system's primary storage. However, for some purposes, it is necessary to consider each individual cache as an independent primary store. This is because each cache can only hold a limited number of SVA pages: 2048 pages in each cache, and 16 in any particular set. There are several automatic and manual mechanisms to balance the utilization of the caches.

Each cache maintains LRU state for all of the resident pages. The LRU data is maintained separately for each of the 128 sets of the descriptor associative memory, and orders the 16 pages in the set according to their approximate time of last reference.

Each cache maintains an LRU→MRU ordering of the descriptors in each set. The ordering is maintained in descriptor.LRU$_{13}$ priority. Each of the descriptors in a set has a value from 0 (MRU) to 15 (LRU) in descriptor.LRU$_{13}$ priority. Conceptually, when a page is referenced it moves to MRU and all of the pages from MRU down to the referenced page's old LRU priority then move down one step towards LRU. A descriptor is made MRU:

(1) on any load from the local CEU, including increasing subcache state strength
(2) on any store from the local CEU
(3) on any local CEU writeback which unsubcaches
(4) following an XCACHE operation (the cache requests that the local CEU change subcache state)
(5) after deallocation from a local CEU subcache A CEU instruction may reference an SVA page which is not present in the local cache (it is in invalid-descriptor state). The cache must allocate a descriptor, as described below, and then issues a request to the interconnect for the particular subpage which is required by the CEU. If the corresponding page is resident elsewhere in the system, the requesting cache will copy certain descriptor fields and the referenced subpage data from the responding cache. Eventually, this process of allocating descriptors will fill up the elements of a particular cache set.

Each cache has capabilities for automatically reusing certain descriptors by changing an SVA page to invalid-descriptor state in the cache. As a background activity, the caches also automatically move owned subpages to other caches. All of these automatic actions can be tuned or disabled by system software, and are inhibited when descriptor.held and/or descriptor.anchor is set. The following subsections describe the descriptor reclamation and background data movement activities of the caches.

Sometimes, there will be one or more descriptors in a cache set which have no valid subpages. This situation can arise as a result of requests generated by other caches, or as a result of recombining activity (described below). For example, assume that a cache descriptor has only one valid subpage, for which it has exclusive state. If some other cache requests ownership of the subpage, this cache no longer has any valid subpages of the page. If descriptor.held and descriptor.anchor are clear in this cache, then this descriptor can be reused when the CEU references some other page which has invalid-descriptor state in the same set of this cache.

A cache will automatically drop a page which has all subpages in read-only or invalid state (a read-only page), provided that no subpage is subcached. This is possible because no information is lost by the memory system when it destroys read-only copies. The cache has configuration options to totally disable copy dropping or to restrict it to a partial range of descriptors, according to LRU ordering.

A cache will automatically drop a page which has all subpages in some exclusive-ownership state and which has descriptor.modified and descriptor.atomic_modified both clear. The fact that the cache has exclusive ownership of all subpages guarantees that no other cache has ownership or a copy of some portion of the data state, and allows this cache to destroy data state without communicating with any other cache. The fact that descriptor.modified and descriptor.atomic_modified are both clear indicates that no data or atomic state change (including transition from atomic state to transient-atomic state as the result of a gsp.wt instruction) has occurred since the SVA page was created or last polled by system software. The memory system presumes that system software has a copy of the page data and atomic state on secondary storage which can be used to recreate the SVA page, and destroys the page. The cache has configuration options to totally disable pure page dropping or to restrict it to a partial range of descriptors, according to LRU ordering. Note that system software must never asynchronously clear descriptor.atomic_modified if any subpage is in transient-atomic state.

Note that setting descriptor.held does not guarantee that the individual subpages will be present in the local cache. Further, simply setting descriptor.held for a page does not prevent some other cache from destroying the page. System software must take explicit action to prevent hardware from automatically dropping a pure page (e.g. set descriptor.modified).

Recombining is an operation whereby an owned subpage is expelled from a cache onto the interconnect and other caches are given an opportunity to accept ownership state. Any accepting cache must already have a descriptor allocated for the containing page; a cache will not allocate a descriptor in order to accept the ownership of a subpage being recombined. The goal of page recombining is to reduce the total number of descriptors which are allocated for a particular SVA page.

A cache issues a recombine message to recombine a subpage. If the recombine messages fail to find another cache to take over the page, the recombining cache retains the data. In effect, it has found itself as the target of the recombine. If some other cache accepts ownership (which may be non-exclusive, exclusive, atomic or transient-atomic state), the issuing cache changes its subpage state to invalid.

The caches will automatically attempt to recombine subpages as a background activity while memory refresh is occurring. At each refresh interval, the cache examines a particular set, and searches for an acceptable descriptor. The descriptor must have no subcached subpages, must own some subpage, and must not have all subpages in exclusive-ownership state. If such a page is found, the cache issues a recombine message for some owned subpage. The cache has configuration options to totally disable background recombining or to restrict it to a partial range of descriptors, according to LRU ordering. Background recombining makes it more likely that the cache will be able to allocate a descriptor for a newly referenced SVA page, instead of causing a line-full error.

The CEU also provides an instruction whereby system software may attempt the expulsion of an owned subpage. The subpage must not be subcached, but no other restrictions are imposed before the cache attempts to expel ownership.

Since pages below the working set point are less likely to be referenced, most of the recombines that actually move data will move it from a cell which is not referencing the data to a cell which is.

When a new descriptor in a set is needed, the cache proceeds in order through as many of the following actions as needed to find a usable descriptor:

(1) find an invalid descriptor
(2) invalidate a read-only copy
(3) destroy a pure SVA page
(4) Signals a line_full exception if it cannot allocate a descriptor by the means described above.

The individual steps are explained below:

Find an Invalid Descriptor P If an invalid descriptor exists it can be used immediately. This requires:

all subpages are in invalid state, and
descriptor.held and descriptor.anchor are both clear
no subpage of the page is described by a PRT entry Invalidate a Read-Only Copy If ctl$ccu_lru_config.cde is 1, the cache attempts to identify a descriptor which contains only read-only copies of subpages. It searches from LRU to MRU, looking for any page which has:
all subpages in read-only or invalid state, and
no subcached subpages, and
an LRU value which is greater or equal to ctl$ccu_lru_config.cdl, and
descriptor.held and descriptor.anchor both clear, and
no subpage of the page is described by a PRT entry
If an acceptable descriptor is found, all subpages are changed to invalid state and the descriptor is used.

Drop a Pure SVA Page

If ctl$ccu_lru_config.pde is 1, the cache attempts to identify an SVA page which can be destroyed (removed entirely from the memory system). It searches from LRU to MRU, looking for a page which has:
all subpages in (various) exclusive-ownership states, and P1 no subcached subpages, and
descriptor.modified and descriptor.atomic modified both clear, and
LRU value which is greater or equal to ctl$ccu_lru_config.pdl, and
descriptor.held and descriptor.anchor both clear, and
no subpage of the page is described by a PRT entry
If an acceptable descriptor is found, all subpages are changed to invalid state (thereby destroying the SVA page), and the descriptor is used.

To reduce the probability that a line_full exception will occur, the cache periodically attempts to reduce its ownership of subpages within less-recently-used pages. These actions are independent of descriptor allocation operations, and occur during RAM refresh.

If ctl$ccu_lru_config.bre is set, the CCU searches up from LRU looking for any page which has:
some subpages in ownership state
some subpage not in an exclusive-ownership state
no subcached subpages
an LRU value with is greater or equal to ctl$ccu_lru_config.brl
descriptor.held and descriptor.anchor both clear
no subpage of the page is described by
a PRT entry
If an acceptable descriptor is found, the cache issues a recombine message to the interconnect.

System software can monitor the LRU behavior of pages within individual caches to establish a 'working-set point' for each cache line. Descriptors with lower LRU values are in the working set and descriptors with higher LRU values are not in the working set. Repeated examination of the descriptor tags, LRU values and subpage state can be used to determine the working-set point.

When a modified (or atomic$_{13}$ modified) page leaves the logical working set, system software can take action to purify the page so that the descriptor will be reallocatable in the near future.

If the descriptor holds relatively few subpages in ownership states, then software can attempt to recombine those subpages to other caches using the mrcsp (recombine-subpage) instruction. Otherwise, it might decide to obtain the entire SVA page and purify or destroy it.

As the working set changes, system software can modify the configuration parameters which control the cache. The parameters for pure-dropping, copy-dropping, and background recombines can be altered to ensure that hardware actions are consistent with software working-set policy.

The typical use of secondary storage is that each SVA page has a corresponding page allocated in secondary storage, extending the caching model provided by hardware. A page originally 'exists' only in secondary storage, and is encached in the memory system when it is referenced by a program. If the page is modified (data state or atomic state) while in the memory system, then the copy of the page on secondary storage must be updated before the containing memory system page can be re-used for some other SVA. Such modifications can be detected by examining the descriptor.modified and descriptor.atomic_modified fields. The operation of updating secondary storage is call 'purifying' the SVA page. System software typically purifies SVA pages which are below the working set point, so that the cache space will be quickly available for other SVA pages.

Only some of the cells in the system have a physical connection to the disk drive which provides secondary storage for an SVA page. The appropriate I/O-capable cell must be able to obtain page data during the I/O operation. System software can ensure this by allocating and holding a descriptor on the I/O-cell before issuing the I/O commands. After the purification is complete, system software can clear the descriptor.modified and descriptor.atomic_modified flags or destroy the SVA page. The actual protocols used can be much more complex, depending upon whether or not the system allows programs to access the page during the purification attempt.

In general, system software must not clear descriptor.atomic_modified if any subpage has transient-atomic state unless the memory system is otherwise prevented from destroying the page. e.g. if all descriptors have the held flag set, or if descriptor.modified is set, the memory system will not destroy the page.

When a particular set of a particular cache is full, there is no reason for software to assume that the entire memory system is correspondingly full. Thus, it is desirable for software to respond to a full set by moving a page from that set to the corresponding set of another cache.

In order to use memory efficiently, software must use some strategy for identifying an appropriate page to remove from a full set, and an appropriate target cache, if any, for the page. The caches include facilities that accelerate a class of strategies for this page replacement. To accelerate software's selection of a page for replacement within a set, each cache approximately orders the pages from Most Recently Used (MRU) to Least Recently Used (LRU). When a page is referenced, it moves to MRU. As other pages are referenced thereafter, it ages toward LRU. The LRU information accelerates strategies that replace the least recently used page.

Processor Data Accesses

A processor makes data requests to its local cache to satisfy load and store instructions and co-execution unit operations. A cache makes requests to its local processor to force the processor to invalidate its copy of a subpage in subcache.

Load and Store Instructions

A processor passes load and store instructions to its local cache as requests when the subblock containing the referenced address is not present in the subcache in the required state. The different types of load and store instructions pass information to the local cache about the access patterns of the following instructions. For example, if the sequence of the instructions is a load followed by a store, and the subpage containing the data item is not yet resident in the local cache, it is more efficient to acquire ownership for the load than to get a read-only copy for the load instruction and then communicate over the information transfer levels a second time to acquire ownership for the store instruction.

The state of subblocks in the subcaches does not always reflect the state of the corresponding subpage in the cache. The instruction subcache always obtains a read-only copy of data. The data subcache may hold a subblock in read-only or exclusive state. The subcache can only have exclusive state if the cache has an exclusive-ownership state and descriptor.no_write is not set. The subcache does not distinguish between exclusive, atomic, and transient-atomic subpage states. When the subcache has a subblock in exclusive state, the CEU can execute store instructions by simply placing the new data in the subcache. For all store instructions except st64.nsc, if the subblock is not described by the subcache, or has invalid or read-only state, then the CEU must request exclusive state from the local cache prior to completing a store instruction. If descriptor.no_write is set or the subpage is not present in the memory system, a fault will occur.

When a request for a subpage arrives from another cache, the owning cache must respond. If any part of the subpage is in the data subcache, the local cache must ensure that it obtains any modifications which might be present only in the subcache. The cache also causes the CEU to change subcache state for the subblock to read-only or invalid, depending upon the request. In certain cases, the cache will also ensure that the instruction subcache invalidates its read-only copy of the subpage.

It is important to distinguish between the units of subcache management (blocks and subblocks) and the units of cache management (pages and subpages). Data travels between a CEU and its local cache in subblocks. Data travels between caches in subpages. There are two subblocks per subpage.

The different forms of load and store instructions are described below. Each description begins with a brief summary of the semantics of the instruction, and continues with an overview of subcache and cache actions.

load (read_only) [ld.ro]
load_64 (read_only, subcached) [ld64.ro.sc]
    The program will continue a pattern of reading data. The minimum amount of work is done to obtain data. If the containing subblock is subcached, it is used directly. If the local cache does not have the subpage, it obtains a copy. The local cache supplies the subblock to the subcache with exclusive or read-only state, as appropriate.
load (exclusive) [ld.ex]
load_64 (exclusive, subcached) [ld64.ex.sc]
    The program will write the subblock in the following instructions, and exclusive state is preferable to any other state. A program would use this when the data was expected to have little sharing, or when a series of writes was upcoming. This can reduce the number of interconnect messages required before the CEU can modify data. A particular example of the use of load (exclusive) is per-program data such as stacks. Generally, there will by no read-only copies of such data, since the only copy will be the one in use by the program. However, if a program moves from one processor to another, the new processor's local cache will have no copy, and the old processor's local cache will continue to hold the subpage in an exclusive-ownership state. If the program uses load (read_only), the local cache acquires the subpage in read-only state (unless the subpage is in atomic or transient-atomic state, in which case that state is acquired). The subsequent store requires the cache to make another interconnect request (to obtain an exclusive-ownership state) before any CEU data modification can occur.
    As with ld.ro, the minimum amount of work is done to obtain data. If the subblock is already present in the subcache, it is used directly. If the local cache does not have the subpage, it requests the subpage in an exclusive-ownership state. When the local cache has the subpage, the subblock is supplied to the CEU in read-only or exclusive state, as appropriate.
store [st]
store_64 (subcached) [st64.sc]
    If the subblock is already present in the subcache in exclusive state, subcache state is unchanged; data is written to the subcache.
    The subcache must have the subblock in exclusive state. As necessary, the subcache will request exclusive state from the local cache, and the local cache will request an exclusive-ownership state from the interconnect.
    If the descriptor.no_write flag is set, an error is signalled to the CEU which generates a page_no_write exception. Otherwise, the subcache obtains the subblock in exclusive state; data is written to the subcache.
load_64 (read_only, unsubcached) [ld64.ro.nsc]
load_64 (exclusive, unsubcached) [ld64.ex.nsc]
    The programmer uses the exclusive and read_only designations according to the expected reference pattern, as documented for ld. However, the number of references to the subblock is expected to be small, and the subcache should not be disturbed while fetching this data.
    If the data is present in the subcache, it is used directly. If the local cache does not have the subpage, it obtains a copy. The CEU obtains a copy of the data and loads the destination registers.
store_64 (unsubcached) [st64.nsc]
    The number of references to the subblock is expected to be small (typically one), and the subcache should not be disturbed while storing this data. If the subblock is subcached in exclusive state, the subcache state is unchanged and data is written to the subcache. If the subpage is subcached in read-only state it is immediately invalidated. The CEU supplies the data to the local cache. If the cache does not have the subpage in an exclusive-ownership state, it requests it from the interconnect.
    If the descriptor.no_write flag is set, an error is signalled to the CEU which generates a page_no_write exception. Otherwise, the CEU data is written directly to the subpage in the cache.
instruction fetch   Instruction fetches always fetch subpages specifying read-only state.

Subpage Atomic state Instructions

The subpage atomic instructions are the program interface to the get and release operations described above. These instructions exist in several forms to permit precise tuning of parallel programs.

get subpage [gsp.nwt]
get subpage & wait [gsp.wt]
    Get subpage requests that a subpage be set into atomic state. For both forms of the get subpage instruction, if the subpage is not in atomic state in any cache, then the local cache acquires it in atomic state.
    For gsp.nwt, the @MEM condition code indicates the success or failure of the attempt; the instruction will trap instead of -continued changing @MEM if the trap option
is present in the instruction
and the subpage is already
atomic.
The gsp.wt instruction form
causes the cache to stall the
CEU until the subpage can be
obtained in atomic state. This
reduces the amount of
interconnect traffic if the
program must obtain atomic state
before it can proceed. If the
subpage is already atomic in any
cache (including the local
cache), the instruction waits
until the subpage is released.
The local cache then acquires
the subpage in atomic state.
The @MEM condition is always
changed to indicate success
release subpage [rsp]
Release subpage is used to
remove a subpage from atomic
state. If the subpage is not
present in the local cache, it
is first requested in via the
interconnect. Once the local
cache has exclusive ownership,
rsp proceeds. If the subpage is
not in atomic state then release
subpage does not change the
subpage state. In this
situation, the CEU will trap if
the trap modifier is present for
the instruction. If the subpage
is in atomic state, it is
changed to exclusive state. If
the subpage is in
transient-atomic state, it is
changed to exclusive state and
expelled onto the interconnect
so that any waiting cell may
acquire atomic state.
Other Subpage Instructions
Post Store Subpage[pstsp]
Post-store subpage allows the
program to expel a read-only
copy of a subpage onto the
interconnect. All caches with
descriptors for the page will
take a copy of the data. This
instruction can be used to
broadcast data as part of
completing some operation,
reducing the probability that
some other cache will have to
make a read request on the
interconnect when it needs to
use the data.
Prefetch Subpage [pcsp]
Prefetch Subpage requests that a
copy of a subpage be acquired on
the local cache in a specified
state. The instruction can
request read-only or exclusive
state. A subsequent reference
to the subpage blocks until the
prefetch subpage has completed.

'Manual' Control of the Memory System

As described above, the memory system is designed to support a virtual memory system with automatic data sharing and LRU maintenance. However, software can take explicit control of the memory system for special applications.

In normal use, all processors share SVA space, and data automatically moves from cache to cache in response to instructions (and control operations). Software can dedicate some or all of the memory on a cache to its local, unshared use. Such a system must partition SVA space among the caches, and use explicit control operations to move such data from cache to cache.

By setting descriptor.held in every descriptor, system software can prevent the cache from ever moving or destroying a page to make room for another page. The system software can then handle exceptions or perform explicit destroys as needed to multiplex each cache's memory.

In automatic mode, the memory system can configured as a shared memory multiprocessor. When various automatic features are disabled, the memory system can be configured to emulate more loosely coupled message-oriented architectures. Messages can be passed by references to special SVA ranges. Manual control of the memory system can be used to enforce a specific memory model more closely.

Memory System Control Instructions

Control operation permit the processor to directly manipulate the memory system. There are two classes of control instructions: data movement and page state control. The data movement control instructions move pages and subpages of data from cache to cache in the hierarchy. The page state control instructions manipulate page descriptors.

CEU instructions result in cache commands which execute synchronously or asynchronously, depending upon the command. A CEU cache instruction occupies an entry in the cache PRT (a hardware table) while it is in progress. The PRT has four entries, so a maximum of four cache instructions may execute in parallel. Most CEU instructions result in assignment of a PRT entry which remains in use until the request is satisfied, providing synchronous behavior. For example, load/store instructions execute synchronously, so that certain software-controlled exceptions (such as missing page or unwriteable page) can be predictably resolved. The pcsp (prefetch-cache-subpage) and pstsp (post-store-subpage) instructions operate asynchronously, as described in following subsections.

Synchronous errors typically result in the CEU executing the trap sequence.

Asynchronous errors result from actual hardware errors or are provoked by a request from some other cache. Such errors are reported by memory-system interrupts.

Prefetch Instruction

The prefetch instructions request that a copy of a subpage be acquired on the local cache in a specified state. Pcsp prefetches a subpage. The cache allocates a PRT entry when this instruction is detected. If the subpage is already present, the PRT entry is freed and the pcsp completes. Otherwise, the cache issues a request, and then indicates instruction completion to the CEU, which proceeds asynchronously. When the message returns as a request or response, the cache accepts data (if present), and frees the PRT entry. There is no indication to the CEU that the data has arrived.

Post-Store Subpage Instruction

The pstsp instruction requests that a copy, of a subpage be circulated on the interconnect so that any caches having a descriptor for the containing page may acquire a read-only copy of the subpage. pstsp references a subblock within a subpage. If the subblock is subcached with exclusive state and is modified in the subcache, the CEU requests a post-store action from the local cache; otherwise, the pstsp instruction has no effect. The cache allocates a PRT entry, and requests the subpage data from the CEU. The cache then submits the post-store message to the interconnect, frees the PRT entry, and indicates instruction completion to the CEU. The CEU proceeds asynchronously. When the message returns to the issuing cache, it is discarded.

Fetch Subpage Instruction

The mfsva instructions permits system software to fetch a subpage in read-only or exclusive-ownership state, specifying the SVA location of the subpage. This saves system software the effort of establishing a DSTT translation, as is required by pcsp.

Flush Subcached Subpage Instruction

The mflsp instruction causes the cache to ensure that the specified subpage is not subcached in the local CEU. If the subpage is in invalid-descriptor state or invalid state, no descriptor is allocated and the subpage is not requested via the interconnect.

Recombine Subpage Instruction

The mrcsp instruction allows system software to reduce the number of active descriptors for a page by causing ownership to migrate to another cache. Unlike the background recombine activity of the cache, this instruction is not controlled by cache configuration parameters.

The page state control instructions operate on individual pages of SVA space.

Anchor Descriptor Instruction

The mpsa instruction provides an anchored descriptor in the local cache for an SVA page. If the descriptor already existed prior to the mpsa, its anchor flag is set. Otherwise, the cache allocates a descriptor and then sets the anchor flag. Page state control operations require that an anchored descriptor for the SVA page be present on the local cache.

Write Descriptor Instruction

The mpdw instruction is used to create and destroy SVA pages, and to change descriptor flags of existing SVA pages. mpdw requires that system software first obtain an anchored descriptor for the page, using the mpsa instruction. The following discussion assumes that an anchored descriptor exists on the local cache.

Creating an SVA Page

Following the mpsa, the descriptor exists, but all subpages are in invalid state. System software executes mpdw specifying that all subpage states should be set to exclusive. This causes a message to be sent on the interconnect so that any interested ring members may note the creation of the page.

The SVA page now exists, although its data values are undefined. Software must initialize the page using store instructions or I/0 before allowing the user to reference the page. For this reason, software will typically create a page at an SVA location inaccessible to user programs, initialize the page data, and then change the address of the SVA page as described below. The page is released for general use by executing an mpdw instruction which clears the anchor.

Destroying an SVA Page

After the mpsa, system software must obtain all subpages in exclusive state. This is done using mfsva instructions. Software then executes mpdw specifying that all subpages should be changed to invalid state. This instruction causes a message to be sent on the interconnect so that any interested ring members may note the destruction of the page. The SVA page is destroyed by this operation. Software releases the descriptor for reuse by executing a second mpdw which clears the anchor.

Change Descriptor Fields

The mpdw instruction is used to change various fields in a local descriptor. It can set or clear the modified, atomic_modified, no_write, no_atomic, and held fields and can clear the anchor field. mpdw can also change the tag, and thus the SVA space address associated with the descriptor. (Since the index of the descriptor forms part of the SVA, the new tag is in the same cache set, by definition.)

To ensure memory system consistency, system software must obey certain rules when altering the fields or tag of a descriptor. mpdw requires that descriptor.anchor be set (although the instruction itself may result in clearing descriptor.anchor). Various sequences require that all subpages be present in the local cache with an exclusive-ownership state. This is accomplished by setting descriptor.anchor and executing mfsva.ex for each subpage. Various sequences require that all subpages be unsubcached in the local cache. This is accomplished by executing mflsp for each subpage which might be subcached in the local CEU. (Executing mfsva.ex ensures that a subpage is not subcached in by the CEU of any other cell.)

The following list give the restrictions which are in force for each flag and the tag.

(1) anchor is set and typically cleared as part of any descriptor tag or flag modification. It may be left set for any duration, but in a shared-memory system, it is cleared as soon as possible.
(2) held can be modified to hold or unhold a descriptor on a particular cell without restriction.
(3) changing atomic_modified and no_atomic requires that all subpages be in an exclusive-ownership state in the local cache.
(4) clearing modified and setting no_write require that all subpages be in unsubcached in the local cache. This ensures that the local subcache does not have any subblock in exclusive state nor does it have any modified subblock. When changing modified no_write, system software may decide whether or not the change should be perceived by all cells which reference the page. Effecting a global change requires that all subpages be in an exclusive-ownership state in the local cache. System software will typically make a global change when it clears the modified flag. Effecting a local change does not require that any subpage be present in an exclusive-ownership state; however, this results in delayed perception of the new state.
(5) changing the SVA page number by changing the tag requires that all subpages be in an exclusive-ownership state and unsubcached on the executing cell.

Changing single bit fields is accomplished with a single mpdw.desc instruction. This instruction contains the new value of the changed flag, the old values for the other flags and the tag. Unless system software has some special reason to keep the page anchored, it clears the anchor flag.

Changing the SVA page number of a descriptor is logically the same as destroying the old page and then creating a new page which happens to have the same data. The sequence is:

(1) anchor a descriptor for the old SVA page and obtain each subpage in an exclusive-ownership state. If any subpage has atomic or transient-atomic state, it will be acquired by the executing cell. Once all subpages have been acquired, any access to the old SVA page will take a missing—page fault.

(2) determine the atomic state of each subpage. This is most rapidly accomplished by executing gsp.nwt on each subpage, and examining the resulting @MEM indicator. Any cell which already executing a gsp.wt for a subpage of the old SVA will eventually take a timer interrupt; when the gsp.wt is restarted, it will take a missing—page fault.

(3) use mpdw.alli to change all subpages to invalid state. This instruction causes the local CCUs to inform the local CIUs and the RRC (if any) that the SVA page is being destroyed. Even though all subpages are changed to invalid state, the data remains in the local CCUS.

(4) use mpdw.desc to change the tag and set flags to desired state. The new anchor flag must be set.

(5) use mpdw.allx to change all subpages to exclusive state. This instruction causes the local CCUs to inform the local CIUs and the RRC (if any) that an SVA page is being created. The old data is now perceived to be present in exclusive state.

(6) restore saved atomic state of each subpage. For each subpage which was in atomic state, issue a gsp.nwt.

(7) use mpdw.desc to clear the anchor flag.

The uses of descriptor.no—write include: prevention of inadvertent modification of certain data; support for copy—on—write/copy—on—access protocols; debugger watchpoints. In the first case, no—write is set and remains set. In the second case, when a program attempts to modify a page, system software can respond by making a copy of the page available to the other users and then clearing no—write. Software can make this change local or global; in the former case, no—write faults may continue to occur on other cells which reference the page. Finally, debugger watchpoints are intended to detect the modification of a particular region of context address space, e.g., find out where a global variable is being destroyed. System software can implement this by setting no—write for the page, and trapping every modification attempt. For modifications outside the watched range, system software can anchor the page, clear no—write, modify the data, unsubcache the data, set no—write, and proceed. It is also possible to implement watchpoint support by making global changes to no—write.

Find Page Local—LRU Lookup Instruction

The mfpl instruction searches a specified set in the LRU space of the cache for a descriptor that matches a specified set of criteria. The search begins with the descriptor at LRU position 15, and proceeds upward until the criteria are met.

Instruction and Data System Address Space Split

To ensure correct operation, the cache must know when a subpage is also present in a CEU subcache. This permits the cache to request subcache invalidation when some request from the interconnect (or even the local CEU) requires a subpage state change.

As part of this mechanism, the CEU communicates with the cache when it changes subcaching status. However, the cache does not maintain per-subcache information. As a consequence, the same subpage of SVA space must not simultaneously appear in both subcaches. In general, this results in a system software restriction that the same SVA region cannot be used as both instructions and data. Self-modifying programs or programs where code and data are part of the same context address segment are not supported.

System software must take special care in the following cases:

(1) changing an instruction, as when inserting or removing a breakpoint
(2) reading an instruction, as part of trap analysis or program disassembly by a debugger
(3) reading a page from an I/O device which will become an instruction page.

To read an instruction as data, system software must:
(1) construct a DSTT entry which describes the SVA
(2) ensure the subpage is not present in the instruction subcache (use mflsp)
(3) read the instruction as data (use ld64.nsc)
(4) invalidate the DSTT entry.

To write an instruction subpage as data, system software must:
(1) construct a DSTT entry which describes the SVA
(2) ensure the subpage is not present in any instruction subcache (use mpsa to anchor the page, and mfsva.ex to invalidate the subpage in all other caches and subcaches)
(3) fetch the containing subblock (use ld64.nsc)
(4) modify the subblock and write the instruction as data (use st64.nsc)
(5) release the page anchor.
(6) invalidate the DSTT entry.

Instruction pages are typically pure and do not need to be written from SVA space to an I/O device as part of system SVA space management. Before writing an instruction page, system software must:
(1) ensure the subpage is not present in any instruction subcache (use mpsa to anchor the page, and mfsva.ex to invalidate the subpage in all other caches and subcaches). If this cell will never execute this instruction page, this step is not required.
(2) perform the I/O
(3) ensure that the page is not present in the data subcache (use mflsp). If this cell will never execute this instruction page, this step is not required.
(4) release the page anchor.

When reading an instruction page from an I/O device into SVA space, system software must:
(1) create the page (use mpsa to allocate and anchor the page, mpdw to complete page creation)
(2) perform the I/O
(3) ensure that the page is not present in the data subcache (use mflsp). If this cell will never execute this instruction page, this step is not required.
(4) clear the descriptor modified flag, set any other descriptor attributes such as subpage atomic state, and descriptor.no—write.

(5) release the page anchor.

RRC Organization and Data Structures

A preferred RRC constructed in accord with the invention is organized into two independent banks, with each bank connected to a single subring. The banks of one to four RRCs are interleaved based on low order page address and the configured degree of interleaving. Interleaving is statically configured during system configuration. An RRC connected to Ring:0 is referred to as RRC:0 and a RRC connected to Ring:1 is referred to as RRC:1.

Figure 19A:
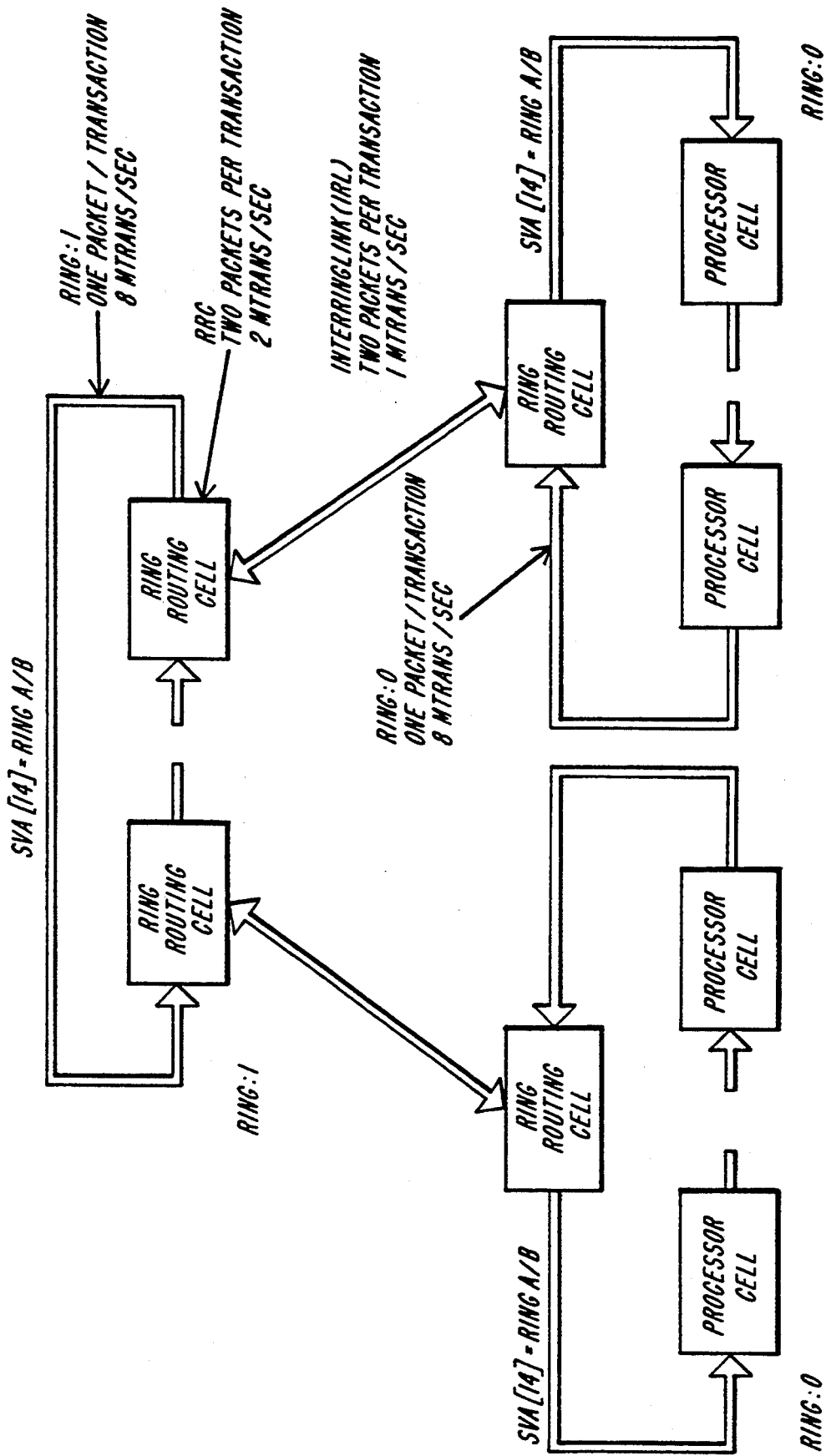
FIGS. 19A–19D depict preferred and alternate ring interleaving embodiments of the invention.

For a single Ring:1 configuration both the RRC:0 and RRC:1 are interleaved based on SVA[14]. FIG. 19a depicts one preferred such configuration.

Figure 19B:
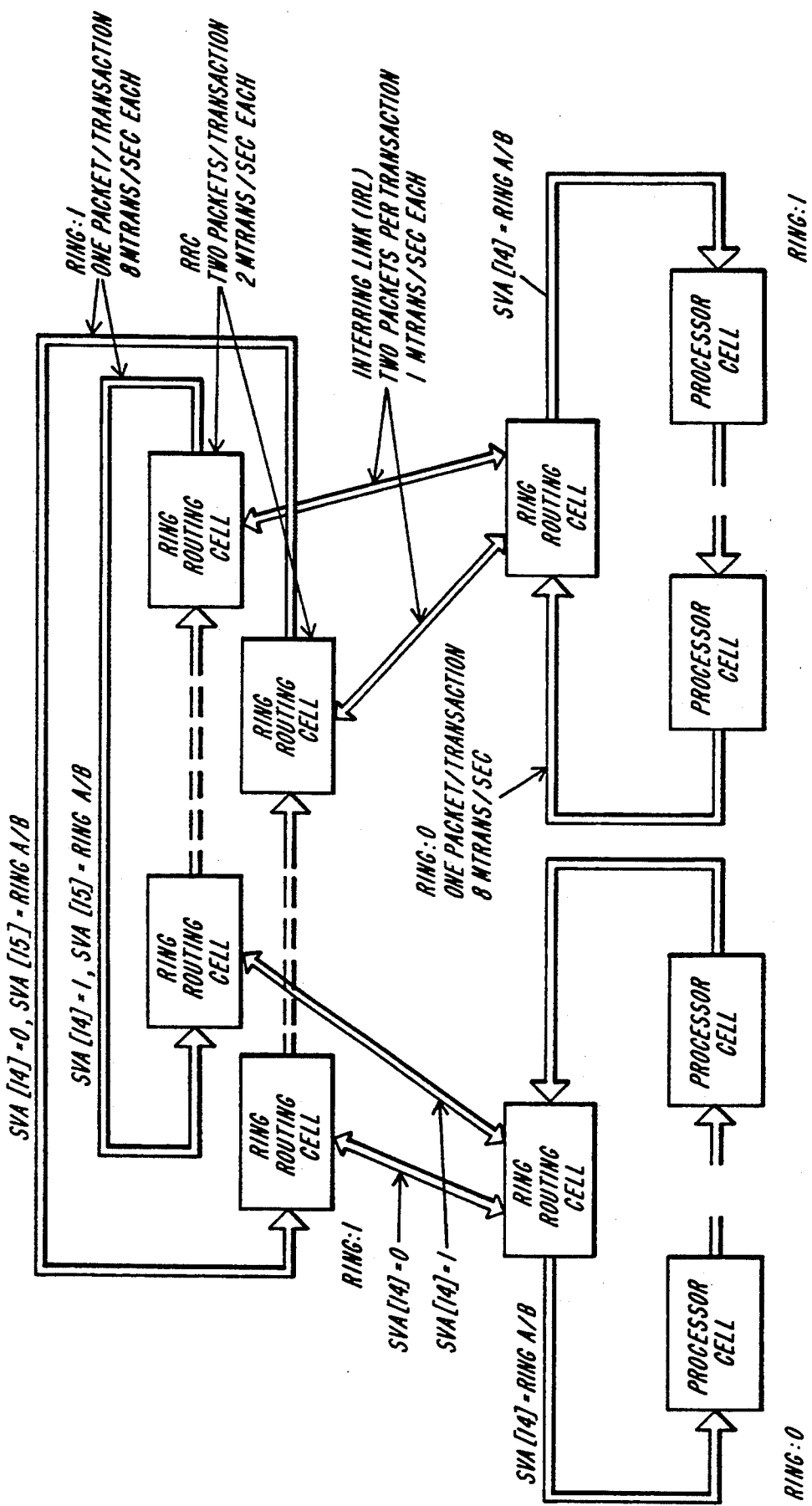

For a dual Ring:1 configuration with one RRC:0 (TwoRing:1/1), the single RRC:0 is interleaved based on SVA[14] and two Ring:1 RRCs are interleaved based on SVA[15:14]. FIG. 19B depicts one preferred such configuration.

Figure 19C:
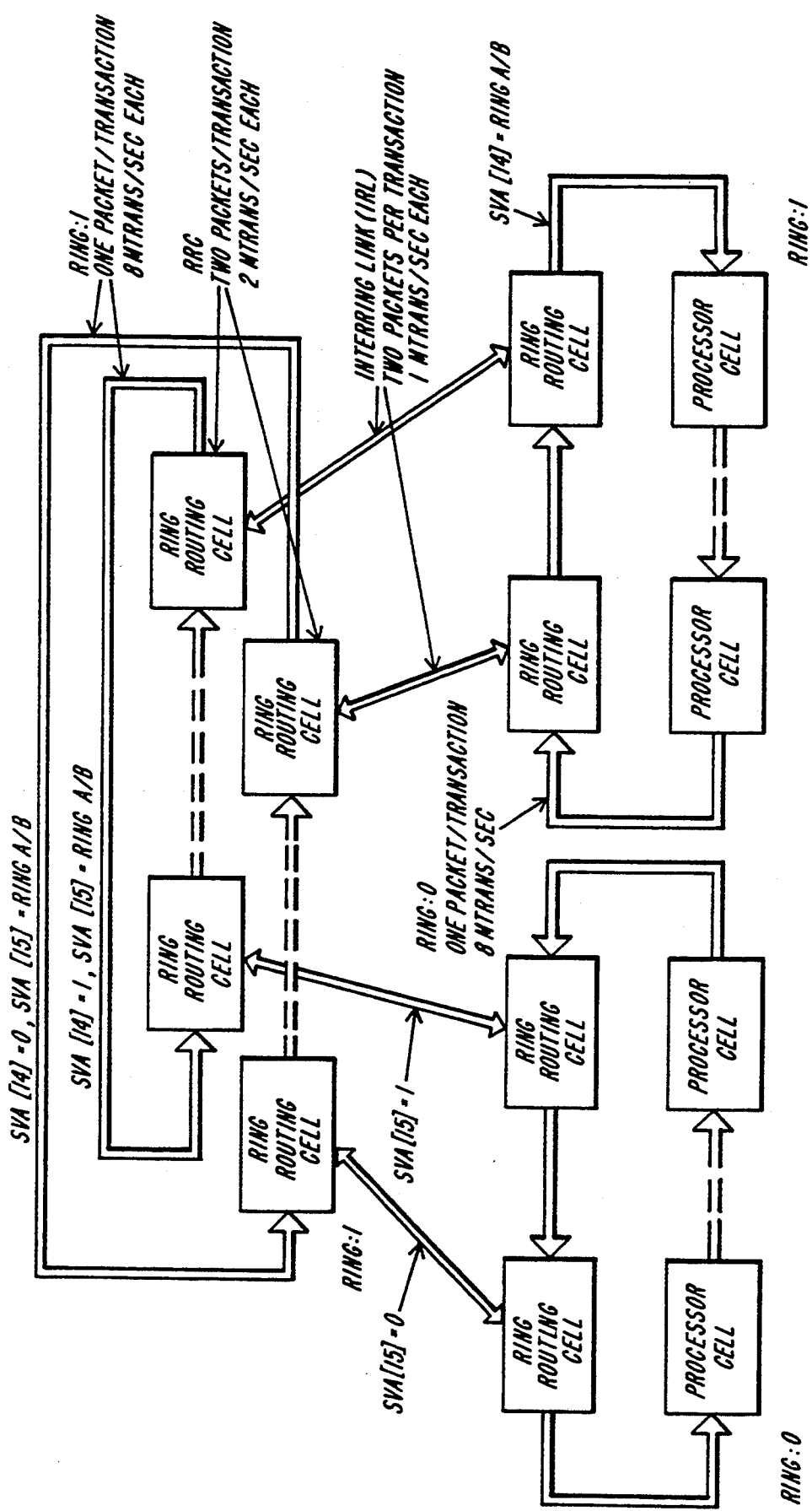

For a dual Ring:1 configuration with two RRC:0s (TwoRing:1/2), the RRC:0s are interleaved based on SVA[15:14] and two RRC:1s are interleaved based on SVA [15:14]. FIG. 19C depicts one preferred such configuration.

Figure 19D:
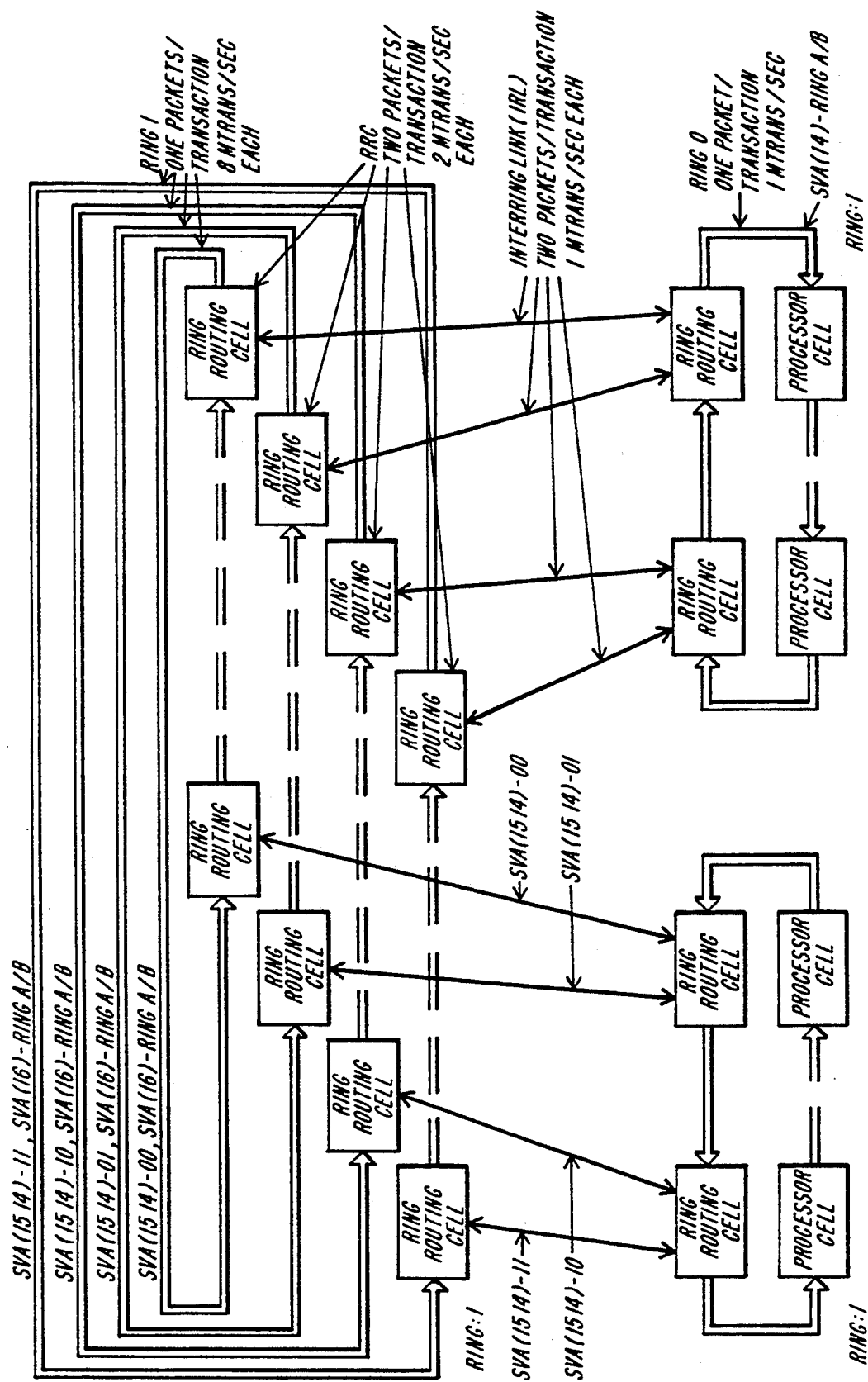

For a four Ring:1 configuration, the two RRC:0s are interleaved based on SVA[15:14] and four Ring:1 RRCs are interleaved based on SVA[15:14]. FIG. 19D depicts one preferred such configuration.

Multiple RRC:0s are on a single Ring:0 for TwoRing:1/2 and FourRing:1 configurations. Multiple RRC:1s are configured on separate Ring:1s for TwoRing:1/1, TwoRing:1/2 and FourRing:1 configurations.

Figure 6:
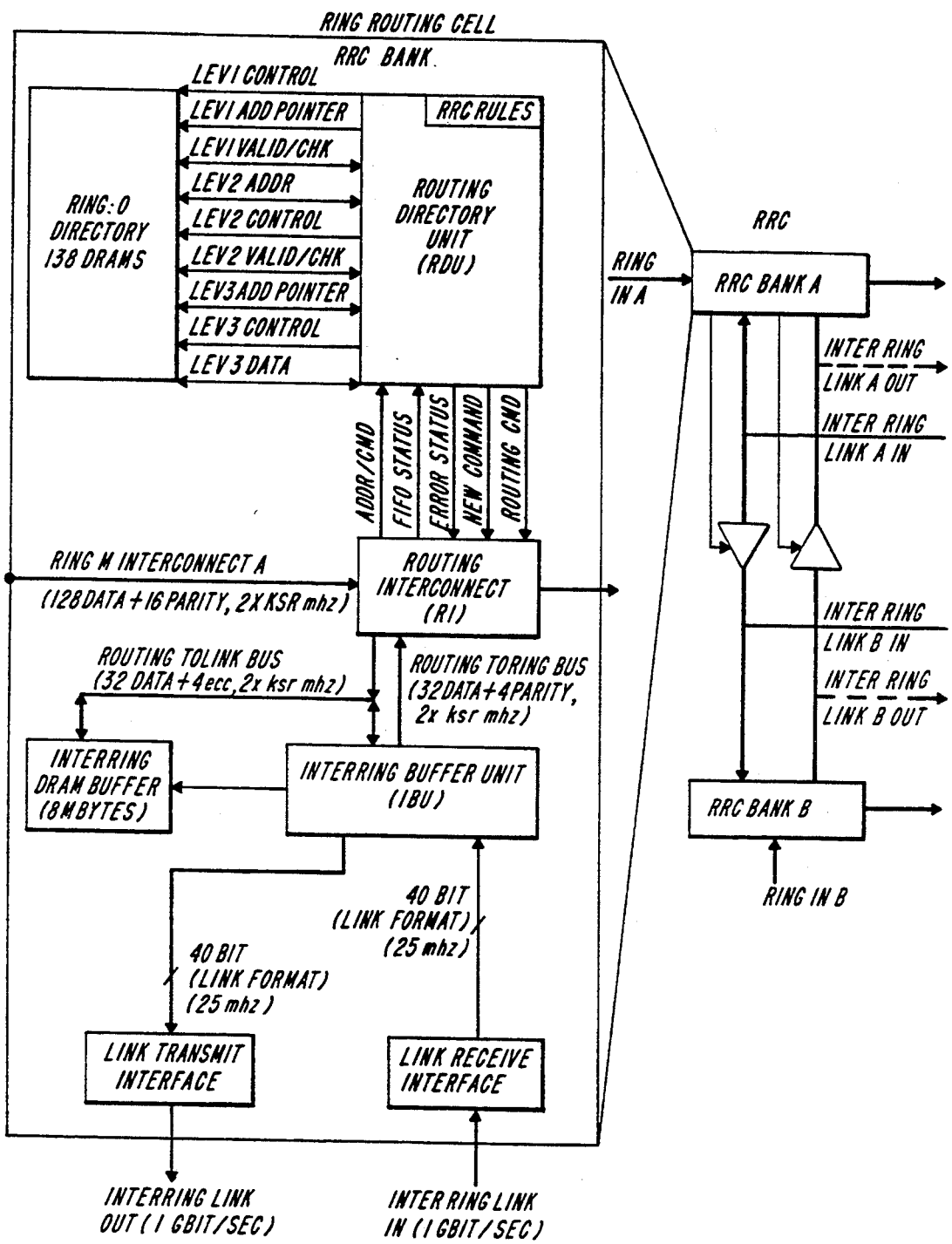
FIG. 6 depicts a preferred ring routing cell constructed in accord with the invention.

FIG. 6 depicts a preferred Ring Routing Cell Pair (RRC Pair or RRCP) constructed in accord with the invention. The pair comprises RRC:0 and RRC:1 which are connected by a single communication line, e.g., bus, optical transmission connection, referred to as the InterRingLink. The downlink RRC is the opposite RRC of an RRC Pair. RRC Pairs which are connected to the same Ring:0 are referred to as an RRC Array (RRC Array). When discussing a cell or a Ring:0, the local RRC or RRC pair are the RRC(s) or RRC Pair(s) which are co-resident on the same Ring:0. A remote RRC or RRC pair are all those RRCs which are not local.

Each RRC bank consists of three sections, Routing Interconnect, Routing Directory and InterRingBuffer. The Routing Interconnect implements the RRC portion of ring interconnect, provides an interface to the Routing Directory and interfaces the ring to the RRC internal RoutingBus by means of insert and extract buffers. The RoutingBus consists of two 32 bit paths. Packets from the extract buffer are transferred to the InterRingDram Buffer or IBU over the RoutingToLink Bus. Packets are transferred from the IBU to the RI insert buffer over the RoutingToRing Bus. The IBU also transfers packets to the InterRingDramBuffer for error logging over the RoutingToLink Bus.

The Routing Directory contains an entry for all allocated pages within the Ring:0 which the RRC pair is connected. The Routing Directory consists of an Routing Directory Unit (RDU) and the actual ram based directory. The RDU controls the directory access sequence and contains the routing rules. For each packet, the Routing Interconnect passes pkt.addr, pkt.command and fifo status to the Routing directory. The Routing Directory returns a routing command, and instructions to update packet command to the Routing Interconnect. Ring related interleaving is specified by RduMasterConfig location.

The InterRingBuffer buffers incoming packets from the Ring Interconnect extract buffer and interfaces to the InterRingLink. The InterRingBuffer consists of the InterRing BufferUnit (IBU), InterRing Dram Buffer (IDB) and InterRingLink Interface. The IDB buffers all packets from the Routing Interconnect until the packet has been transmitted over InterRingLink to the downlink RRC and an acknowledge has been returned. The IDB also contains the RRC ErrorQueue. The IBU buffers and formats outgoing InterRingLink packets, provides error checking and buffer for InterRingLink incoming packets and controls the IDB. The InterRingLink interface converts the 32 bit wide IBU outgoing packet and incoming packet interfaces to or from the physical link format.

RRC banks can be configured to connect to separate InterRingLinks or share a single InterRingLink. In dual InterRingLink configuration, the InterRingLinks are completely independent. In single InterRingLink configuration, both RRC banks share a single InterRingLink. InterRingLinkIn is connected to the IBUs of both RRC banks. The RRC banks arbitrate to share InterRingLinkOut. The IBU interleave configurations and packet address determine which bank incoming packets are routed to.

RRC conforms to the UCS system fault detection strategy. All buses are parity or ecc protected. Parity or ECC is passed through chips, rather than regenerated whenever possible. All dram and large sram data structures are ecc protected. Single bit soft or hard errors are corrected without causing a fatal system error (requires system reboot) and in a software transparent manner if possible. Data links expecting high error rates (InterRingLink) provide software transparent frame level operation. Frame level operation ensures error free transmission of frames, including retransmission when errors are detected.

Routing Interconnect

RI Structure

Figure 7:
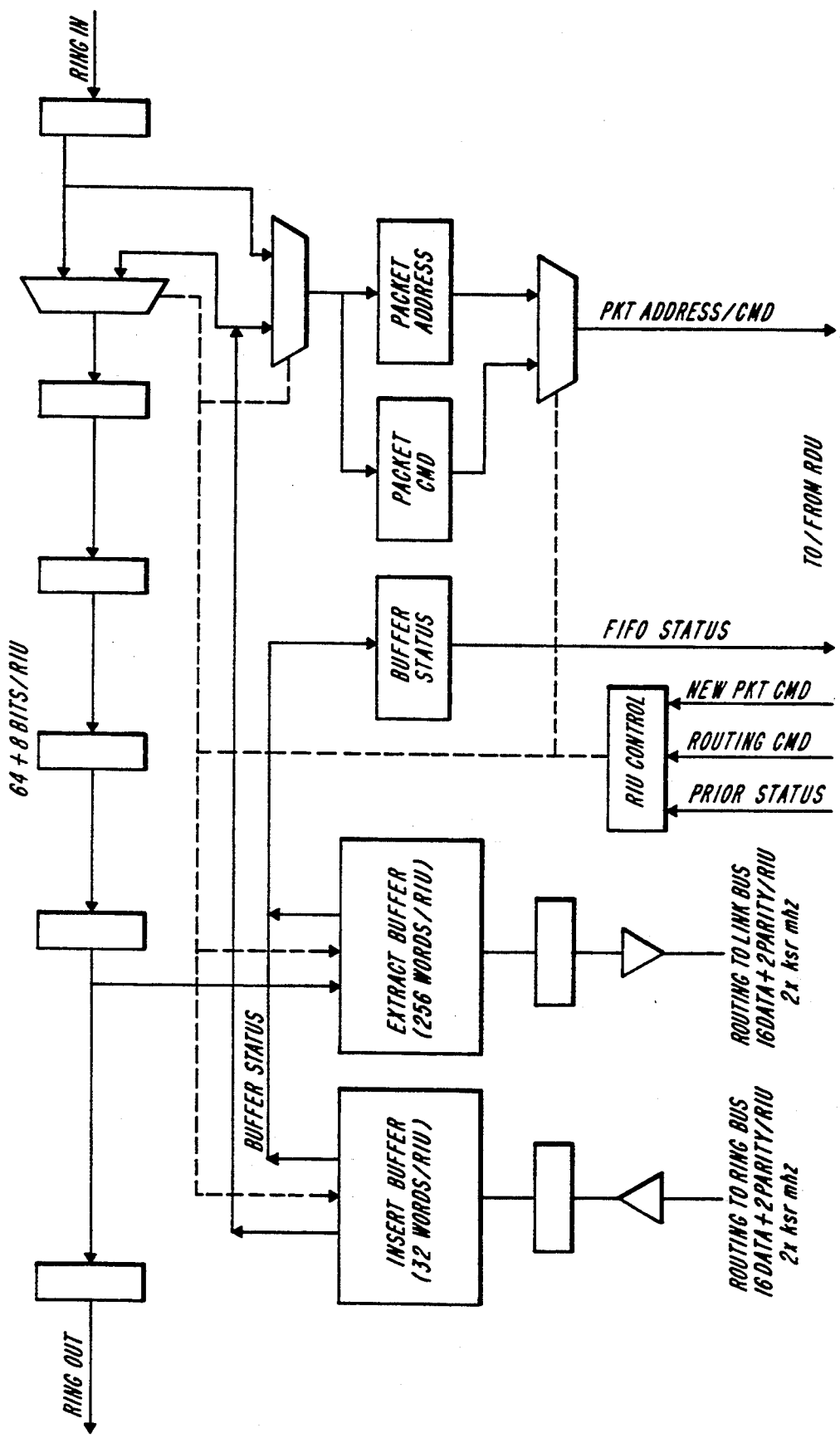
FIG. 7 depicts a preferred ring interconnection unit for a ring routing cell used in practice of the invention.

Each Routing Interconnect (RI) interfaces a RRC bank to a subring, RRC internal Routing Bus and Routing Directory. The RI is implemented as two Routing Interconnect Units (RIUs). A preferred RIU constructed in accord with the invention is illustrated in FIG. 7. Each RIU interfaces to half of 16 byte wide ring and to half of 8 byte wide routing bus. The two RIUs pass the address and command field of packet to Routing Directory and the Routing Directory returns a packet routing command, new packet command and error status.

Each packet consists of ten, 16 byte double words (20 words) while on the ring. Each long packet (contains data) is stored in 9 words in each RIU extract buffer and 10 words in insert buffer. Each short packet (no data) is stored in 1 word in each RIU extract buffer and 2 words in insert buffer. RIU0 and RIU1 interface to RingData[63:0] RingData[127:64] respectively. RIU0 and RIU1 extract buffers interface to RoutingToLink[15:0] and RoutingToLink [31:16] respectively. RIU0 and RIU1 insert buffers interface to RoutingToRing[15:0] and RoutingToRing[31:16] respectively.

The RingIn to RingOut portion of RIU consists of a 6 stage shift register. Packets can be copied or extract from the shift register into the extract buffer and packets from the insert buffer can be inserted into the shift register. The insert and extract buffers are managed with a fifo discipline.

RI Operations

The Ring Interconnect routes from two sources to two destinations. The sources are previous Ring Interconnect and Insert Buffer. Packets from previous Ring Interconnect are referred to as Ring Packets and packets from insert buffer are referred to as Insert Packets. The destinations are next Ring Interconnect and Extract Buffer. Packets going to next Ring Interconnect are referred to as Ring Packets and packets going to extract buffer are referred to as Extract Packets. Insert packets are supplied to the insert buffer and extract packets are sourced from the extract buffer by the Inter-Ring Buffer Unit (IBU).

The address and command fields of the packet are passed to the Routing Directory and the Routing Directory returns a packet routing command. The RI buffers all packets until the packet routing command is available. The assertion of RingEmpty field indicates the Ring packet is empty. Non-empty ring packets are always processed instead of insert packets. If the Ring packet is Empty and the insert buffer is not empty, the next insert buffer packet is processed by the Ring Interconnect.

The command from Routing Directory consists of a packet routing, packet field , extract buffer, and insert buffer commands.

The packet routing commands for all packets are pass and empty. The packet pass command specifies the Ring Interconnect should pass throughout the packet unaltered to the next Ring Interconnect. The packet empty command specifies that the Ring Interconnect empties the packet by setting RingEmpty signal and packet command CmdEmpty field. All packets for which CmdRequestId field match Ring Interconnect CellNumber field are unconditionally emptied, the Routing Directory command is not required. This allows RingEmpty signal to be set earlier than possible when waiting for command from Routing Directory.

The extract buffer commands are no_push and push. The no_push command specifies that the extract buffer does not store the current packet. The push command specifies that the current ring packet is copied into the extract buffer.

The insert buffer commands are no_pop and pop. The no_pop command specifies that the top insert buffer packet has not been inserted. The pop command specifies that the insert buffer top packet has been processed and is popped.

The packet field command specifies which outgoing packet command fields are modified. The packet command fields which can be modified are shown in the following table. All fields, except pkt.Freeze are within pkt.command[31:0].

| Packet Cmd Field | Command Description |
|---|---|
| Freeze | Pass, clear or set |
| Invalid | Pass, clear or set |
| Pcopy | Pass, clear or set |
| Timestamp | Pass or clear from rules set if RingMaster |
| InvalidatorBusy | Pass, clear or set |
| ResponderBusy | Pass, clear or set |
| InvalidateLookahead | Pass, clear or set |
| ITC | Pass, clear or set |
| RRCFault | Pass or set |
| SpaAddrError | Pass or set |
| MarkedFault | Pass or set |
| UnMarkedFault | Pass or set |

A packet is extracted by an empty packet routing command and push extract buffer command. A packet is copied by a pass packet routing command and a push extract buffer command.

Extract Buffer Management

The extract buffer holds a combination of short (2 words) and long (18 words) packets which equals 512 words. This yields a maximum of 28 long, or 256 short or a combination of long/short packets. An extract buffer management flow control algorithm is required since the peak subring packet rate exceeds the rate the IBU can empty the extract algorithm. The control algorithm is based on the principle of maximizing forward progress in conjunction with reducing system loading. Prioritizing the allocation of system resources to completing requests in progress achieves both of these goals since completing a request simultaneously reduces system loading and achieves most efficient forward progress. The control algorithm is based on categorizing packets and using the Ring flow control mechanisms.

Empty space in Ring Extract Buffer is divided into four regions by two configurable pointers, ExtractAll-Threshold and ExtractRspThreshold. The current region is selected by the number of empty words remaining in the Extract Buffer. The regions going from empty to full are: ExtBuf:All, ExtBuf.NonOpt, ExtBuf:PendReq and ExtBuf:Full. Extract Buffer State is maintained on a per RRC bank basis. The boundaries of these regions are configurable by software. Ring packets are grouped into three utually exclusive categories for Extract Buffer management:

| | |
|---|---|
| 1) Optional Packet | The following remotely originated packets are optional from a coherency point of view:<br>- Recombine with Pend1:None and SpState:{Inv\|Ro}<br>- Duplicate.data with no read only copy of subpage within the local Ring:0<br>- sva_read_ro.data with no read only copy of subpage within the local Ring:0 |
| 2) NonOptional Packet | Must be extracted based on SpState to complete a remotely originated request. Does not include optional packets. |
| 3) Response packet | A locally originated packet or a packet which satisfies a RRC pending request (RRC:0 Pend{1,2,3}, RRC:1 Pend{1,2,3,4,5}). |

These packet categories are handled in the four extract buffer regions as follows:

| Region | Optional Packet | NonOptional Packet | Response Packet |
| --- | --- | --- | --- |
| ExtBuf:All | accepted | accepted | accepted |
| ExtBuf:NonOpt | pass | accepted | accepted |
| ExtBuf:PendReq | pass | pass and assert RspBsy,InvBsy | accepted |
| ExtBuf:Full | pass | pass and assert RspBsy,InvBsy | pass, see text |

In ExtBuf:All region, between empty and ExtractAllThreshold, all packets which would normally be copied into the extract buffer are copied. Within ExtBuf:NonOpt region, between ExtractAllThreshold and ExtractRspThreshold, all non-optional and response packets which would normally be copied into the extract buffer are copied. All optional packets are passed. The extract buffer and RRC sheds optional load as it becomes more fully subscribed. Within the ExtBuf:PendReq region, between ExtractRspThreshold and full, only packets relating to RRC pending request are accepted. All optional packets and non-optional (includes new incoming requests) packets are busied by assertion of responder busy (rsp_busy) or invalidator_busy (inv_busy). The RRC sheds both optional load and new requests to relieve the overload situation.

If the extract buffer is full, the RIU will pass optional packets, assert responder busy or invalidator_busy to non-optional requests. If the packet is a response to a request originated by this RRC, then the packet is left on the ring and pkt.cmd.timestamp field is cleared. Since only packets relating to RRC pending requests are accepted in the third region the packet will be copied on the subsequent traversals(s) around the Ring. The fact that the packet is on its second revolution is transparent to all cells within the Ring. If the packet not the response to an request originated by this RRC, but a packet that will satisfy the pending request (snarf), the pending request state is transitioned to Pend4:Reissue state.

Routing Directory

Routing Directory Organization

The Routing Directory consists of an Routing Directory Unit (RDU) and the actual ram based directory. The RDU controls the directory access sequence and contains the routing rules. The preferred implementation of the rules hardcodes SPA rules and allows SVA rules to be loaded during RRC initialization.

Figure 8:
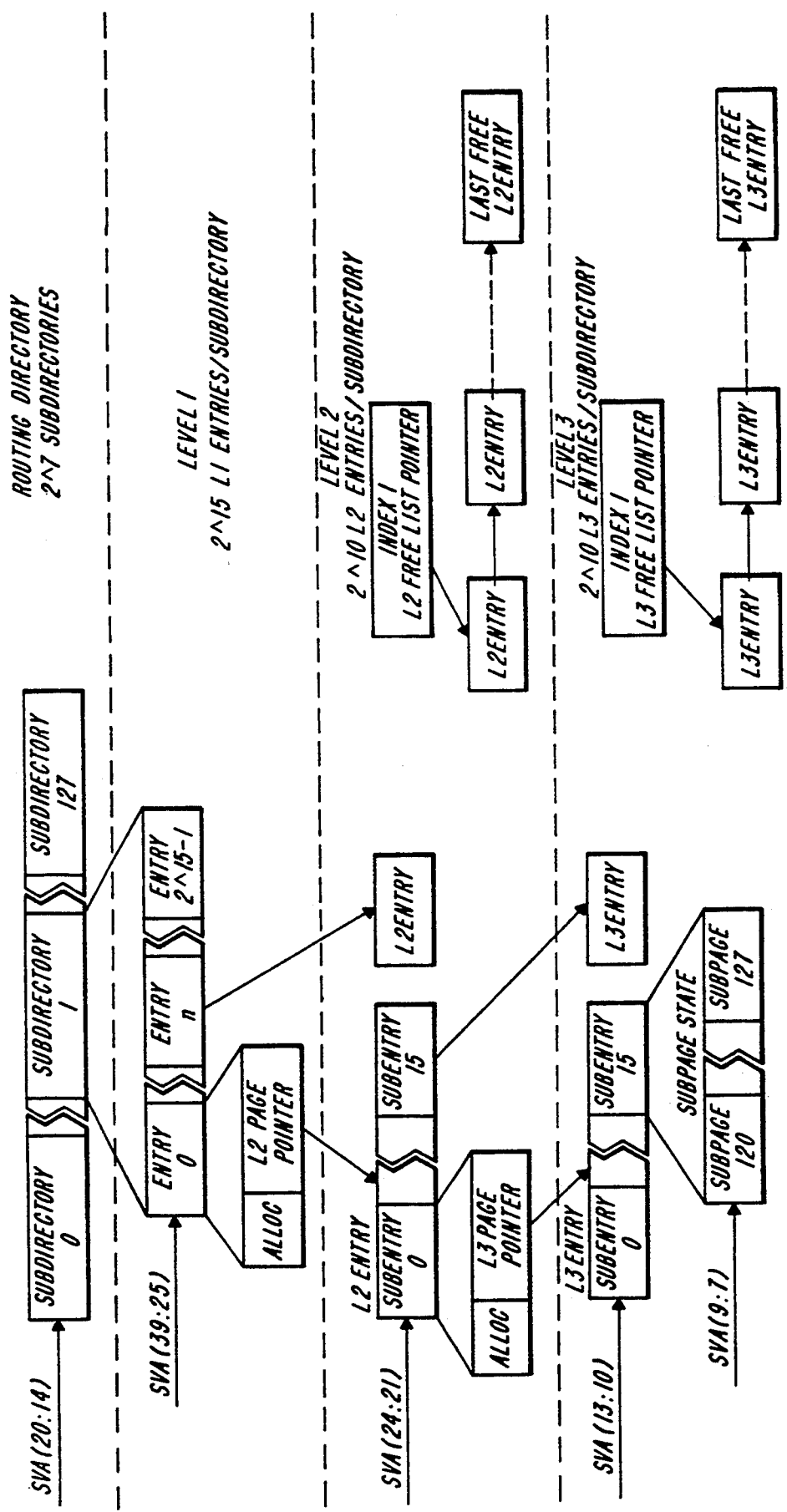
FIGS. 8, 9 and 9A depict the organization of a routing directory constructed in accord with a preferred practice of the invention.

FIG. 8 depicts the organization of a Routing Directory constructed in accord with a preferred practice of the invention. The Routing Directory contains an entry for all allocated pages within the Ring:0 which the RRC pair is connected. A single routing directory entry is required for SVA pages allocated in more than a single Local Cache. The Routing Directory is organized as a three level btree for each of 128 subdirectories. A subdirectory contains an entry for all allocated pages within a single Local Cache set, as specified by SVA[20:14]. A subdirectory can describe a maximum of $2^{10}$ pages, which supports a maximum of 64 Ring:0 Cells. Each Cell's Local Cache contains 128 sets, each set containing 16 pages.

Ring:0 subrings are normally configured to interleave subpage transfer based on cache set 1sb, SVA[14]. Thus half of the Routing Directory can be associated with each Ring:0 subring (Ring:$0_A$, Ring:$0_B$).

The L1Entry is indexed by SVA[39:25]. An L1Entry is statically assigned to each $2^4$ pages within a set. Each valid L1Entry specifies a pointer to a dynamically allocated L2Entry. A maximum of $2^{10}$ L2Entries are available. Unallocated L2Entries are organized into a singly linked free list. The Index$_i$ L2Free List Pointer points to the first L2 free list entry. Each L2Entry in free list contains a pointer to the next L2Free list entry. The last L2 free list entry contains a null pointer. Each L2Entry contains 16 subentries. Each valid L2Subentry contains a pointer to a dynamically allocated L3Entry. A maximum of $2^{10}$ L3Entries are available. Each L3Entry describes a single page. Unallocated L3Entries are organized into a singly link free list. The Index$_i$ L3Free List Pointer points to the first L3 free list entry. Each L3Entry in free list contains a pointer to the next L3Free list entry. The last L3 free list entry contains a null pointer. Each L3Entry consists of 16 L3Subentries, each of which describe subpage state for eight subpages.

Routing Directory Structure

FIG. 9 depicts the structure of a Routing Directory constructed in accord with a preferred practice of the invention. The Routing Directory is physically organized into L1, L2 and L3 tables for each subring. The L1 Table is addressed by concatenation of SVA[20:14] (set number) and SVA[39:25] (indexl). SVA[39:25,20:14] is referred to as index1. Each L2Entry consists of a L2subentry and L2V. The L2subentry is addressed by a concatentation of SVA[20:14], L1Table[indexl].l2ptr and SVA[24:21] (index2). The L2V is addressed by concatenation of SVA[20:14] and L1Table[indexl].l2ptr . The L2V field is interpreted as level2 subentry valid field if the L2Entry is valid and is interpreted as level2 NextFree list entry pointer if L2Entry is invalid. Each L3Entry consists of a L3subentry and L3Valid. The L3subentry is addressed by a concatenation of SVA[20:14], L2Table.l2sub[index2].ptr and SVA[13:10] (index3). An individual subpage state is addressed by a concatenation of SVA[20:14], L2Entry.l2sub[index2].ptr, SVA13:10] and SVA[9:7] (indexsp). The L3V field is interpreted as level3 subentry valid field if the L3Entry is valid and is interpreted as levels NextFree list entry pointer if L2Entry is invalid.

A c-like description of the table structure of one bank is shown below.

```
struct      L1Entry L1Table[2 ↑ 21];
struct      L1Entry {
            unsigned        *l2ptr          :10;
            unsigned        l1valid         :1;
            unsigned        l1check         :5;
            };
struct      L2Entry         L2Table[2^16];
struct      L2Entry {
            L2subentry      l2sub[16];
            L2V             l2v;
            };
struct      L2subentry {
            unsigned        *l3ptr          :10;
            unsigned        check           :5;
            };
struct      L2Valid {
            unsigned        l2valid         :16;
            unsigned        check           :5;
            };
struct      L2Invalid {
            unsigned        *NextFree       :11;
            unsigned        unused          :5;
            unsigned        check           :5;
            };
union       {
```

-continued

```
            L2Valid        Valid;
            L2Invalid      Invalid;
            }L2V;
struct      L3Entry        L3Table[2^16];
struct      L3Entry {
            L3subentry     l3sub[16];
            L3V            l3v;
            };
struct      L3subentry {
            unsigned       SpState[8]      :8;
            unsigned       check           :8;
            };
struct      L3Valid {
            unsigned       l3valid         :16;
            unsigned       PagePend        :1;
            unsigned       created         :1;
            unsigned       OwnerLimit      :1;
            unsigned       DupLimit        :1;
            unsigned       check           :5;
            };
struct      L3Invalid {
            unsigned       *NextFree       :11;
            unsigned       unused          :7;
            unsigned       check           :5;
            };
union       {
            L3Valid        Valid;
            L3Invalid      Invalid;
            } L3V;
```

Figure 10:
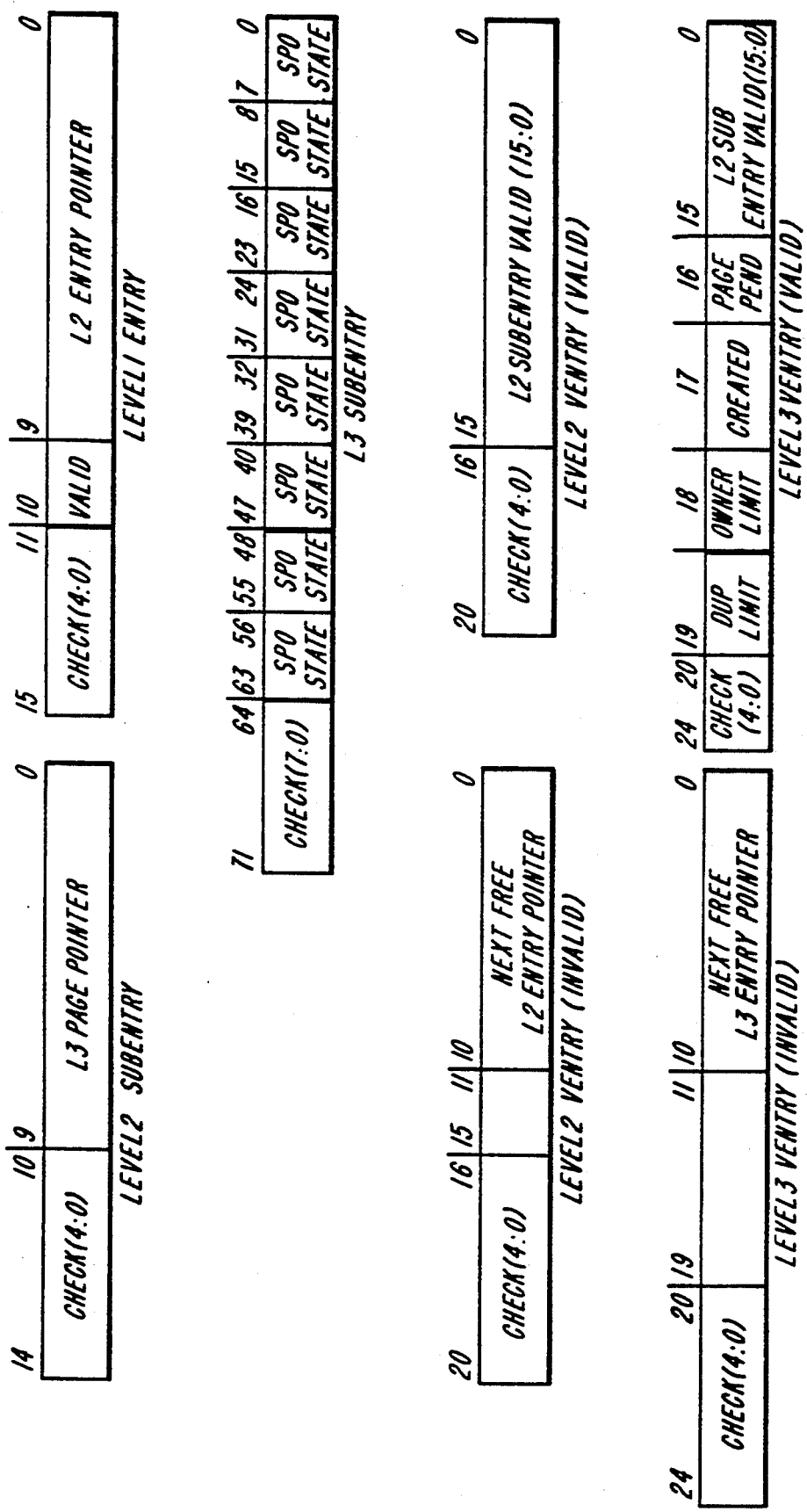
FIG. 10 depicts a format of routing directory entries used in a preferred practice of the invention.

FIG. 10 depicts formats of Routing Directory entries in a preferred ring routing cell constructed in accord with the invention.

Level1 Entry

L1Entry contains a L2Entry pointer (l2ptr), L2 pointer valid bit (l1 valid) and L1 check bits (l1check). The l2ptr is used to address L2Entry as described above. L1valid set indicates a valid l2ptr and clear indicates an invalid l2ptr. L1check consists of a 5 bit single bit correct and double bit detect ECC code.

Level2 Subentry

L2Subentry contains a L3Entry pointer (l3ptr) and L2 check bits (l1check). The l3ptr is used to address L3Entry as described above. L2check consists of a 5 bit single bit correct and double bit detect ECC code.

Level2 VEntry

The L2VEntry has two formats, one for use as L2VEntry (L2V.Valid) and the second if part of L2 free list (L2V.Invalid). L2V.valid consists of an array of 16 valid bits and 5 ecc check bits. L2V.valid.l2valid[n] set indicates a valid L2Subentry[n] and clear indicates an invalid L2Subentry[n].

L2V.invalid consists of NextFree L2 entry, unused field and ecc check field. L2V.invalid.NextFree is used to address the next L2 free list entry. NextFree high order bit clear indicates a null pointer.

Level3 Subentry

L3Subentry contains 8 subpage state fields pointer (L3Subentry.SpState) and check bits (L3Subentry.check). L3Subentyr.check consists of a 8 bit single bit correct and double bit detect ECC code.

Level3 VEntry

The L3VEntry has two formats, one for use as L3VEntry (L3V.Valid) and the second if part of L3 free list (L3V.Invalid). L3V.valid consists of an array of 16 valid bits, created, OwnerLimit, PagePend and ecc check field. L3V.valid.l3valid[n] corresponds to L3Subentry[n] and is a function of L3V.created:

| l3valid[n] | created | L3Subentry[n]           |
|------------|---------|-------------------------|
| 0          | 0       | all subpages invalid    |
| 1          | 0       | use actual subpage state|
| 0          | 1       | all subpages exclusive  |
| 1          | 1       | use actual subpage state|

L3V.valid.OwnerLimit is set or cleared by software to limit ownership of subpages within the page to the Local Ring:0. When clear, specifies that any Ring:0 can own the subpages. When set, specifies that only cells within the Local Ring:0 can own subpages in nonexclusive, exclusive, atomic or transcient atomic states. Remote Ring:0s can receive read only copies. A page fault is signalled by the RRC to ownership requests when OwnerLimit is set. Recombine requests will not propagate beyond Local Ring:0 when OwnerLimit is set. Cleared during RRC descriptor allocation.

L3V.valid.PagePend indicates that an RRC page deallocate sequence is in progress when set.

L3V.invalid consists of NextFree L3 entry, unused field and ecc check field. L2Vinvalid.NextFree is used to address the next L3 free list entry. NextFree high order bit clear indicates a null pointer.

Routing Directory Operations

There are eight possible RRC routing directory operations. These operations occur within a single packet time. All packet types cause a single operation to execute.

Level1 Miss lookup operation
Level2 Miss lookup operation
Normal lookup operation
Deallocate Level3 Subentry
Deallocate Level2 Subentry
SPA Access
Refresh

SVA Look-up Operations

All Lookup Operations proceed through five steps, subdirectory selection, Level1 table lookup, Level2 table lookup, Level3 table lookup and Level3 subpage state modification. The level2 and level3 entries might be required to be allocated in order to complete lookup operation.

Normal Lookup Operation

A normal lookup operation occurs when the Level 1 table indicates that the level2 entry is valid and the Level2 table indicates that the level3 entry is valid.

The L1EntryAddr,L2EntryAddr and L3EntryAddr are calculated as described under Routing Directory Structure. L1EntryAddr→l1valid being set indicates the level2 pointer is valid. The concatenation of SVA[20:14] and L1Entry[index1].ptr specifies the L2Entry, since the subdirectory is implied by the 10 bit pointer. The level2 subentry (L2EntryAdrr-l2sub[index2]) is indexed by SVA[24:21]. L2Entry.l2v[index2] being set indicates the level3 pointer (L2EntryAdrr-l2sub[index2].ptr) is valid. The concatentation of SVA[20:14] and L2Entry[index2].ptr specifies the L3Entry, since the subdirectory is implied by the 10 bit pointer. The level3 subentry (L3EntryAdrr-l3sub[index3]) is indexed SVA[13:10]. Each level3 subentry contains subpage state for eight subpages, indexed by SVA[9:7]. Index3 refers to SVA[13:10] and Index refers to SVA[9:7]. L3Entry.valid[index3] and L3Entry.created specifies whether the corresponding subentry is valid and default subpage state if invalid.

The subpage state is then presented to Routing Directory Rules which generate the new subpage state to be stored in L3EntryAdrr→l3sub[index3].SpState[indexs].

Level1 Miss Operation

A Level1 Miss lookup operation occurs when the Level 1 table lookup indicates that the level2 entry pointer is invalid. The level1 miss lookup operation allocates a level2 entry and level3 entry to allow the Routing Directory to describe the page and subpage state of the request SVA. A level 1 miss is caused by the first reference within a Ring:0 to a page within an address range denoted by SVA[39:25]. If the packet command is ciu_ex_summary, the request is part of a page create operation.

The Level2 Free list head is pointed to by the L2 Free List Pointer. The free list head L2Entry.NextFree specifies the pointer to the next free Level2 Entry. The level2 free list head is allocated as a Level2 Entry by writing LevelEntry.pointer with level2 free list pointer and setting L1Entry.valid. Level2 free list pointer is updated by writing Level2 free list pointer with level2 free list head, L2Entry.NextFree. L2Entry.12v.12valid[SVA[24:21]] is set and the remaining valid bits are cleared.

Figure 22:
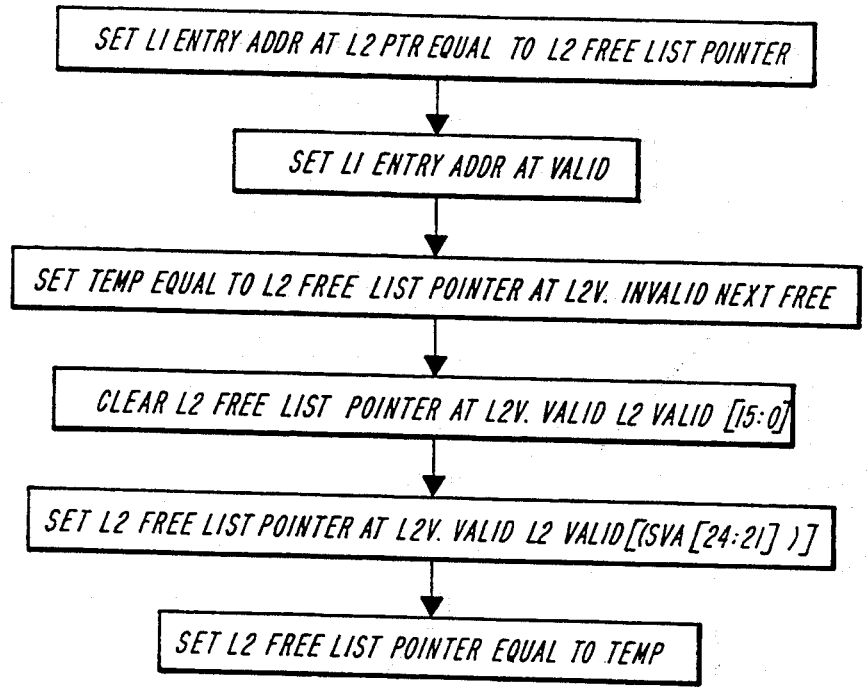

These operations are depicted in FIG. 22 and more particularly set forth below.

| Step | Operation |
|---|---|
| 1 | L1EntryAddr→l2ptr = L2FreeListPointer |
| 2 | L1EntryAddr→valid = set |
| 3 | temp = L2FreeListPointer→l2v.Invalid.NextFree |
| 4 | L2FreeListPointer→l2v.Valid.12valid[15:0] = clear |
| 5 | L2FreeListPointer→l2v.Valid.12valid[(SVA[24:21])] = set |
| 6 | L2FreeListPointer = temp |

If the L2FreeListPointer is null, a Routing directory fault is signalled. This error can only occur if the corresponding Ring:0 has allocated greater than $2^{10}$ unique pages within a single subdirectory or the RRC has failed to allocate or deallocate level2 entries correctly. $2^{10}$ unique pages corresponds to 64 processor cells ($2^{10}$ pages/$2^4$ pages per cell).

Level2 Miss Operation

A Level2 Miss lookup operation occurs when the Level2 table lookup indicates that the level2 entry pointer is invalid. The level2 miss lookup operation allocates a level3 entry to allow the Routing Directory to describe the page and subpage state of the request SVA. A level2 miss is caused by the first reference within a Ring:0 to a page within an address range denoted by SVA[39:21]. If the packet command is ciu_ex_summary, the request is part of a page create operation.

The Level3 Free list head is pointed to by the L3FreeListPointer. The free list head, L3Entry.NextFree specifies the pointer to the next free L3 Entry. The level3 free list head is allocated as a L3Entry by writing L2Entry.12sub[index2].l3ptr with level3 free list pointer. L3 free list pointer is updated by writing L3 free list pointer with levels free list head L3Entry.NextFree. L3Entry.13v.13valid[SVA[13:10]] is set and the remaining valid bits are cleared. L3Entry.13sub(SVA[13:10]).SpState[SVA[9:7]] is set to proper subpage_state and the remaining seven subpage_states are set to invalid. If the packet command is ciu_ex_summary, L3Entry.13v.Valid.created is set.

Figure 23:
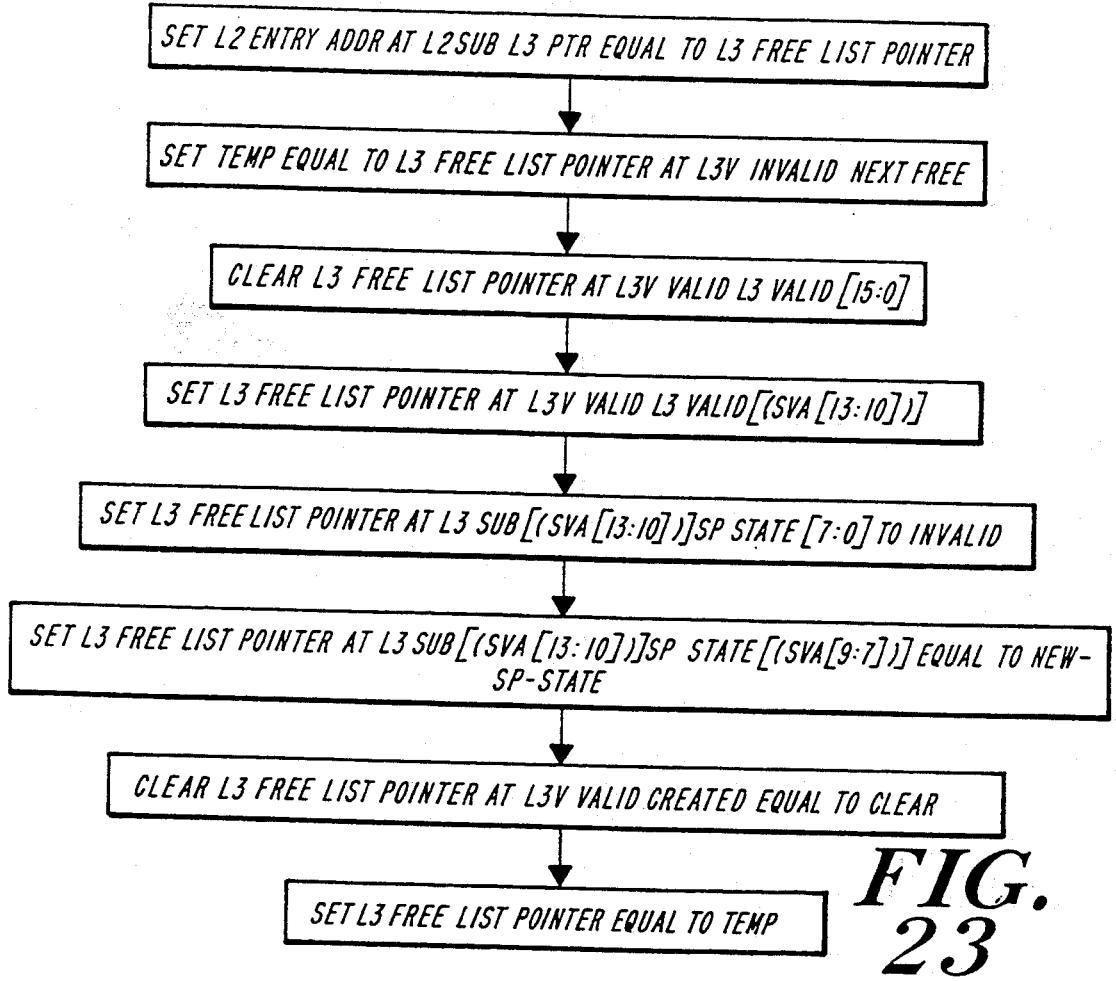

These operations are depicted in FIG. 23 and more particularly set forth below.

| Step | Operation |
|---|---|
| 7 | L2EntryAddr→l2sub.l3ptr = L3FreeListPointer |
| 8 | temp = L3FreeListPointer→l3v.Invalid.NextFree |
| 9 | L3FreeListPointer→l3v.Valid.13valid[15:0] = clear |
| 10 | L3FreeListPointer→l3v.Valid.13valid[(SVA[13:10])] = set |
| 11 | L3FreeListPointer-13sub[(SVA[13:10])].SpState[7:0] = invalid |
| 12 | L3FreeListPointer→l3sub[(SVA[13:10])].SpState[(SVA[9:7])] = new-sp-state |
| 13 | L3FreeListPointer→l3v.Valid.Created = clear |
| 14 | L3FreeListPointer = temp |

SVA Deallocate Operations

SVA Deallocate Operations are initiated by the packet commands ciu_inv_sum_alloc, ciu_pure_inv_sum_alloc and RrcDeallocDesc. All deallocate operations proceed through five steps, subdirectory selection, Level1 table lookup, Level2 table lookup, update Level2 entry to deallocate Level3 entry. If all level2 subentries are invalid, then the Level2Entry is also deallocated.

Deallocate Level3 Entry Operation

Figure 24:
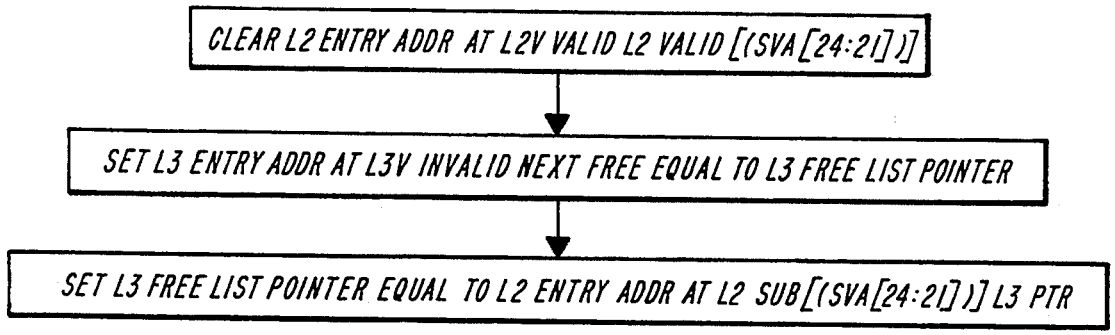

A deallocate Level3 Entry operation is executed if all level2 subentries are not invalid after the level3 entry is deallocated. The following operation, as illustrated in FIG. 24, is executed if the packet command is ciu_inv_summary:

| Step | Operation |
|---|---|
| 1 | L2EntryAddr→l2v.Valid.12valid[(SVA[24:21])] = clear |
| 2 | L3EntryAddr→l3v.Invalid.NextFree = L3FreeListpointer |
| 3 | L3FreeListPointer = L2EntryAddr→l2sub[(SVA[24:21])].l3ptr |

Figure 25:
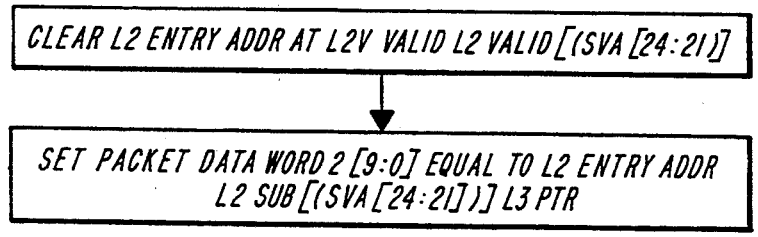

The following operation, as illustrated in FIG. 25, is executed if the packet command is ciu_wr_descriptro.data or ciu_inv_sum_allocate.data:

| Step | Operation |
|---|---|
| 1 | L2EntryAddr→l2v.Valid.12valid[(SVA[24:21])] = clear |
| 2 | Packet.DataWord2[9:0] = L2EntryAddr→l2sub[(SVA[24:21])].l3ptr |

Deallocate Level2 Entry Operation

Figure 26:
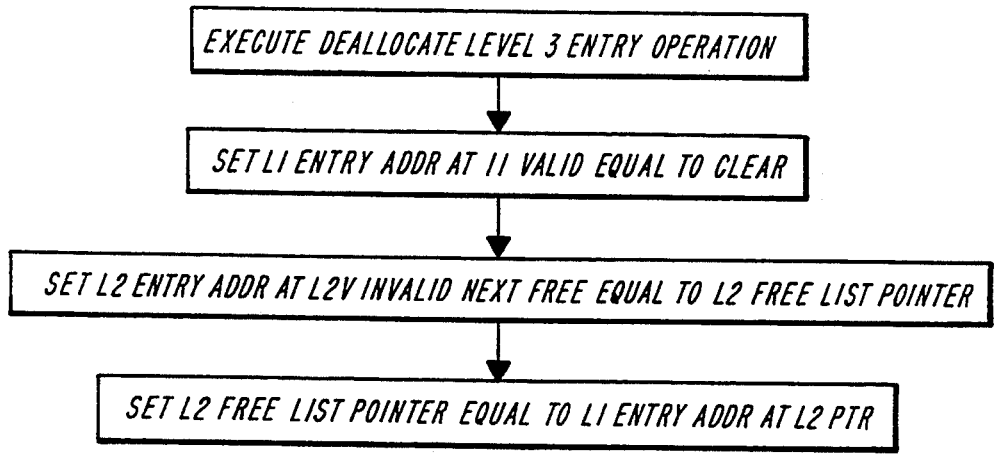

A deallocate Level2 Entry operation is executed if all level2 subentries are invalid after the level3 entry is deallocated, as illustrated in FIG. 26 and particularly set forth below.

| Step | Operation |
|---|---|
| 1 | Execute deallocate Level3 Entry Operation. |
| 2 | L1EntryAddr→l1valid = clear |
| 3 | L2EntryAddr→l2v.Invalid.NextFree = L2FreeListPointe |
| 4 | L2FreeListPointer = L1EntryAddr→l2ptr |

SPA Operation

SPA operation is initiated by two packet commands, spa_read_request and spa_write_request. There are two types of SPA operations, SpaDirect and SpaLookup.

The SpaDirect operation preforms a spa read or write based of the directly on the spa location specified in the packet address. Spa_write_request data is supplied in Pkt.DataWord0. Spa_read_request response data is supplied in Pkt.DataWord0.

The SpaLookup operation is used to emulate the RDU lookup and deallocate operations under controlled conditions from spa address space. The Pkt.Address location offset and ctl$RiuLookupCommand.SubAddr forms the emulated SVA and the remainder of ctl$RiuLookupCommand forms the emulated packet command. The RDU uses the emulated packet command and emulated to perform a normal lookup or deallocate operation. The results of the SpaLookup operation can be examined by access to L2FreeListPointer, L3FreeListPointer and SpaDirect locations.

Refresh Operation

Refresh is accomplished in a distributed manner by each RRC independently controlling it refresh. A single refresh requires one packet processing time. Thus refresh can only be performed during empty, or frozen packets, since these packet require no processing. The RRC attempts perform refresh in the background by using all empty, frozen and invisible packet times for refresh.

The three dram based data structures, L1Table, L2PTable and L3SubpageState require refresh. During a refresh operation one of 512 rows is refreshed in each of the data structures.

ECC Correct Operation

When the RRC detects a correctable ECC error, additional packet times are required to correct the data structure. Ring freezing is used to allow multiple packet times for the correction and re-lookup.

When a correctable ECC error is detected, the RRC initiates Full-1 Ring Freeze method, since the ECC error is not know early in packet processing. The first packet is handled as described in Extract Buffer Full section and the remaining packets are marked frozen for one revolution. The corrected data structure re-written, saved in RDU and then used to reprocess the packet which cause the ecc error after one Ring revolution. Only RRC originated packets will be processed, non-originated packets are extracted by another cell within the Ring. Saving the corrected packet allows RRC originated packets to be correctly processed for single bit (correctable) hard errors.

Routing Directory Initialization

RRC hardware does not automatically initialize the Routing Directory. All Level1Entries, Level2Subentries and Level3Subentries must be initialized to invalid. Level2 and Level3 FreeListPointers and free lists must be initialized to indicate all entries and subentries are free.

InferRing Buffer

Figure 11A:
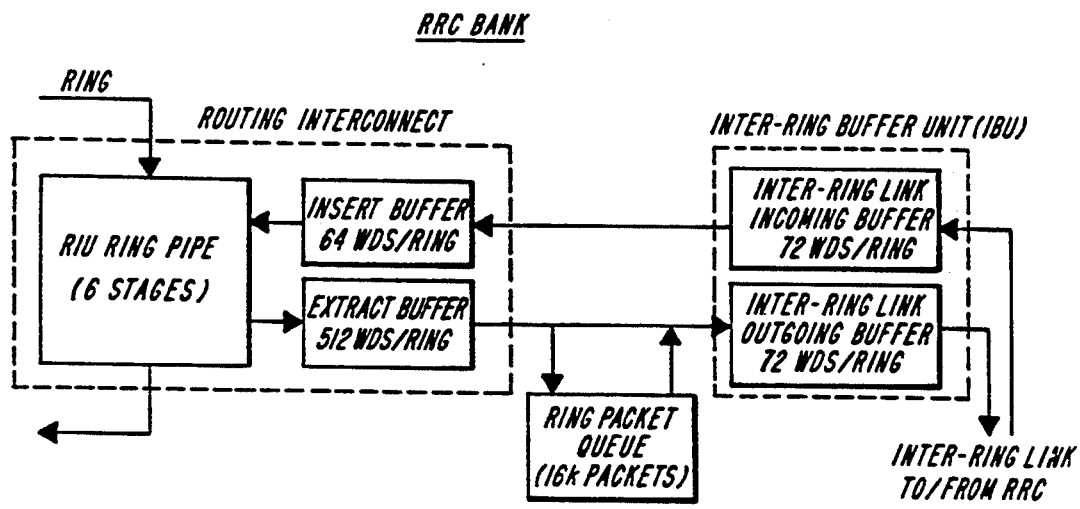
FIG. 11A depicts a preferred structure of the InterRingBuffer section of a ring routing cell constructed in accord with the invention.

The InterRingBuffer buffers incoming packets from the Ring Interconnect extract buffer and interfaces to the InterRingLink. A preferred structure of the InterRingBuffer is shown in FIG. 11A. The InterRingBuffer also controls the RRC Bank buffer management. The InterRingBuffer consists of the InterRing BufferUnit (IBU), InterRing Dram Buffer (IDB) and InterRingLink Interface.

InterRing Buffer Structure

IBU

The IBU buffers and formats outgoing InterRingLink packets, provides error checking and buffering for InterRingLink incoming packets and controls the InterRing Dram Buffer. The Outgoing Buffer contains 72 words, which holds a maximum of 4 long packets and the Incoming Buffer holds 72, words for maximum of 4 long packets. The sizing of the Incoming Buffer is dependent on the InterRingLink rate and absolute delay (length and switching delay). The 72 word Incoming Buffer is sized for a 10 km maximum length, directly connected 1 gbit/sec link. Short packets consume 2 words and long packets consume 18 words of Outgoing or Incoming Buffers. The Outgoing and Incoming buffers are managed with fifo discipline.

InterRingDramBUffer

Figure 11B:
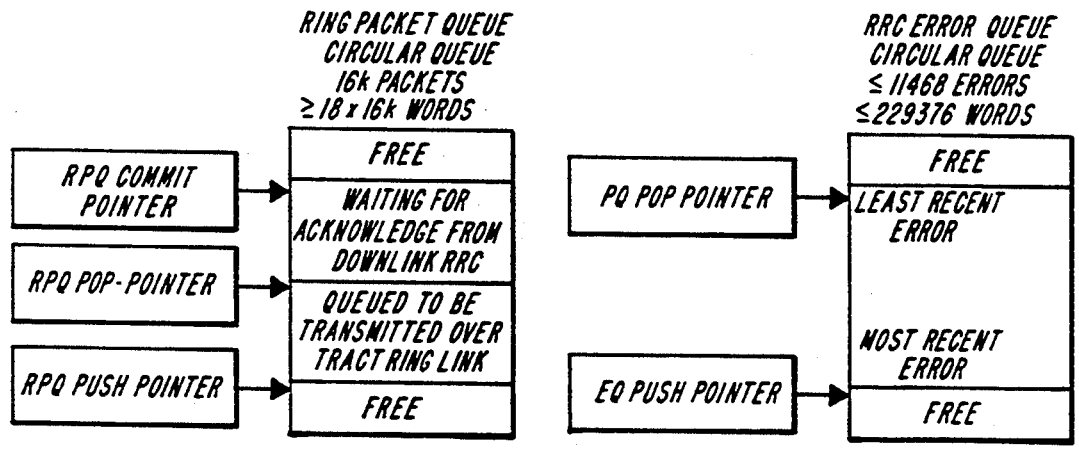
FIG. 11B depicts a preferred arrangement of InterLinkDram buffers in a ring routing cell constructed in accord with the invention.

The InterRing Dram Buffer (IDB) contains the Ring Packet Queue (RPQ) and RRC ErrorQueue. A configuration for the InterRingDram queues in a preferred ring routing cell constructed in accord the invention is shown in FIG. 11B. The RPQ buffers all packets from Routing Interconnect unit until the packet has been transmitted over InterRingLink to the downlink RRC and an acknowledge has been returned. When the Extract Buffer and the Outgoing Buffer are full, the Extract Buffer-packets are emptied into the IDB until the Outgoing Buffer can accept them. The RPQ is organized as a circular queue. RPQPushPointer points to the first free word for queueing the next packet from the Extract Buffer. The RPQPopPointer points to the first word of the next packet to be transmitted over the InterRingLink. The PRQCommitPointer points to the first word of oldest packet which has not be acknowledged by downlink RRC. Packets between RPQPushPointer and RPQPopPointer are queued to be transmitted over the InterRingLink. Packets between RPQPopPointer and RPQCommitPointer are waiting for acknowledgement from the downlink RRC. If RPQPushPointer equals RPQPopPointer, the there are no queued packets in the RPQ for transmission on InterRingLink. If RPQPopPointer equals PRQCommitPointer, all transmitted packets have been acknowledge. If Ring Packet Queue overflows, a fatal error is indicated by IbuMasterConfig.RPQFull.

The IDB also contains the RRC ErrorQueue. The RRC places an entry in the ErrorQueue for each RRC detected error. Each ErrorQueue entry consists of the packet corresponding to the error (if any) and one word of error information. EQPushPointer points to the first free words for queueing the next error entry. The EQPopPointer points to the first word of the least recent queued error. If EQPopPointer equals EQPushPointer, the RRC ErrorQueue is empty. The EQPopPointer is not modified by the RRC, it is only modified by SPA access. IbuMasterConfig.EQFull is set when the RRC ErrorQueue overflows. The RRC continues normal operations but new errors are not logged.

InterRingLink Interface

The InterRingLink interface converts the 32 or 40 bit wide IBU outgoing packet and incoming packet interfaces to or from the physical link format.

RRC Buffer Management

Each RRC pair logically manages a pair of buffers with fifo discipline, one in each direction between the Ring:0 and Ring:1 (see FIG. 11B). A RRC bank manages 5 buffers, 3 buffers between the Ring and the outgoing InterRingLink and 2 buffers between the incoming InterRingLink and the Ring. A packet copied from the Ring of uplink RRC bank, passes through the Extract Buffer, optionally throughout Ring Packet Buffer, through InterRingLink Outgoing Buffer, and is then transmitted over the InterRingLink. The packet then passes through the InterRingLink Incoming Buffer and Insert Buffer of downlink RRC bank. Packets traveling in the opposite direction are copied from the Ring of downlink RRC bank, pass through the Extract Buffer, Ring Packet Buffer and InterRingLink Outgoing buffer. The packet then passes through the InterRingLink Incoming Buffer and Insert Buffer of uplink RRC bank.

The Extract and Insert buffer provide rate adjustment between the Ring and RRC Routing Bus. The Incoming and Outgoing buffers provide rate adjustment between the InterRingLink and the RRC Routing Bus. The Ring Packet Queue handles possible overflow of these buffers by being able to store the maximum number of pending packets and prevents deadlock between the RRC pair. The buffers are sized such that the Ring Packet Queue is used infrequently for buffering between Extract and InterRingLink outgoing buffers. The Ring Packet Queue is also used to log all packets transmitted over InterRingLink, in the event that re-transmission is required due to link errors.

The preferred RRC bank implementation provides an independent path between the Extract buffer and InterRingLink Outgoing Buffer and between the InterRingLink Incoming Buffer and the Insert Buffer. When the InterRingLink Incoming buffer is not empty and the Insert Buffer is not full, the IBU transfers a packet from the Incoming to Insert buffer.

When the Extract buffer is not empty, InterRingDram Queue is empty and the InterRingLink Outgoing buffer is not full, the IBU transfers a packet from the Extract to the Outgoing buffer. If the Outgoing buffer is full, the packet is transferred from the Extract buffer to the InterRingDram Queue. Packets contained in InterRingDram Queue are always transferred to Outgoing buffer before any packets from Extract buffer.

InterRingLink Packet Protocol and Format

Figure 12:
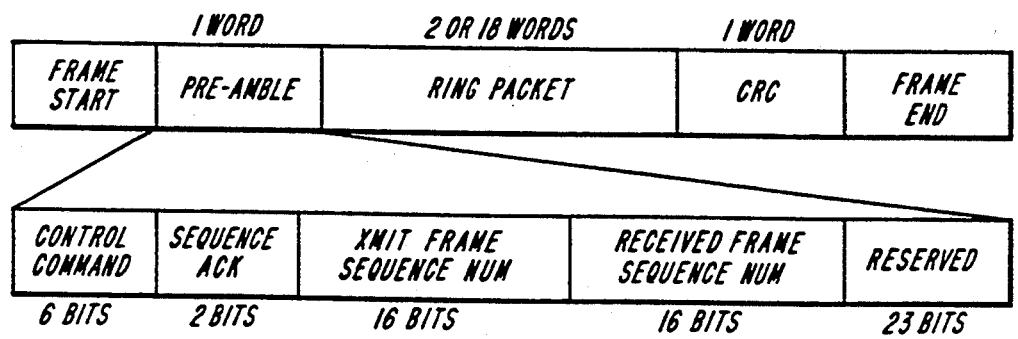
FIG. 12 depicts a preferred InterRingLink frame format used in system constructed in accord with the invention.

The InterRingLink packet protocol and format is required to be applicable across a range of link rates for multiple generations of UCS computers. The protocol and format should span interconnection distances from 25 meters within a single room to 10,000 km over tariffed telecommunication networks. The format should be compatible with emerging telecommunications standards, such as SONET. It is heavily based on simplified concepts borrowed from SDLC protocol; see *Communications Architecture for Distributed Systems*, R. J. Cypser, Addison-Wesley Publishing Company, 1978 or *Telecommunications Networks: Protocols Modeling and Analysis*, Mischa Schwartz, Addison Wesley, 1987. FIG. 12 depicts a preferred InterRingLink frame format used in a ring routing cell constructed in accord with the invention.

Acknowledgements and Retransmissions

The connection between an RRC pair is full duplex, consisting of two unidirectional InterRingLinks. Because of the uncertain reliability of the InterRingLinks, a very positive and definite acknowledgement is call for at the link level. The transmitter RRC receives an positive acknowledgement over the incoming InterRingLink for each packet transmitted over outgoing InterRingLink. Waiting for an acknowledgement prior to transmitting the next packet leads to very low efficiency. The IBU attaches a sequence number to each transmitted packet so that up to $2^{16}$ packets can be outstanding prior to the first acknowledge. Because of the duplex capability, two independent sets of sequence numbers are used, one for each direction of packet flow. This permits the recovery of one InterRingLink to proceed independent of the sequence numbers of the other InterRingLink between the RRC pair and avoids possible timing ambiguities. Only data packets are sequenced checked.

Two sequence numbers are maintained by each IBU. The IbuXmitSeqNum, operated modulo $2^{16}$, provides a count for each data transfer packet that is transmitted from the IBU. The IbuRcvSeqNum, also modulo $2^{16}$, is incremented once for each valid in-sequence, error-free data packet that is received by that IBU. When one IBU sends its IbuRcvSeqNum to the downlink IBU, it will served to indicate the next data packet that is expected and to acknowledge all data packets received up to, but not including the value indicated by the packet receive sequence number. Each subsequent IbuRcvSeqNum transmitted reconfirms that all preceding messages have been accepted. Multiple data packets can be acknowledged in a single packet.

Packet Format

InterRingLink packet format consists of five fields, Frame Start, Preamble, Ring Packet, CRC and Frame End. The Frame Start and Frame End fields are link specific framing fields and are added and stripped off InterRingPacket by InterRingLink Interface.

The Frame Start and Frame End fields are dependent on the type of physical link.

The PreAmble which specifies an link control command, a sequence acknowledge field, a Transmit frame sequence number (TFSN) and the received frame sequence number (RFSN). Control commands define the number of words and content of Ring Packet subfield.

| Control Cmd | Ring Pkt Size | Sequence |
|---|---|---|
| idle | 0 words | nonsequenced |
| initialize request | 0 words | nonsequenced |
| initialize sequence | 0 words | nonsequenced |
| initialize acknowledge | 0 words | nonsequenced |
| short packet | 2 words | sequenced |
| long packet | 18 words | sequenced |

Commands are divided into sequenced and nonsequenced commands. The sequence numbers for the link to be incremented by the RRC pair for sequenced frames. Sequence numbers for the link are not incremented for nonsequenced frames.

Transmit Frame Sequence Number (TFSN) represents the sequence number of the frame. Each successive sequenced frame has its sequence number incremented by one. The InterRingLink used mod $2^{16}$ sequence numbering. When the transmitter reaches its maximum sequence number, it is forced to stop transmitting until a frame in the reverse direction is received, acknowledging an outstanding packet. The receive frame sequence number (RFSN) acknowledges the receipt of RFSN - 1 and any frames preceding that number not already acknowledged. RFSN indicates that the receiver is expecting sequenced frame number RFSN. The transmitting IBU buffers all frames not yet acked positively. Once acked positively the frame can be purged and its sequence number reused.

The InterRingLink, like HDLC, provides both a "piggy-back" feature, with the ack function embedded in a frame transmitted in the reverse direction. Multiple frames can be acknowledged in a single frame. The three possible acknowledges are tabulated as follows:

| Acknowledge | Function |
| --- | --- |
| Ready to receive (RR) | Acknowledges all frames received up to and including Received Frame Sequence Number (RFSN) minus one. |
| Not ready to receive (RNR) | Provides flow control for a temporary busy condition. Acknowledges all frames up to and including Received Frame Sequence Number (RFSN) minus one. |
| Reject (REJ) | Rejects all frames from Received Packet Sequence Number (RPSN) on. Positively acknowledges all frames up to and including Received Frame Sequence Number (RFSN) minus one. |

Idle command that specifies that the Ring packet field is null, but the remainder of preamble and checksum field are valid. The initialize request, initialize sequence and initialize acknowledge commands are used to initialize and synchronize sequence number protocol between IBUs at each end of InterRingLink. Initialize sequence indicates the transmit IBU has reset its sequence numbers. The receiving RRC should reset sequence number, Ring Packet Queue, clear IbuMasterConfig.RPQFull and transmit a reset acknowledge control command packet. Initialize request causes the downlink IBU to reset sequence number, Ring Packet Queue, clear IbuMasterConfig.RPQFull and transmit a initialize sequence packet. The short packet and long packet commands indicate that the Ring Packet field contains a short or long packet respectively.

The InterRingLink uses two mechanisms for error recovery.
1—Reject recovery. This is assume to be always used where possible to speed up InterRingLink recovery. However, it can be used only once for a given frame. It cannot be invoked on repeats of that frame.
2—Timeout recovery. This must always be used in addition to reject recovery. Without timeout recovery, an isolated sequenced frame or the last in a sequence of frames could not be recovered if garbled. In addition, since a reject recovery may be used only once per sequence frame, multiple losses of a given frame must be handled through a timeout.

Link packet errors include:
Incorrect checksum
Out of sequence transmit packet number
Clock recovery error
Link framing error The RNR acknowledge provides flow control when the incoming buffer is full. For optimal use of InterRingLink bandwidth, the minimum incoming buffer size is the number of frames received during a round trip InterRingLink delay.

The Cyclic Redundancy Field (CRC) is calculated from Preamble and RingPacket fields.

IB Operations

The IBU buffer management control executes the following IB operations to transfer packets between the 5 RRC buffers.

Ring Interconnect Packet

A packet from the Extract Buffer is transferred over the Routing Bus to both the Ring Packet Queue and stored starting at the location specified by RPQPushPointer. The pointer is incremented by 18 words for both short and long packets. If the Ring Packet is empty (RPQPushPointer equals RPQPopPointer) and Outgoing buffer is not full, the packet is also pushed into the Outgoing buffer and RPQPopPointer is incremented. IbuXmitSeqNum is incremented by one for each data packet transmitted on InterRingLink.

Ring Interconnect Packet From Dram Buffer

A packet is transferred from the Ring Packet Queue to the Outgoing buffer when the Ring Packet Queue is not empty and the Outgoing Buffer is not full. The RPQPopPointer is incremented by 32 words.

InterRingLink Packet

A packet is transferred from the Incoming Buffer to the Insert Buffer. The count IbuRcvSeqNum is incremented by one.

InterRing Dram Buffer Refresh

A refresh sequence is performed on InterRing Dram when the IRBRefreshCount overflows. The refresh interval is set by IRBRefreshInterval. Refresh takes top priority over other Routing Bus operations.

InterRingLink Retry

Each packet received over the InterRingLink specifies the last error free packet received and whether an error was detected. If the acknowledge indicates no errors, the RPQCommitPointer and CommitPktNumber locations are updated in the following manner:
1—RPQCommitPointer=RPQCommitPointer+(RcvPktSeqNum−CommitPktNum) * 32
2—CommitPktNum=RcbPktSeqNum When a reject packet is received, the IBU must resend all packets with sequence numbers after RPQCommitPointer through RPQPushPointer. Ibis is accomplished by adjusting the RPQPopPointer.
1—RPQCommitPointer=RPQCommitPointer+(RcvPktSeqNum−CommitPktNum) * 32

2—CommitPktNum=PktRcvSeqNum
3—RPQPopPointer=PktRcvSeqNum
4—Store received error packet in ErrorQueue

Error Log

For any error detected by the RI, RDU and IB within RRC, the corresponding packet and 2 words of error status are recorded in the RRC ErrorQueue. The packet should also be queue in Ring Packet Queue if it is being transmitted to downlink RRC.

SPA Read/Write InterRing Dram

Read or written through InterRingDram locations. Note that if Outgoing Buffer becomes full or RRC detects errors, the InterRingDram is modified.

Ring:1 Operations

This section which follows describes preferred RRC operations in context of the multi-level memory system hierarchy described above. The RRC can be viewed as a packet switch, which routes packets based on rules which are a function of packet type and RRC directory based subpage state. First the subpage, page and RRC based states and pending states are described. Next, the an description of key rules concepts and sequences are given. Next complete subpage rules are provided. Page and special operations are then described. Complete rules encompassing page operations, special operations and subpage operations

Originating Conventions

Figure 13:
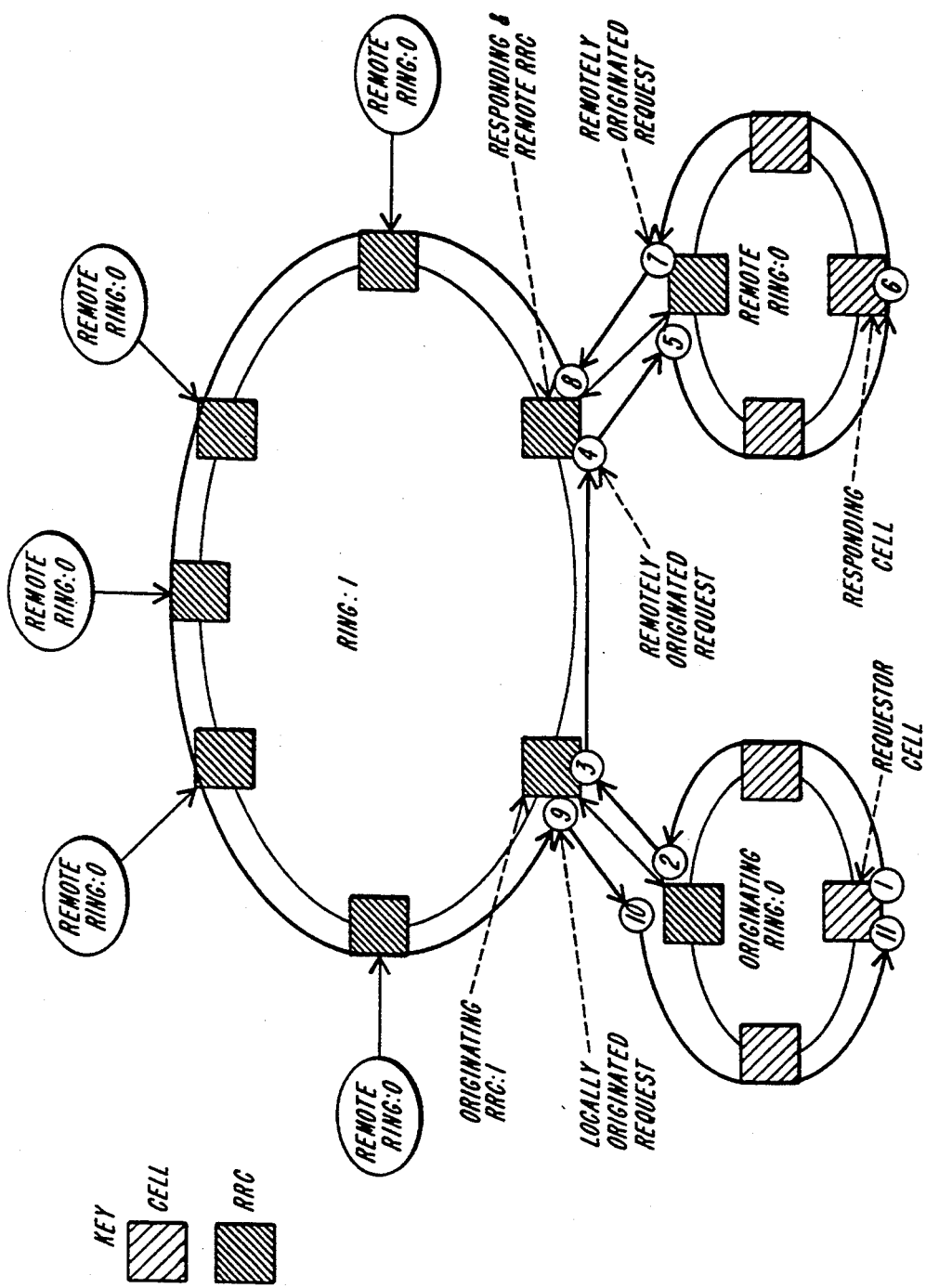
FIG. 13 illustrates a preferred request routing sequence in a system constructed in accord with the invention.

FIG. 13 illustrates a typical request sequence and defines the location terminology used in this section. The Originating Ring:0 is the Ring:0 contains the requestor cell, which issued the original request packet (step 1). If the requested subpage is not valid within the originating (or local) Ring:0, RRC:0 extracts the packet and forwards it to the local RRC:1. The locally originated request is then inserted by the local RRC:1 onto Ring:1 (step 3). An RRC:1, connected to a remote Ring:0, which holds a valid copy of the requested subpage then extracts the remotely originated request (step 4). The remotely originated request is then inserted onto the remote Ring:0 by RRC:0 (step 5). The responding cell extracts the request and inserts a response (step 6). The remotely originated request is extracted by the RRC:1 (step 7) and forwarded to the partner RRC:1. This RRC:1, called the responding RRC:1, inserts the response packet onto the Ring:1 (step 8). The packet travel around the Ring:1 to the originating RRC:1 and it is extracted (step 9). The packet is forwarded to the originating Ring:0s RRC:0 and inserted onto Ring:0 (step 10). The request sequence is then completed by the originating (requestor) cell extracting the packet (step 11).

The packet is processed by RRCs eight times during this typical sequence. The two RRC:0s and two RRC:1s interpret the packet in eight unique ways based on packet source and packet origin as shown in the table below. The RRC operations and rules are structured based on these eight combinations of RRC, packet source and packet origin.

For most part RRC:0 locally originated packet rules are analogous to RRC1 remotely originated packet rules. From the point of view of a local Ring:0, the local RRC:0 makes the remainder of the system logically appear as a single cell to locally originated requests. From the point of view of the Ring:1 the local RRC1 makes the local Ring:0 logically appear as a single cell to remotely originated requests.

The pkt.RequestorId and RiuCellAddress are compared to determine if the request is locally originated.

RRC Subpage State Description—Preferred Embodiment

Subpage and pending request state are stored in the RRC pair for all subpages which are present in any cache within the Ring:0 or for which a request is pending to or from a nonlocal Ring:0. RRC:0 stores pending states, for requests from a remote Ring:0s. The RRC1 stores pending state for local requests which are pending to a remote Ring:0. Both RRC:0 and RRC1 store subpage state. RRC:0 and RRC1 subpage state is consistent, except during intervals when the subpage state is being updated. The rules and pending states properly handle all window cases. Subpage States for a preferred practice of the invention are set forth immediately below.

RDU:0 (RdUState0) Enumeration

RDU:0 state consists of two independent fields and a reserved field. Subpage state field describes the collective state of all subpages present within the local Ring:0. Pend field describes whether any remotely originated requests to this Ring:0 are pending. The individual states are described in the following sub-sections.

| Field Name | RDU:0 State States | Number bits | Description |
|---|---|---|---|
| SubpageState | Invalid<br>Ro<br>Nex<br>Ex | 2 | Ring:0 subpage state |
| Pend | None<br>Ro<br>Owner | 2 | Remote pending |

SubpageState:Inv

Indicates there is no valid copy of subpage within the Ring:0.

SpState:Ro

SpState:Ro indicates that one or more caches within the Ring:0might contain a read only copy of the subpage, but none contains owner state. Under certain circumstances, the RRC pair has recorded read only state (SpState:Ro) for a subpage, but the subpage is invalid (SpState:Inv) within the Ring:0, since no read only copies exist in any of the cells.

SpStateNeX

SpState:Nex indicates the subpage owner, and zero or more read only copies of subpage exist within the local Ring:0. Zero or more read only copies might exist in remote Ring:0s. If no read copies exist outside the local Ring:0, the first invalidate, or recombine which indicates that no remote read only copies exist causes a subpage state transition to exclusive. Remote RRCs did not signal when they deallocate descriptors.

SpState:Ex

SubpageState:Ex indicates that there are no valid copies of subpage outside of the local Ring:0. The local Ring:0 contains an exclusive owner and no read only copies or a nonexclusive owner with zero or more read only copies. The RRC:0 records all local cell exclusive ownership states, exclusive, atomic, and transient-atomic as exclusive.

Pending:None

PendingNone request state indicates that there is no remotely originated pending activity to the local Ring:0 relating to the corresponding subpage.

Pendl:Ro

Pendl:Ro indicates that one remotely originated sva_read_ro request to the local Ring:0 is pending. Additional remotely originated sva_read_ro requests are returned to the partner RRC1 with RspBsy set, until the request is closed out.

Pendl:Owner

Pendl:Owner indicates that one or more remotely originated ownership or invalidation requests to the local Ring:0 is pending. In addition one or more remotely originated sva_read_ro requests might also be pending. All remotely originated ownership, read only and invalidation requests are forwarded to the Ring:0, when in this state. Ownership requests are sva_read_ex, sva_get and sva_getw. Invalidations requests are write_inv and lookahead invalidates.

RDU:1 (RduState1) Enumeration

RDU:1 state consists of three independent fields and a reserved field. Subpage state field describes the collective state of all subpages present within the local Ring:0. Pend field describes whether any locally originated requests to Ring:1 are pending. Pendl field describes whether the pending request might need to be reissued due to the RRC1 missing a remotely originated ownership packet that wasn't extracted to satisfy a pending request and a missing page (snarf). Individual states are described in the following sub-sections.

| Field Name | RDU:1 State | | |
|---|---|---|---|
| | States | Number bits | Description |
| SubpageState | Invalid Ro Owner | 2 | Ring:0 subpage state |
| Pend | None Ro Owner | 2 | Ring:0 pending |
| Pendl | None ReIssue | 1 | Ring:0 pending |

SubpageState:Inv

Indicates there is no valid copy of subpage within the Ring:0.

SpState:Ro

SpState:Ro indicates that one or more caches within the Ring:0 might contain a read only copy of the subpage, but none contains owner state. Under certain circumstances, the RRC pair has recorded read only state (SpState:Ro) for a subpage, but the subpage is invalid (SpState:Inv) within the Ring:0, since no read only copies exist in any of the cells.

SubpageState:Owner

SubpageState:Owner indicates that the subpage is owned exclusively (Ex) or nonexclusively (Nex) within the local Ring:0. The local Ring:0 contains an exclusive owner and no read only copies or a non-exclusive owner with zero or more read only copies. The RRC:1 records all local cell ownership states, non-exclusive, exclusive, atomic, and transient-atomic as owner.

Pending:None

PendingNone request state indicates that there is no locally originated pending activity to the Ring:1 relating to the corresponding subpage and pending field.

Pend:Ro

Pend:Ro indicates that one locally originated sva_read_ro request to Ring:1 is pending. Additional locally originated sva_read_ro requests are returned to the partner RRC:0 with RspBsy set, until the request is closed out.

Pend:Owner

Pend:Owner indicates that one or more locally originated ownership or invalidation requests to Ring:1 are pending. In addition one or more locally originated sva_read_ro requests might also be pending. All locally originated ownership, read only and invalidation requests are forwarded to the Ring:0, when in this state. Ownership requests are sva_read_ex, sva_get and sva_getw. Invalidations requests are write_inv and lookahead invalidates.

Pendl:ReIssue

Pendl:ReIssue indicates that the RRC1 might have missed a potential non-RRC:1 originated response packet to an RRC:1 originated request. Pendl:Reissue state is used by RRC1 to prevent spurious missing_page error (page fault) by differentiating between the case of a remotely originated ownership packet that wasn't extracted to satisfy a pending request and a missing page (snarf). If the RRC1 originated request returns without a response and Pendl:ReIssue then the returning request is busied by the RRC causing the requesting processor cell or RRC to reissue the request, thereby preventing a spurious page fault. Pendl:Reissue is cleared when no locally originated requests are outstanding or during the first ownership (with data) response.

RRC Subpage State Description—Alternative Embodiment I

Described below are subpage states used in a first alternate embodiment of the invention.

RDU:0 (RduState0) Enumeration

RDU:0 state consists of four independent fields. Subpage state field describes the collective state of all subpages present within the local Ring:0. Pending1 field describes whether any remotely originated sva_read_ro, sva_read_ex, or write_invalidate requests to this Ring:0 are pending. Pending2 field describes whether a remotely originated sva_get request is pending. Pending3 field describes whether a remotely originated sva_getw (get and wait) request is pending and whether additional getw requests were issued while this request was pending. Multiple sva_getw requests are recorded to properly signal transient atomic state to requesting cache.

The three pending fields independently recorded a maximum of one remotely originated pending request of each type per subpage. Multiple requests of the same type to the same subpage are returned with busy status to the partner RRC1 until the pending request has been closed out. The individual states are described in the following sub-sections.

| Field Name | States | Number bits | Description |
|---|---|---|---|
| SubpageState | Invalid<br>Ro<br>Nex<br>Ex | 2 | Ring:0 subpage state |
| Pend1 | None<br>Ro<br>Ex<br>OwnerInv | 2 | Remote pending |
| Pend2 | None<br>Get | 1 | Remote pending |
| Pend3 | None<br>Getw<br>Atomic | 2 | Remote pending |

SubpageState:Inv

Indicates there is no valid copy of subpage within the Ring:0.

SpState:Ro

SpState:Ro indicates that one or more caches within the Ring:0 might contain a read only copy of the subpage, but none contains owner state. Under certain circumstances, the RRC pair has recorded read only state (SpState:Ro) for a subpage, but the subpage is invalid (SpState:Inv) within the Ring:0, since no read only copies exist in any of the cells. When no read only copies exist, read only subpage state is adjusted to invalid subpage state, by the first locally originated request, remotely originated invalidate or remotely originated read only request.

SpState:Nex

SpState:Nex indicates the subpage owner, and zero or more read only copies of subpage exist within the local Ring:0. Zero or more read only copies might exist in remote Ring:0s. If no read copies exist outside the local Ring:0, the first invalidate, or recombine which indicates that no remote read only copies exist causes a subpage state transition to exclusive. Remote RRCs did not signal when they deallocate descriptors.

SpState:Ex

SubpageState:Ex indicates that there are no valid copies of subpage outside of the local Ring:0. the Ring:0 contains an exclusive owner and no read only copies or a non-exclusive owner with zero or more read only copies. The RRC:0 records all local cell exclusive ownership states, exclusive, atomic, and transient-atomic as exclusive.

Pending[1,2,3]:None

Pending None request state indicates that there is no remotely originated pending activity to the local Ring:0 relating to the corresponding subpage and pending field.

Pend:Ro

Pend1:Ro indicates that a remotely originated sva_read_ro request to the local Ring:0 is pending. Additional remotely originated sva_read_ro request are returned to the partner RRC1 with RspBsy set, until the request is closed out.

Pend1:Ex

Pend1:Ex indicates that a remotely originated sva_read_ex request to the local Ring:0 is pending. A preceding remotely originated sva_read_ro request might be pending. Additional remotely originated sva_read_ex requests are returned to the partner RRC:1 with RspBsy set, until the request is closed out.

Pend1:OwnerInv

Pend1:OwnerInv indicates that a remotely originated write_invalidate or lookahead invalidate (write_invalidate.lookahead, sva_read_ex.lookahead, sva_get.-lookahead or sva_getw.lookahead) request to the local Ring:0 is pending. A preceding remotely originated sva_read_ro request might be pending. Subsequent lookahead invalidates from Ring:1 are emptied. Subsequent remotely originated sva_read_ex or write_inv requests are busied. Since each subpage has a single owner and only the owner can issue a write_invalidate request, additional write invalidates in this state indicate an error condition. Subsequent sva_read_ro requests are marked RspBsy and duplicate.data packets are emptied.

Pend2:Get

Pend2:Get indicates that a remotely originated sva_get request to the local Ring:0 is pending. Subsequent remotely originated sva_get requests are returned to the originating cell with pkt.data set, which indicates subpage is already atomic, until the request is closed out. The subpage might not yet be atomic, but will be before the subsequent request is completed.

Pen3:Getw

Pend3:Getw indicates that one or more remotely originated sva_getw requests to the local Ring:0 are pending. Unlike all other read requests, all getw requests are forwarded when in this state, rather than ensuing request being busied. When a getw response from Ring:0 indicates the page is already atomic (getw-.data.RspBsy), Pend3:Atomic state is recorded.

Pend3:Atomic

Indicates that ownership packet is required to satisfy a pending getw request for atomic ownership. The owning cache is guaranteed to be in transient atomic state (tat). Subsequent remotely originated getw or get requests can be returned indicating the subpage is already atomic. Subsequent Ring:0 ownership packets (release.data or sva_read ex.data) are extracted, forwarded to Ring:1, for forwarding to other Ring:0s which are pending atomic (RRC:1 Pend3:Atomic).

Pend3:Atomic is set under two conditions. First, when a getw response indicates the page is already atomic. Second when a remotely initiated release.data enters a Ring:0, Pend3:Atomic is set, so that the RRC:0 can extract a subsequent release.data for forwarding to other Ring:0s which are pending atomic (RRC:1 Pend3:Atomic). The release.data could be locally originated if a cell within the Ring:0 acquired atomic ownership from the remotely originated release.

RDU:1 (RduState1) Enumeration

RDU:1 state consists of six independent fields. Subpage state field describes the collective state of all subpages present within the local Ring:0 and whether an owner invalidation is in progress. Pend1a field describes whether a locally originated sva_read_ro request is pending on Ring:1. Pend1b field describes whether a locally originated sva_read ex request is pending on Ring:1. Pend2 field describes whether a locally originated sva_get request is pending. Pend3 field describes whether one locally originated sva_getw request is pending an whether additional getw requests were issued while this request was pending. Multiple sva_getw requests are recorded to properly signal transient atomic state to requesting cache. Pend5 field describes whether the pending request might need to be reissued due to the RRC1 missing a remotely originated ownership packet that wasn't extracted to satisfy a pending request and a missing page (snarf).

The five pending fields independently recorded a maximum of one locally originated pending request of each type per subpage. Multiple requests of the same type are returned with busy status to the partner RRC until the pending request has been closed out. The individual states are described in the following sub-sections.

| Field Name | States | Number Bits | Description |
|---|---|---|---|
| SubpageState | Invalid<br>Ro<br>Owner<br>OwnerInvalidtg | 2 | Ring:0 subpage state |
| Pend1a | None<br>Ro | 1 | Ring:0 pending |
| Pend1b | None<br>Ex | 1 | Ring:0 pending |
| Pend2 | None<br>Get | 1 | Ring:0 pending |
| Pend3 | None<br>Getw<br>Atomic | 2 | Ring:0 pending |
| Pend4 | None<br>Reissue | 1 | Ring:0 pending |

SubpageState:Inv

Indicates there is no valid copy of subpage within the Ring:0.

SpState:Ro

SpState:Ro indicates that one or more caches within the Ring:0 might contain a read only copy of the subpage, but none contains owner state. Under certain circumstances, the RRC pair has recorded read only state (SpState:Ro) for a subpage, but the subpage is invalid (SpState:Inv) within the Ring:0, since no read only copies exist in any of the cells. When no read only copies exist, read only subpage state is adjusted to invalid subpage state, by the first locally originated request, remotely originated invalidate or remotely originated read only request.

SubpageState:Owner

SubpageState:Owner indicates that the subpage is owned exclusively (Ex) or non-exclusively (Nex) within the local Ring:0. The local Ring:0 contains an exclusive owner and no read only copies or a non-exclusive owner with zero or more read only copies. The RRC1 records all local cell ownership states, non-exclusive, exclusive, atomic, and transient-atomic as owner.

SubpageState:OwnerInvalidating

Pend1:OwnerInv indicates that a locally originated write_invalidate request to the Ring:1 is pending. Since each subpage has a single owner and only the owner can issue a write_invalidate request, additional write_invalidates in this state indicates an error condition. Invalidates implied by sva_read ex, get or getw are recorded as Pend1b:Ex, Pend2:Get, or Pend3:Getw states respectively. Subsequently locally originated sva_read_ro requests are marked RspBsy and duplicate.data packets are emptied.

Pending[1a,1b,2,3]:None

Pending:None request state indicates that there is no locally originated pending activity to the Ring:1 relating to the corresponding subpage and pending field.

Pend1a:Ro

Pend1:Ro indicates that a locally originated sva_read_ro request to the Ring:1 is pending. Additional locally originated sva_read_ro requests are returned to the partner RRC:0 with RspBsy set, until the request is closed out.

Pend1b:Ex

Pend1:Ex indicates that a locally originated sva_read_ex request to the Ring:1 is pending. Additional remotely originated sva_read_ex requests are returned to the Partner RRC:0 with RspBsy set, until the request is closed out.

Pend2:Get

Pend2:Get indicates that a locally originated sva_get request to the Ring:1 is pending. Subsequent remotely originated sva_get requests are returned to the local originating cell with pkt.data set, which indicates subpage is already atomic, until the request is closed out. The subpage might not yet be atomic, but will be before the subsequent request is completed.

Pend3:Getw

Pend3:Getw indicates that one or more locally originated sva_getw requests to the local Ring:0 are pending. Unlike all other read requests, all getw requests are forwarded when in this state, rather than ensuing request being busied. When a getw response from Ring:1 indicates the page is already atomic (getw.data.RspBsy), Pend3:Atomic state is recorded.

Pend3:Atomic

Indicates that ownership packet is required to satisfy a pending getw request for atomic ownership. The owning cache is guaranteed to be in transient atomic state (tat). Subsequent remotely originated getw or get requests can be returned indicating the subpage is already atomic. Subsequent Ring:0 ownership packets (release.data or sva_read ex.data) are extracted, forwarded to Ring:1, for forwarding to other Ring:0s which are pending atomic (RRC1 Pend3:Atomic). Pend3:Atomic does not guarantee that one or more getw requests are still pending.

Pend3:Atomic is set under two conditions. First, when a getw response indicates the page is already atomic. Second when a remotely initiated release.data enters a Ring:0, Pend3:Atomic is set, so that the RRC:0 can extract a subsequent release.data for forwarding to other Ring:0s which are pending atomic (RRC1 Pend3:Atomic). The release.data could be locally originated if a cell within the Ring:0 acquired atomic ownership from the remotely originated release.

Pend4ReIssue

Pend4:ReIssue indicates that the RRC1 might have missed a potential non-RRC:1 originated response packet to an RRC1 originated request. Pend4:ReIssue state is used by RRC1 to prevent spurious missing page_error (page fault) by differentiating between the case of a remotely originated ownership packet that wasn't extracted to satisfy a pending request and a missing page (snarf). If the RRC1 originated request returns without a response and Pend4:ReIssue then the returning request is busied by the RRC causing the requesting processor cell or RRC to reissue the request, thereby preventing a spurious page fault. Pend4:ReIssue is cleared when no locally originated requests are outstanding or during the first ownership (with data) response.

RRC Subpage State Description—Alternative Embodiment II

Described below are subpage states used in a second alternative embodiment of the invention.

Subpage State

RRC related information of subpage states is described here.

Invalid (Inv)

Invalid subpage state indicates that there is no valid copy of subpage within the Ring:0.

Read Only (Ro)

Read only state indicates that one or more caches within the Ring:0 might contain a read only copy of the subpage. It is possible that no local cache contains a read only copy of the subpage when the RRC has recorded read only state. If the last cache which held a particular subpage deallocated the descriptor, but another cache within the Ring:0 has a descriptor for same SVA Page allocated, the RRC will not be immediately notified and will temporarily maintain read only state. Another case is when a recombine.nex.data leaves a Ring:0, the RRC under rare circumstances (pending read only request, PlRo for instance), has to assume that a read only copy might exist within the Ring:0. Normally the assertion of recombine.nex.inv_busy indicates a read only copy of the subpage exists. When no read only copies exist, read only subpage state is adjusted to invalid subpage state, by the first invalidate or remote read only request.

NonExclusive (Nex)

Non-exclusive state indicates the subpage owner, zero or more read only copies of subpage exist within the local Ring:0. Zero or more read only copies might exist in remote Ring:0s. If no read copies exist outside the local Ring:0, the first invalidate, or recombine which indicates that not remote read only copies exist causes a subpage state transition to exclusive. Remote RRCs did not signal when they deallocate descriptors.

Exclusive (Ex)

Exclusive state indicates that there are no valid copies of subpage outside of the local Ring:0. The local Ring:0 contains an exclusive or non-exclusive owner and zero or more read only copies. The RRC records all local cell exclusive ownership states, exclusive, atomic, and transient-atomic as exclusive.

Pending Request Subpage State

Pending request state indicates the type of pending request, whether additional requests have been merged, whether the request needs to be reissued or whether the request has been completed and the RRC is wait for the original request to be returned. The value of 0 or 1 for # indicates pending Ring:0 or Ring:1 request state respectively.

PendNone (P#None)

PendingNone request state indicates that there is no pending activity relating to the corresponding subpage.

Pendwait (P#Wait)

Pendingwait indicates that a read request (sva_read_{ro,nex,ex},get,getw) is still pending, but a response or merged response has already been issued. When the returning request packet is received, the packet is emptied and the pending request is closed out. If the returning request packet contains data and ownership, an error should be signalled.

PendWaitMergeRo (P#WaitMrgRO)

PendingWaitMergeRo indicates that a read request is still pending and one or more sva_read ro.nodata packet(s) have been merged while waiting for the returning request. A second request cannot be issued until the first request is closed out. When the returning request packet is received, the packet is emptied, the pending request is closed out and a sva_read_ro request is usually issued. If the returning request packet contains data and ownership, an error should be signalled.

PendWaitMergeEx (P#WaitMrgEx)

PendWaitMergeEx indicates that a read request is still pending and one or more sva_read ex.nodata packets(s) have been merged while waiting for the returning request. Since the pending state always recognizes the strongest request merged, this state also includes zero or more merged sva_read_ro packets. A second request cannot be issued until the first request is closed out. When the returning request packet is received, the packet is emptied, the pending request is closed out and a sva_read_ex request is usually issued. If the returning request packet contains data and ownership, an error should be signalled.

PendWaitMergeAt (P#WaitMrgAt)

PendWaitMergeAt indicates that a read request is still pending and one or more {get,getw}.nodata packet(s) have been merged while waiting for the returning request. Since the pending state always recognizes the strongest request merged, this state also includes zero or more merged sva_read {ro,ex} packets. A second request cannot be issued until the first request is closed out. When the returning request packet is received, the packet is emptied, the pending request is closed out and a getw request is usually issued. If the returning request packet contains data and ownership, an error should be signalled.

PendReissue (P#Rei)

PendReissue indicates that a read request is pending and the request should be reissued when it returns. This state is usually entered when an event detect while the request is pending indicates that the request will be returned without a response or the response will return with stale data. For example, if a sva_read_ro is pending and an invalidate is detected, the returned data might be stale. Sometime pendreissue state is entered to allow a local Ring:0 transaction to complete prior to moving ownership to a remote Ring:0.

PendReissueMergeRo (P#ReiMrgRo)

PendReissueMergeRo indicates that a read request is pending and the request should be reissued when it returns and one or more sva_read_ro.nodata packet(s) have been merged while waiting for the returning request. Since the pending state always recognizes the strongest request merged, this state also includes zero or more merged sva_read_ro packets. A second request cannot be issued until the first request is closed out. When the returning request packet is received, the packet is emptied, the stronger of the merged sva_read_ro or the pending request is reissued.

PendReissueMergeEx (P#ReiMrgex)

PendReissueMergeEx indicates that a read request is pending and the request should be reissued when it returns and one or more sva_read_ex.nodata packet(s) have been merged while waiting for the returning request. Since the pending state always recognizes the strongest request merged, this state also includes zero or more merged sva_read_ro packets. A second request cannot be issued until the first request is closed out. When the returning request packet is received, the packet is emptied, the stronger of the merged sva_read_ex or the pending request is reissued.

PendReissueMergeEx (P#ReiMrgAt)

PendReissueMergeAt indicates that a read request is pending and the request should be reissued when it return and one or more {get,getw}.nodata packet(s) have been merged while waiting for the returning request. Since the pending state always recognizes the strongest request merged, this state also includes zero or more merged sva_read_{ro,ex}packets. A second request cannot be issued until the first request is closed out. When the returning request packet is received, the packet is emptied, the getw request is reissued.

Pendro (P#RO)

PendRo indicates that a sva_read_ro request is pending. A sva_read_ex request received while in any pending ro state, causes a transition to ReissueMergeEx pending state.

PendROMergeRO (P#ROMrgRo)

PendRoMergeRo indicates that a sva_read_ro request is pending and one or more sva_read_ro.nodata packet(s) have been merged while waiting for the returning request.

When the returning request is received, the packet is marked as merged. A sva_read_ex request received while in any pending ro state, causes a transition to ReissueMergeEx pending state.

PendEx (P#Ex)

PendEx indicates that a sva_read_ex request is pending.

PendExMerqe (P#ExMrg)

PendExMerge indicates that a sva_read_ex request is pending and an sva_read_{ro,ex} request has been merged. When the returning request is received, the packet is marked as merged.

PendExMergeAt (P#ExMrgAt)

PendExMerge indicates that a sva_read_ex request is pending and an get or getw request has been merged. When the returning request is received, the packet is marked as merged.

PendAtomic (P#At)

PendAtomic indicates that a get or getw request is pending or that a getw.nodata response has been returned.

PendAtomic (P#AtMrg)

PendAtomic indicates that a get or getw request is pending or that a getw.nodata response has been returned and a get,getw or sva_read_{ro,ex}request has been merged. When the returning request is received, the packet is marked as merged.

PendReCombine (P#Rec)

PendRecombine indicates a recombine.data.{tat,at,ex,nex} is pending from the local Ring:0. PendRecombine is only used in RDU:1.

PendMrSp (PlMrsp)

PendMrsp indicates that a response which includes merged request(s) from this Ring:0 is currently on the Ring:0. Merged requests from this Ring:0 would be indicated by Rdu:1 pending states PORoMrg*, POExMrg* or POAtMrg. While in PendMrsp additional sva_read requests are emptied to satisfy Cell transaction completion criteria.

PendMrSpMrgRo (P#MrSpMrgRo)

PendMrspMrgRo indicates that a response which includes merged request(s) from this Ring:0 is currently on the Ring:0 and a remote sva_read_ro request has been merged during this interval.

PendMrspMrgEx (P#MrspMrgEx)

PendMrspMrgEx indicates that a response which includes merged request(s) from this Ring:0 is currently on the Ring:0 and a remote sva_read_ex and sva_read_ro requests has been merged during this interval.

PendMrspM.rgAt (P#MrspMrgAt)

PendMrspMrgEx indicates that a response which includes merged request(s) from this Ring:0 is currently on the Ring:0 and a remote get or getw and sva_read_ex or sva_read_ro requests has been merged during this interval.

PendInvalidate (pInv)

PendInvalidate indicates that a pending write_invalidate, write_invalidate.lookahead is pending. Invalidates implied by sva_read_{ro,ex}, get or getw are recorded as PendRo, PendEx, or PendAt states.

RDU:0 State (RduState$_0$) Enumeration

RduState$_0$ stores Ring:0 subpage state and Ring:1 pending request (from remote Ring:0s) state. Illegal combinations of Ring:0 subpage state and Ring:1 pending State are shown as dashes. Each RduState$_1$ is named by postfixing the Ring:1 pending state name to Ring:0 subpage state.

A table showing RDU:0 pending states used in this alternate embodiment is shown in FIG. 17.

RDU:1 State (RduState1) Enumeration

RduState$_1$ stores Ring:1 subpage state and Ring:0 pending request (from remote Ring:0s) state. Illegal combinations of Ring:0 subpage state and Ring:0 pending State are shown as dashes. Each RduState$_1$ is named by postfixing the Ring:1 pending state name to Ring:0 subpage state.

A table showing RDU:1 states used in this alternate embodiment is shown in FIG. 18.

Page State

The description in the sections which follow assumes use of the preferred (as opposed to the alternate) subpage states.

OwnerLimit

OwnerLimit is set or cleared by software to limit ownership of subpages within the page to the Local Ring:0. It is stored in both RRC:0 and RRC1. When clear, OwnerLimit specifies that any Ring:0 can own the subpages. When set, specifies that only cells within the Local Ring:0 can own subpages in non-exclusive, exclusive, atomic or transcient atomic states. Remote Ring:0s can receive read only copies. When OwnerLimit is set, a page fault is signalled to ownership requests by the RRC returning the request with InvBsy and RspBsy clear. Recombine requests will not propagate beyond Local Ring:0 when OwnerLimit is set. Default state for RRC descriptor allocation is clear.

| OwnerLimit | Mnemonic | Description |
| --- | --- | --- |
| 0 | OL:All | Ownership not limited to local Ring:0 |
| 1 | OL:Local | Ownership limited to local Ring:0 |

DupLimit

DupLimit specifies the conditions which causes a duplicate.data to be forwarded from the local Ring:0 to Ring:1. DupLimit is stored by RRC:0.

| DupLimit | Mnemonic | Description |
| --- | --- | --- |
| 0 | Dup:CondForward | Conditional forwarding |
| 1 | Dup:AllForward | Always forward |

Dup:CondForward

Duplicate.data packets within the page are conditionally forwarded by RRC:0 to Ring:1, if the page is not exclusively owned by the local Ring:0. Dup:CondForward is default state for RRC descriptor allocation.

Dup:AllForward

Duplicate.data is always forwarded by RRC:0 to Ring:1.

Pending Request Page State

Some pending RRC operations effect how the RRC handles SVA requests to any subpage within a page. The Pending request page state field in corresponding Level3VEntry specifies this pending information.

Page:None

No pending page level RRC operation is in progress for the corresponding descriptor. Page:None is default state for RRC descriptor allocation.

Page:PendDeallocate

Within the RRC:0 indicates that the RRC pair is in the process of determining whether the descriptor should be deallocated or that RRC1 is being signalled to deallocate the descriptor. Within the RRC1 indicates the RRC pair is in the process of deallocating the descriptor.

The RRC descriptor transitions into Page:PendDeallocate in response to a single cell indicating that it is deallocating this descriptor. If the descriptor is not present in any cell within the Ring:0, RRC:0 and RRC1 deallocate the descriptor. Other page level packets, such as ciu inv_sum.nodata, ciu_inv_sum_allocate.no_data and ciu ex_sum.nodata are busied while in this state. Remotely originated subpage requests are busied by RRC:0 and RRC:1. Locally originated subpage requests are uneffected in RRC:0, since the requesting local cache has an allocated descriptor will prevent the RRC pair from deallocating its descriptor. Locally originated subpage requests are busied by RRC:1, since the RRC pair has committed to deallocate the descriptor. The descriptor will be subsequently re-allocated on the next request after the page has been deallocated.

Other RRC State

The following state fields are stored on a per RRC or per RRC bank basis. These state fields globally apply to all subpages and pages, unless otherwise stated.

Extract Buffer State

Empty space in Ring Extract Buffer is divided into four regions by two configurable pointers, ExtractAllThreshold and ExtractRspThreshold. The current region is selected by the number of empty words remaining in the Extract Buffer. The regions going from empty to full are: ExtBuf:All, ExtBuf:NonOpt, ExtBuf:PendReq and ExtBuf:Full. Extract Buffer State is maintained on a per RRC bank basis. The boundaries of these regions are configurable by software. Ring packets are grouped into three mutually exclusive categories for Extract Buffer management:

| | |
| --- | --- |
| 1) Optional Packet | The following remotely originated packets are optional from a coherency point of view:<br>- Recombine with SpState:(Inv\|Ro)<br>- Duplicate.data SpState:Inv<br>- sva_read_ro.data with SpState:Inv |
| 2) NonOptional Packet | Must be extracted based on SpState to complete a remotely originated request. Does not include optional packets. |
| 3) Response packet | A locally originated packet or a packet which satisfies a RRC pending request (RRC:0 Pend(1,2,3), RRC:1 Pend(1,2,3,4,5)). |

These packet categories are handled in the four extract buffer regions as follows:

| Region | Optional Packet | NonOptional Packet | Response Packet |
| --- | --- | --- | --- |
| ExtBuf:All | accepted | accepted | accepted |
| ExtBuf:NonOpt | pass | accepted | accepted |
| ExtBuf:PendReq | pass | pass and assert RspBsy,InvBsy | accepted |
| ExtBuf:Full | pass | pass and assert RspBsy,InvBsy | pass, see text |

ExtBuf:All

ExtBuf:All region is between empty and ExtractAll-Threshold. All packets are accepted in the ExBuf.All region.

ExtBuf:NonOpt

ExtBuf:NonOpt region is between ExtractAllThreshold and ExtractResponseThreshold. Nonoptional and Response packets are accepted in this region. No signalling within the packet is required when optional packets are not accepted.

ExtBuf:PendReq

ExtBuf:PendReq region is between ExtractResponseThreshold and extract buffer full. Only response packets are accepted in this region. Nonoptional packets are rejected by the assertion of RspBsy and InvBsy. No signalling within the packet is required when optional packets are not accepted.

ExtBuf:Full

ExtBuf:Full region is when the extract buffer is full. No packets can be accepted in this region. Nonoptional packets are rejected by the assertion of RspBsy and InvBsy. No signalling within the packet is required when optional packets are not accepted. A locally originated packet, is passed with pkt.TimeStamp clear. The packet will be extracted by this RRC on a subsequent Ring revolution. For remotely originated response packets, not carrying data, set both RspBsy and InvBsy. Remotely originated response packets with read only data are passed. Remotely originated ownership response packets are passed and RRC1 transitions to Pend1:ReIssue.

Pend1:Reissue state is used by RRC:1 to prevent spurious missing_page_error (page fault) by differentiating between the case of a remotely originated ownership packet that wasn't extracted to satisfy a pending request and a missing page. When set Pend1:Reissue indicates that the RRC1 might have missed a potential non-RRC originated response packet to an RRC originated request. If the RRC1 originated request returns without a response and Pend1:ReIssue then the returning request is busied by the RRC causing the requesting processor cell or RRC to reissue the request, thereby preventing a spurious page fault. RRC:0 uses the SpState field to prevent missing_page_error. The RRC:0 SpState field records whether a read only copy or ownership is within the Ring:0 to satisfy the request. If the RRC:0 originated request returns without a response and a sufficient copy or ownership exists within the Ring:0, the request is reissued.

Ring Freeze State

In addition to the following states, the RRC must keep track of the first and last packet marked frozen.

Fz:None

Fz:None indicates that the RRC is not in Ring Freeze sequence.

Fz:SingleEccErr

Indicates a correctable Ecc error has been detected during the lookup sequence corresponding to this packet time. Start of Ring:1 Freeze sequence. Always transitions to Fz:Freeze during the next packet time. The corresponding packet is handled as described under Extract Buffer full section.

Fz:Freeze

Indicates that the RRC is in a Ring Freeze sequence. All packets not previously marked frozen, are marked frozen.

Fz:UnFreeze

Indicates that the RRC has ended a Ring Freeze sequence. All packets previously marked frozen, are marked unfrozen and processed normally by the RRC. Any condition which initiates a Ring Freeze sequence, would transitions to Fz:SingleEccErr or Fz:Freeze states.

Rules Tables Basics

Ownership

The foundation of strong ordering is based on the rules ownership concept. Each subpage in memory system has a single owner. For the value of a subpage to be modified, the owner must be exclusive meaning all copies of the subpage has been invalidated. When read only copies of a subpage exist, the owner is non-exclusive and cannot modify the subpage. The subpage ownership can be transferred dynamically between caches, with the owning cache being the dynamic home for the subpage.

The memory system and RRC specifically is based on the property of inclusion. The RRC directory keeps track of the state of all subpages within the Ring:0 and the state of all pending requests entering or leaving a Ring:0.

Other Concepts

Owner and Invalidation Requests

All owner requests and write invalidate requests go all the way to the owning cell regardless of what other requests are outstanding. All owner requests and invalidates will cause an RRC to go to Pend:Owner when the packet is inserted onto the Ring. That is, the RRC:1 goes to Pend:Owner when the packet is inserted onto Ring:1 and the RRC:0 goes to Pend:Owner when it inserts the packet onto Ring:0.

An RRC will transition from Pend:Owner to Pend:-None when:

1—An owner carrying packet is extracted by the RRC.
2—An RRC:0 with SpState: (Inv/Ro) extracts a remote owner requests or invalidate with pkt.!InvBsy.
3—An RRC with SpState:Owner extracts a locally originated invalidate with pkt.!InvBsy.
4—Page destruction always sets SpState:Inv and Pend:None for all subpages within the page in the local RRC:0 and RRC1 and all remote RRC:1s with the page allocated. All pending state is cleared, so that page faults can be signaled to other pending requests (the requests would hang busy or timeout otherwise).

Read Only Requests

Locally originated read only requests are only inserted by the local RRC1 if the RC:1 is not Pend:Ro. This is an optimization to avoid flooding too many identical requests onto Ring:1 and eventually the responder. Instead of inserting a such a request, the RRC1 will extract it and set pkt.RspBsy. The RRC:0 at the responder, however, does not bounce back read only requests in this way. Instead the read only request are inserted on the Ring:0.

The RRC transitions from Pend:Ro to Pend:None when an owner carrying packet or read only data carrying packet is extracted by the RRC.

A packet carrying read only data is "killed" when it passes an RRC in Pend:Owner state. An sva_read_ro packet is "killed" by setting pkt.RspBsy and a duplicate is emptied.

Clearing and Interpretation of Packet Busy Bits

RspBsy can always be cleared when responding with data to a request packet.

InvBsy is always clear when leaving the originating Ring:0, since the RRC:0 will not extract the packet if pkt. InvBsy. The RRC will pass the packet and set pkt. InvBsy,RspBsy to cause the request to be reissued. InvBusy is always clear, when a remote ownership request or invalidate is enters a remote Ring:0, since an RRC1 will not extract a request if pkt. InvBsy. The RRC:1 will pass the packet and set pkt. InvBsy. RspBsy to cause the request to be reissued. The lookahead will actually continue and initiate invalidates on the remain Ring:0s with SpState:Ro.

Use of Packet RRC Bit

Used by sva_read_ro, recombines and release to indicate that the packet should be reissued by the originating cell or RRC if the request is not completed. Pkt.rrc is used in two manners.

Pkt.rrc is used to allow a sva_read_ro.no_data or recombine.data request to traverse the entire Ring:0, to allow the request to completed locally, rather than the RRC:0 prematurely extracting the packet. Pkt.rrc is set when a locally originated sva_read_ro.no_data or recombine.data passes the RRC:0. If the request has not been completed (sva_read_ro.data or recombine.no_data) prior to returning to the originating cell, the originating cell passes the packet. The RRC:0 extracts the packet with rrc set and processes the request normally.

When an RRC:0 or RRC1 can't extract a non-originated recombine.data or release.data to satisfy a pending request (called snarf) it sets rrc bit so that the packet can be re-circulated. If the release.data returns to the originating cell, it must be re-issued. If the release.data is extracted by another cell, no action is required, since another release will be issued since transient atomic subpage state is preserved (tat). The recombine.data should not be extracted by any cell and is passed by the originating CIU, effecting a reissue.

Pkt.rrc is always initialized to clear and passed by CCU and CIU. It is cleared by RRC:0, when locally originated packet is extracted.

Invalidation Method

Several types of packets cause invalidation of read only copies. Write_invalidate causes an explicit invalidation and sva_read_ex, get, and getw packets cause implicit invalidation in addition to a read request. All invalidates are guaranteed to remove all read only copies based on two methods. First is that the invalidate packet causes all read only copies it passes to be invalidated. Secondly, when a sva_read_ro passes a request with a pending invalidate, the requestor asserts rsp_busy to indicate the data in packet has been invalidated and to prevent a spurious page fault. When a duplicate.data passes a request with a pending invalidate, the packet is emptied. The first method invalidates all cells or RRCs and the second method prevents stale read only data from propagating to cells which have already been invalidated.

In order to maintain strong sequential consistency and strong ordering of events, all copies of subpage A must be invalidated prior to the invalidator updating and distributing subpage B. If the invalidate were processes serially by each Ring:0, the invalidation time would be the sum of the Ring transit times of all Ring:0s with copies of the subpage. If the invalidate were just copied by each RRC:1, invalidates of subpage A are not guaranteed to complete prior to the original invalidator updating subpage B and distributing it to processors which have not yet invalidated subpage A. Strong ordering of events is violated since all processors do not see the changes to subpages A and B in the same order.

A technique called invalidate lookahead is used to invalidate all Ring:0s in parallel, but maintain a strong ordering of events. When an invalidate packet reaches the first RRC1, which would extract the packet, the packet is copied and forwarded to Ring:0 and a lookahead packet is spawned on on Ring:1 by setting lookahead mode in Ring:1 packet. The lookahead packet is copied by each RRC:1 in SpState:Ro to invalidate its read only copy prior to the real request packet reaching it. When the original request packet reaches subsequent RRC:1s, the packet is passed at Ring:1 speed, since the invalidate has previously completed due to the lookahead packet. The lookahead packet is always considered a short packet.

Figure 14A:
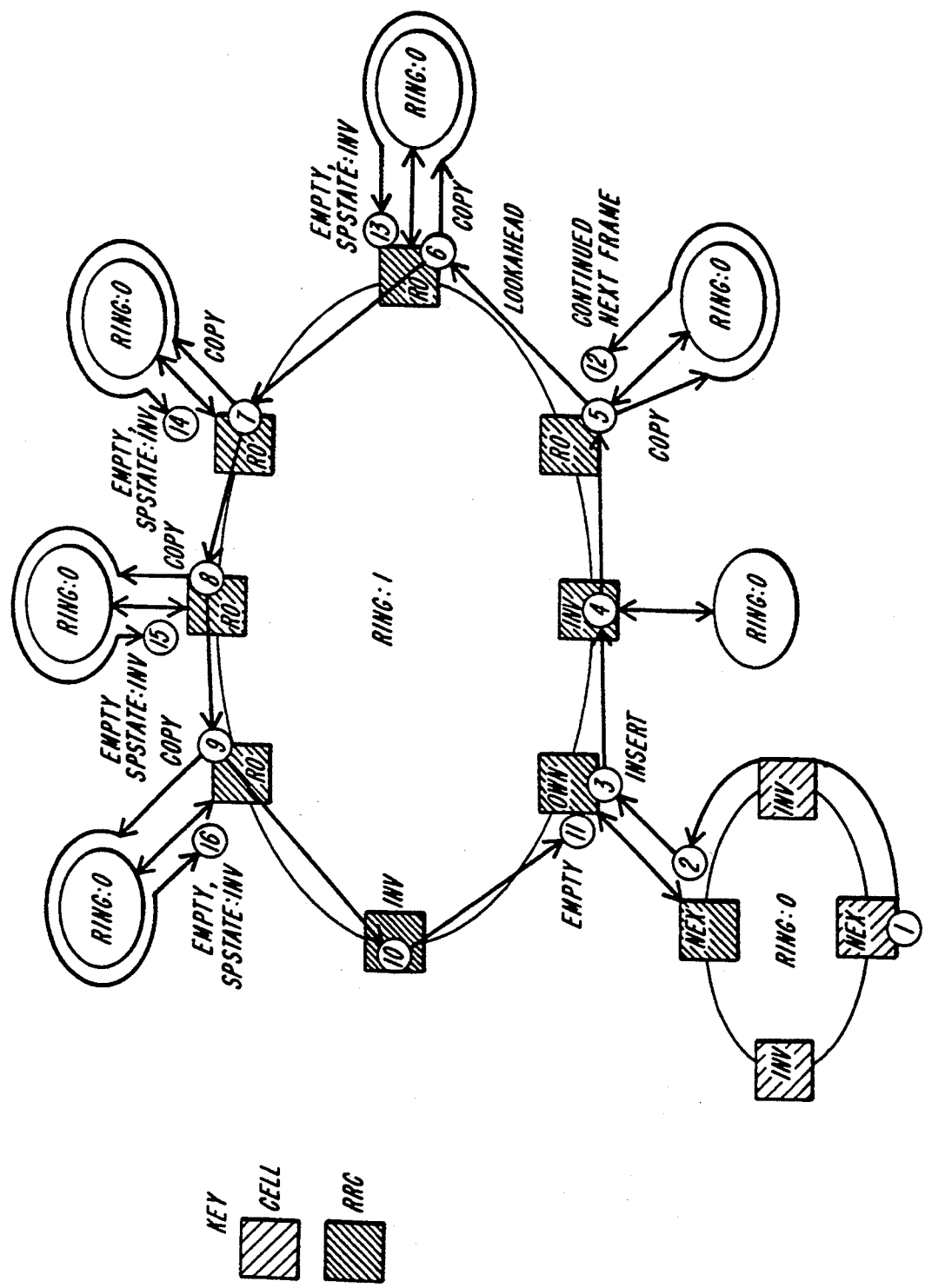
FIGS. 14A and 14B depict a preferred invalidate sequence in a system constructed in accord with the invention.
Figure 14B:
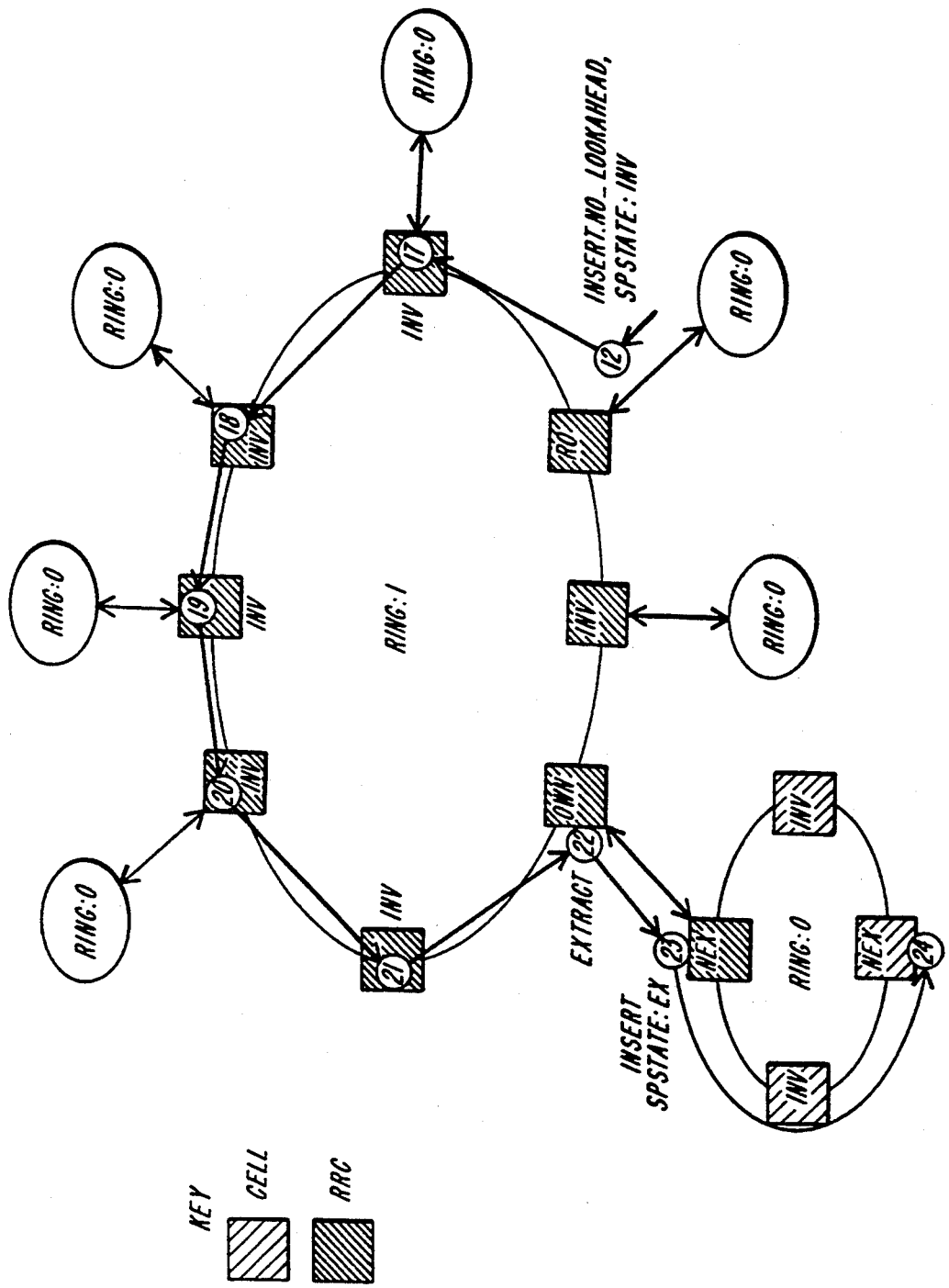

FIGS. 14A and 14B depict a preferred Ring:1 Invalidate Sequence. Write_invalidate is extracted from a Ring:0 (step 2) when RDU:0 Spstate is Nex and a sva_(read_ex,get,getw)) is extracted from a Ring:0 when the RDU:0 SpState is not Ex. The packet is forwarded to RRC:1 and inserted onto Ring:1 (step 3). The first RRC:1 which owns or has a read only copy of the subpage, copies the packet, it changes lookahead mode to no_lookahead and forwards the packet to the Ring:0 (step 5). The passed Ring:1 packet create lookahead mode is unchanged. Subsequent RRC:1s with read only state, copy the invalidate.lookahead packet (steps 6,7,8,9). The invalidate_lookahead is passed to Ring:0, inserted and Pend1State transitions to OwnInv. When the Ring:0 invalidation is complete, SpState transitions to inv, Pend State transitions to none, the packet is returned to RRC:1, RDU:1 SpState is updated to inv and the lookahead packet is emptied (steps 13,14,15,16).

Meanwhile, when the first RRC:1 and corresponding Ring:0 have completed the invalidation or ownership response, the packet is inserted in no_lookahead state back onto Ring:1 (step 12). When this no_lookahead packet encounters the subsequent RRC:1s (and corresponding Ring:0s) which have previously completed the invalidation due to the lookahead packet, the packet can be passed at full Ring:1 speed (steps 17,18,19,20). If the actual invalidate arrives before the invalidate lookahead is complete, the actual invalidate also traverses the Ring:0. When the lookahead packet reaches the requesting RRC:1, the packet is emptied (step 11). When the no_lookahead or create_lookahead packet reaches the requesting RRC:1, it is extracted and forwarded to the requesting Ring:0 (step 22) and returned to the requestor (step 24).

False RRC SpState:Ro

Under certain circumstances, the RRC pair has recorded read only state (SpState:Ro) for a subpage, but the subpage is invalid (SpState:Inv) within the Ring:0, since no read only copies exist in any of the cells. The RRC pair deallocates the descriptor only when the last Cache within a Ring:0 deallocates the corresponding descriptor. When a Cache deallocates a descriptor, the state of the subpages within the Cache are invalid or read only. When the Cache deallocates the descriptor, read only copies are just deleted, but the RRC is not notified of the individual read only subpage involved. Thus when a cache within a Ring:0 deallocates the descriptor, with other Caches within the Ring:0 having the descriptor allocated and the only read only copy of the subpage within the Ring:0 is deleted, the RRC falsely still records read only state for the subpage. Another example is when a recombine with non-exclusive packet state leaves a Ring:0, the RRC:0 and RRC:1 must record SpState:Ro, in case a read only copy exists within the Ring:0.

False read only state is corrected by the RRC:1 picking up copy of read only data packets when in SpState:-(Inv/Ro).

Duplicate Distribution

Read only copies of subpages are distributed to multiple Caches in two manners. Copies are distributed implicitly by any RRC:1 or Cache copying a remotely originated packet with read only data when the descriptor is locally allocated and the SpState:(Inv/Ro). Thus the number of read only requests are reduced, since copies are distributed to all Ring:0s connected to RRC:1s which the read only data carrying packet passes on Ring:1.

Duplicate.data packets are forwarded from the originating Ring:0 based on DupLimit. If Dup:CondForward, duplicate packets are conditionally forwarded by RRC:0 to Ring:1, if the page is not exclusively owned by the local Ring:0. If Dup:AllForward, duplicate packets are always forwarded by RRC:0 to Ring:1. Ring:1 duplicate.data packets are copied by a remote RRC:1 when it has a descriptor allocated for the corresponding page within its local Ring:0 and the Extract Buffer is in the ExtBuf:All region.

Pkt.pcopy is set by RRC:1 to indicate the packet was copied from Ring:1. Packets which are copied from Ring:1 with Pcopy set, are not required to be returned to RRC:1 or Ring:1 and are emptied by RRC:0 after successfully traversing Ring:0.

Recombine

Recombine.data packets are forwarded from the originating Ring:0 if no other cell within the Ring:0 accepts the recombine. The RRC:1 determines the packet must be forwarded out of the originating Ring:0 in a similar manner to locally originated Ro request with false RRC SpState:Ro case. On the first pass of the recombine.data, the RRC:0 sets pkt.RRC. If the recombine.nodata returns to the originating cell, the recombine is extracted and closed out. If the recombine.data.rrc returns to the originating cell, the cell passes the packet. The RRC:0 then extracts the recombine.data.rrc and forwards it the local RRC:1 for insertion onto Ring:1.

Ring:1 recombine.data packets are extracted by a remote RRC:1 when it has a descriptor allocated for the corresponding page within its local Ring:0 and the Extract Buffer is in the Extbuf:All region. Recombine.data can also be used to satisfy any pending request.

Release

When a locally originated release is inserted onto a Ring:, Pend:Owner state is recorded so that a subsequent release can be routed back to the originating Ring:0 to satisfy possible pending getw requests with prior already atomic response. When a remotely originated release is inserted onto a Ring:0, Pend:Owner state is recorded so that a subsequent release can be routed back to the Ring:1.

Page Faults

Page faults are detected in a Ring:1 system by a request completely traversing the Ring:1, without any RRC detecting a descriptor match. The packet.nodata indicates a page fault condition by RspBsy clear and InvBsy clear. The packet is then extracted by the originating RRC:1 and returned to Ring:0 and then the requesting cell.

When a page fault occurs, the local RRC1 will be left in Pend:Owner or Pend:Ro. This condition must be cleared by system software prior to creation of the page. Execution of a mpdw.invsum instruction from the any cell within the fault (after the page has been anchored of course) will cause a CiuInvSum packet to be issued.

```
RDU:1 Basic Subpage Rules
Packets From Connected Ring:0
Packet.nodata, Originated by Local Ring:0
   if page_not_allocated allocate page;
   if Page:PendDeallocate (extract.RspBsy.InvBsy,-) else
   sva read ro: if Pend:Inv (insert,Pend:Ro)
            else if Pend:Owner (insert,-)
            else if !ExtBuf:Full
            (insert.extract.RspBsy,-);
sva_read_ex,
sva_get,
sva_getw,
write_inv: (insert,Pend:Owner);
recombine,
release,
duplicate: if !ExtBuf:Full
(insert.extract.error,-);
Packet.nodata, Originated by Remote Ring:0
if page_not_allocated error
else if Page:PendDeallocate (insert.RspBsy.InvBsy,-)
else
   sva_read_ro: if SpState:(Inv|ro) (insert,-)
            else (insert.RspBsy,-);
sva_rea_ex,
sva_get,
sva_getw,
write_inv: if pkt.Lookahead
   if SpState:(Inv|Owner) (empty,-)
   else if pkt (!InvBsy&!RspBsy)
   (empty,SpState:Inv) else if
   !ExtBuf:Full
   (insert.extract.!RspBsy.!InvBsy,-)
   else /* !Lookahead */
```

-continued

```
        if SpState:Inv (insert,-)
        else if SpState:Owner
        (insert.RspBsy,-)
        else if pkt.(!InvBsy&!RspBsy)
        (insert,SPState:Inv) else
        (insert,-);
recombine,
release: if SpState:Owner (insert,-)
        else (insert.error,-)
duplicate: (insert.error,-);
Packet.data
if page_not_allocated error
else if Page:PendDeallocate
        if !OriginateLocal
        (insert.RspBsy.InvBsy,-)
        else if !ExtBuf:Full
        (insert.extract.RspBsy.InvBsy,-)
        else
sva_read_ro,
duplicate: if SPState: ( RoEx) (insert,-)
        else error,
release: if OriginateLocal
        if SpState:Owner
        (insert,SpState:Inv.Pend:Owner)
        else if !ExtBuf:Full
        (insert.extract.error,-)
        else/* !OriginateLocal */
        if SpState:Owner
        (insert,SpState:Inv)
        else if !ExtBuf:Full
        (insert..error,-)
recombine: if SpState:Owner
        if PktState.nex (insert,SpState:Ro)
        else (insert,SpState:Inv);
        if OriginateLocal
        if ExBuf.Full
        (insert.extract.error,-);
        else (insert.error,-);
sva_read_ex: if OrignateLocal
        if SpState:Owner
        if PktState.nex
(insert,SpState:Ro)
        else (insert,SpState:Inv)
        else if
!ExtBuf:Full(insert.extract.error,-)
        else/* !OriginateLocal */
        if pkt.InvBsy (insert,SpState:Ro)
        else (insert,SpState:Inv)
        else (insert.error,-);
Packets From Ring:1
Packet.nodata, Originated by Local Ring:0
if page_not_allocated error
else if Page:PendDeallocate error
else
sva_read_ro: if ExtBuf:Full (pass.!Timestamp,-)
        else if Pend1:Reissue
        (extract.RspBsy,-) else
        (extract,-);
sva_read_ex,
sva_get,
sva_getw,
write_inv: if pkt.Lookahead (empty,-)
        else if ExtBuf:Full
        (pass.!Timestamp,-) else if
        Pend1:Reissue (extract.RspBsy,-)
        else if SPState:Owner
        (extract,Pend:None) else
        (extract,-);
recombine,
release: if ExtBuf:Full (pass.!Timestamp,-)
        else (extract,-);
duplicate: (empty.error,-)
Packet.nodata, Originated by Remote Ring:0
if page_allocated
        if Page:PendDeallocate
        (pass.RspBsy.InvBsy,-)
        else (
sva_read_ro: if SpState:Inv (pass,-)
        else if ExtBuf: (AllOpt)
        (extract,-)
sva_read_ex,
```

```
sva_get,
sva_getw,
write_inv: if pkt.Lookahead
        if SpState:Ro &
        ExtBuf{All|NonOpt}
        (copy.!InvBsy,-) else (pass,-)
        else if pkt.(!InvBs&!RspBsy)
        if SpState:(Ro|Owner)
        if ExtBuf: (All|NonOpt)
        (pass.Lookahead.,copy,-)
        else (pass.RspBsy.InvBsy,-)
        else (pass,-)
        else if SpState:Owner
        (pass.RspBsy,-)
        else (pass,-);
recombine,
release: (pass,-)
duplicate: (pass.error,-);
Packet.data
if page_not_allocated error
else if Page:PendDeallocate error
else (
sva_read_ro: if OriginateLocal
        if pkt.pcopy (empy,-)
        if ExtBuf:Full
        (pass.!Timestamp,-)
        else if Pend:Ro
        if SPState:Inv
        (extract,SpState:Ro.Pend:None.Pend1:None)
        else
(extract,Pend:None.Pend1:None)
        ;
        else
        if SpState:Inv
        (extract,SpState:Ro);
        else (extract,-);
        else /* !OriginateLocal */
        if Pend:Owner (pass.RspBsy,-)
        else if Pend:Ro
        if ExtBuf:All
        (copy,SpState:Ro,Pend:None.Pendl:None)
        else if !SpState:Owner
        (copy,SpState:Ro)
        else (pass,-);
duplicate: if OriginateLocal (empty,-);
        else if Pend:Ro
        if ExtBuf:All
        If SpState:Inv
        (copy,Spstate:Ro,Pend:None.Pendl:None)
        else
        (copy,Pend:None,Pend1:None);
        else if Pend:Owner (empty,-)
        else (copy,-);
        /*dependent on false ro
policy*/
sva_read_ex: if OriginateLocal
        if ExtBuf-Full (pass.!Timestamp,-)
        else if Pend:None
        (extract,SpState:Owner);
        else
        (extract,SpState:Owner.Pend:None.Pendl:None);
        else /* !OriginateLocal */
        if Pend:None
        (extract,SpState:Owner);
        else (pass,Pend1:Reissue);
recombine: if OriginateLocal
        if ExtBuf:Full
        (pass.!Timestamp,-)
        else if Pend:None
        (extract,SpState:Owner);
        else
        (extract,SpState:Owner.Pend:None.Pend1:None);
        else/* !OriginateLocal */
        if Pend: (RoOwner)
        if !Extbuf:Full
        (extract,SpState:Owner.Pend:None.Pend1:None)
```

```
        else (pass,Pend1:Reissue);
        else if page_allocated
        if ExtBuf:All
           (extract,SpState:Owner)
        else (pass,-);
release: if OriginateLocal
        if Extbuf:Full
           (pass.!Timestamp,-)
        else if Pend:None
           (extract,SpState:Owner);
        else
           (extract,SpState:Owner.Pend:No
           ne.Pend1:None);
        else/* !OriginateLocal */
        if Pend: (RoOwner)
        if !Extbuf:F.ull
           (extract,SpState:Owner.Pend:No
           ne.Pend1:None)
        else (pass.rrc,-);
        else (pass,-);
sva_get,
sva_getw: if Originate Local
        if ExtBuf:Full
           (pass.!Timestamp,-)
        else (extract,-);
        else (pass,-);
RDU:0 Basic Subpage Rules
Packets From Connected Ring:1
Packet.nodata, Originated by Remote Ring:0
if page_not_allocated error
else if Page:PendDeallocate
        if !ExtBuf:Full
           (insert.extract.RspBsy.InvBsy,-)
        else
sva_read_ro: if Pend:None (insert,Pend:Ro)
        else (insert,-);
sva_read_ex,
sva_get,
sva_getw,
write_inv: if pkt.Lookahead
        if SpState:InvPend:Owner (empty,-)
        else (insert,P.end:Owner);
        else /* !Lookahead */
        if SPState:Inv & !ExtBuf:Full
           (insert.extract,-)
        else (insert,Pend:Owner);
recombine,
release,
duplicate: if !ExtBuf:Full (insert.extract.error,-)
Packet.nodata, Originated by Local Ring:0
/* not effected by Page:PendDeallocate state */
if page_not_allocated error else
sva_read_ro: (insert,-);
sva_read_ex,
sva_qet,
sva_getw,
write_inv: if pkt.(InvBsy|RspBsy) & !ExtBuf:Full
           (insert.extract.!RspBsy.!InvBsy,-)
        else if SpState:Nex (insert,SpState:Ex)
        else (insert,-);
recombine,
release: (insert,-)
duplicate: (pass.error,-)
Packet.data
if page_not_allocated error
else Page:PendDeallocate
        if !OriginateLocal
        if !ExtBuf:Full
           (insert.extract.RspBsy.InvBsy,-)
        else (
sva_read_ro,
duplicate: if SpState:Inv (insert,SpState:Ro)
        else if SpState: (RoNex) (insert,-)
        else if OriginateLocal (insert.error,-)
        else if !ExtBuf:Full
           (insert.extract.error,-)
sva_read_ex: if SpState:(InvRo)
        if PktState.nex
           if pkt.!InvBsy (insert,SpState:Ex);
           else (insert,SpState:Nex)
        else (insert,SpState:Ex);
        else if OriginateLocal (insert.error,-)
        else if !ExtBuf:Full
           (insert.extract.error, );
recombine: if SpState:Inv
           if PktState.nex (insert,SpState:Nex)
           else (insert,SpState:Ex)
        else if SPState:Ro & PktState:Nex
           (insert,SpState:Nex)
        else if OriginateLocal (insert.error,-)
        else if !ExtBuf:Full
           (insert.extract.error,-);
release: if OriginateLocal
        if SpState:Inv (insert,SpState:Ex)
        else (insert.error,-);
        else/* !OriginateLocal */
        if SpState:Inv
           (insert,SpState:Ex,Pend:Owner)
        else if !ExtBuf:Full
           (insert.extract.error,-);
        /* Same as
sva_get,
sva_getw: (insert,-)
Packets From Ring:0
Packet.nodata, Originated by Remote Ring:0
if page_not_allocated error
else if Page:PendDeallocate
        if !ExtBuf:Full (extract.RspBsy.InvBsy,-)
        else (pass.!Timestamp.RspBsy.InvBsy,-)
else (
sva_read_ro: if !ExtBuf:Full (extract,-)
        else (pass.!Timestamp,-);
sva_read_ex: if pkt.Lookahead
        if SpState:(NexEx) (empty,-)
        else if ExtBuf:Full (pass.!Timestamp,-)
        else if SpState:Inv
           (extract,Pend:None);
        else if pkt.!InvBsy
           (extract,SpState:Inv.Pend:None)
        else (extract,-)
        else /* !Lookahead */
        if ExtBuf:Full (pass.!Timestamp,-)
        else if SpState: (Nex|Ex ) (extract,-)
        else if SpState:Inv (extract,Pend:None)
        else if pkt. [!InvBsy&!RspBsy)
           (extract,SpState:Inv.Pend:None)
        else (extract,-);
release,
recombine: if ExtBuf:Full (pass.!Timestamp,-)
        else (extract,-);
duplicate: if !ExtBuf:Full (extract.error,-)
)
Packet.nodata, Originated by Local Ring.0
/* not effected by Page:PendDeallocate state */
if page_not_allocated & pkt.!Invis allocate_page;
(
sva_read_ro: if pkt.rrc
           if SpState:(Nex|Ex) (pass,-)
           else if ExtBuf:(All|NonOpt) (extract,-)
           else (pass,-)
        else /* !rrc */
           if SPState:(Ro|Nex|Ex) (pass.rrc,-)
           else if ExtBuf(All|NonOpt) (extract,-)
           else (pass.RspBsy,);
sva_read_ex,
sva_get,
sva_getw: if SPState:Ex (pass,-)
        else if pkt.InvBsy (pass.RspBsy,-)
        else if ExtBuf:(All|NonOpt)(extract,-)
        else (pass.RspBsy,-);
write_inv: if SpState:Ex (pass,-)
        else if pkt.InvBsy (pass.RspBsy,-)
        else if SpState:Nex
           if ExtBuf:(All|NonOpt) (extract,-)
           else (pass.InvBsy,-);
        else (pass.error,-)
release,
recombine: (pass,-);
duplicate: (pass.error,-)
)
Packet.data
if page_not_allocated error
```

-continued
```
else Page:Penddeallocate
    if !OriginateLocal
        if !ExtBuf:Full
(extract.RspBsy.InvBsy,-)
            else (pass.!TimeStamp,-);
else
sva_read_ro: if OriginateLocal
    if Pend:Owner (pass.RspBsy,-)
    else if Pend:None (pass,-)
    else if !ExtBuf:Full
        if SpState:Ex
(pass,copy.pcopy,SpState:Nex.Pend:None)
            else
(pass,copy.pcopy,Pend:None)
        else pass;
    else /* !OriginateLocal */
        if pkt.pcopy (empty,-)
        else if ExtBuf:Full
(pass.!Timestamp,-)
        else if Pend:Ro
            if SpState:Ex
(extract,SPState:Nex.Pend:None
)
            else (extract,Pend:None);
        else
            if SpState:Ex
(extract,SpState:Nex)
            else (extract,-);
duplicate: if OriginateLocal
    if Pend:Owner (empty,-)
    else/* !OriginateLocal */
        if Pend:Ro & ExtBuf: (All|NonOpt)
            if SpState:Ex
(pass,copy.pcopy,SpState:Nex.Pend:None)
            else (pass,copy.pcopy,Pend:None);
        else if (!page_all_ex&Dup:ConForward)
            |Dup:AllForward
            if ExtBuf:All
                if SpState:Ex
(pass,copy.pcopy,SpState:Nex)
                else (pass,copy.pcopy,-);
        else (pass,-);
sva_read_ex: if OriginateLocal
    if Pend:None (pass,-)
    else if !ExtBuf:Full
        if PktState.Nex
(extract,SpState:Ro.Pend:None)
            else
            (extract,SpState:Inv.Pend:None
            else (pass,-)
    else/* !OriginateLocal */
        if ExtBuf:Full (pass.!Timestamp,-)
        else if pkt.(!RspBsy&!InvBsy)
(extract,SpState:Inv.Pend:None)
            else (extract,SpState:Ro);
release: if OriginateLocal
    if Pend:None (pass,-)
    else if !ExtBuf:Full
(extract,SpState:Inv.Pend:None)
        else (pass.rrc,-);
    else/* !OriginateLocal */
        if ExtBuf:Full (pass.!Timestamp,-)
        else (extract,SpState:Inv.Pend:None);
recombine: if OriginateLocal
    if Pend: (Ro|Owner) & !ExtBuf:Full
        if PktState.Nex
(extract,SpState:Ro.Pend:None)
            else
            (extract,SpState:Inv.Pend:None
            );
    else if pkt.!rrc (pass.rrc,-)
    else if !ExtBuf:Full
        if PktState:Nex
(extract,SpState:Ro)
            else (extract,SpState:Inv);
        else (pass,-);
    else/* !OriginateLocal */
        if ExtBuf:Full (pass.!Timestamp,-)
        else if Pend:(Ro|Owner)
            if PktState:Nex
(extract,SpState:Ro.Pend:None)
            else
(extract,SpState:inv.pend:None);
        else
            if PktState:Nex
(extract,SpState:Ro)
            else (extract,SpState:Inv);
sva_get,
sva_getw: if OriginateLocal (pass,-)
    else if ExtBuf:Full (pass.!Timestamp,-)
    else (extract,-);
```

Page Operations

Page Allocate

A descriptor is allocated by the local cell prior to any cell SVA request. The RRC pair allocates a descriptor when the first locally originated request packet (always nodata) is received from the local Ring:0. If a page fault was signalled to a request, the descriptor remains allocated in the cell and RRC pair. One or more descriptors can be allocated for pages not present in the memory system. A descriptor must be allocated for the page to be created. The following table specifies the default state of an allocated descriptor:

| Descriptor Field | Default State |
| --- | --- |
| Descriptor Tag | Pkt page address |
| Subpage State | Invalid |
| OwnerLimit | OL:All |
| DupLimit | Dup:CondForward |
| Pending Page State | Page:None |

Page Deallocate

Local cache and local RRC pair descriptors are only deallocated by the CiuInvSumAlloc.nodata, CiuPureInvSumAlloc.nodata or RrcDeallocDesc.nodata packets. These three packets will be referred to as deallocate packets. If the deallocate packet indicates that no other caches within the Ring:0 have the page allocated, the local RRC pair deallocates the descriptor corresponding to the page. RRC:0 transitions to Page:PendDealloc while it is determining if the descriptor should be deallocated to prevent race conditions between multiple deallocate packets and other page oriented packets. If no other cells have allocated descriptors for the page, the RRC pair deallocates the descriptor. Both RRCs must be in Page:PendDeallocate state prior to either RRC deallocating the descriptor. The local RRC pair does not signal remote RRCs that descriptors have been deallocated. First the deallocation sequence is described, then interactions with subpage and page operations are discussed.

The deallocate sequence is initiated by the CCU sending a CiuLoadDropReg packet to the CIU. The packet address and CCU prt entry correspond to the page to be deallocated. The CIU processes the packet by loading the address into its dropping register, extracting the packet to return it to the CCU. When loaded with a valid address, the CIU dropping register causes the CIU to assert RspBsy to requests for owned subpages and ignore all other page or subpage address which matches the dropping register. Dropping register match overrides cache group match.

When the CCU receives the returned CiuLoadDropReg packet, it deallocates the old descriptor by writing the new descriptor in its place, deallocates the prt entry and issues a CiuInvSumAlloc packet if the deallocated page is not pure. If the deallocated page is pure, CiuPureInvSumAlloc packet is issued. The deallocate packet address is the page address to be deallocated (pkt.address[5:0] contains the CCU descriptor group) and dataword0 contains the page address being allocated. A pending CEU request can be processed, even at the newly allocated address, since no prt is required for the deallocate packet. The mrdd (RRC deallocate descriptor) instruction causes the CCU to issue a RrcDeallocDesc packet without allocating a prt.

Figure 15:
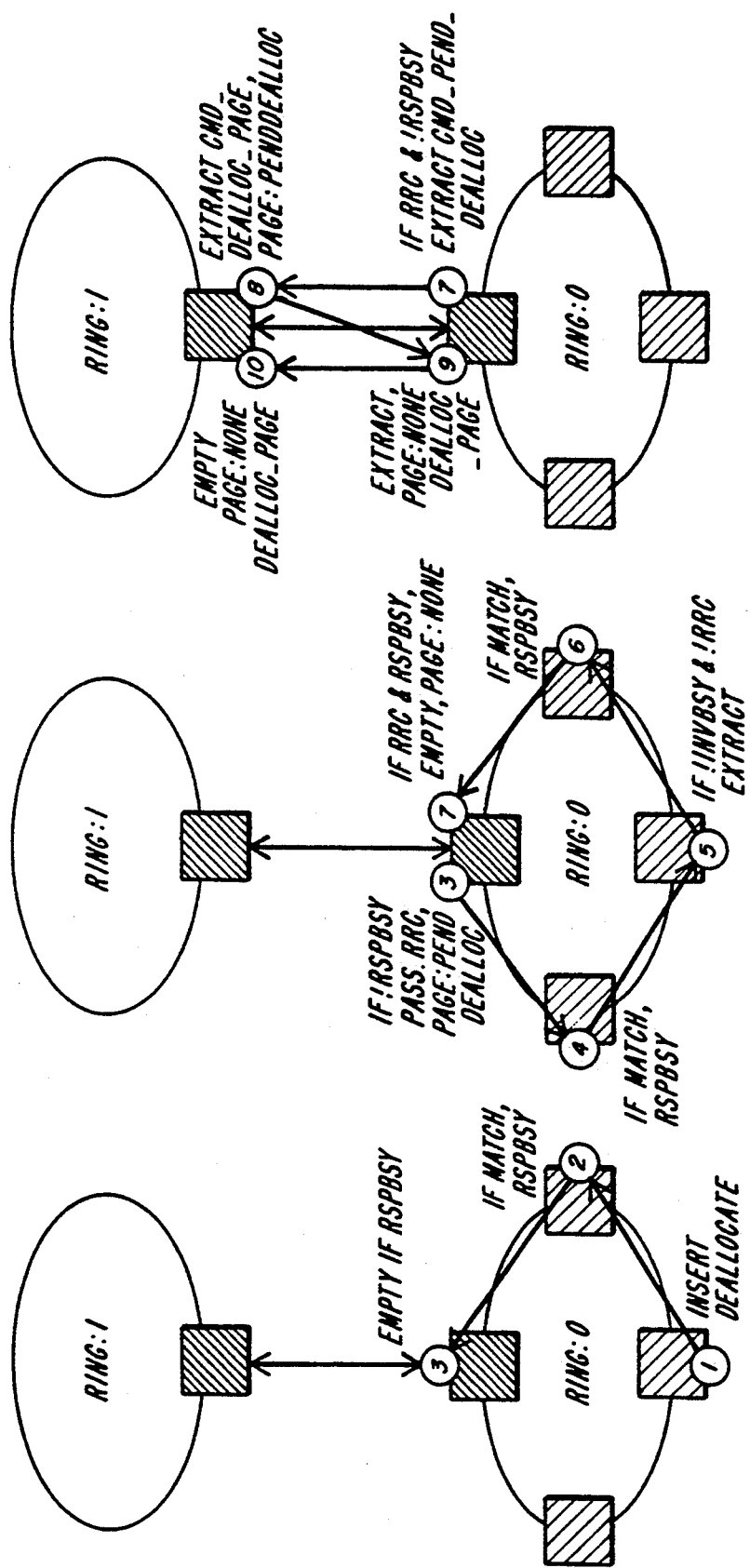
FIG. 15 depicts a preferred deallocate sequence used in a system constructed in accord with the invention.

FIG. 15 depicts a preferred deallocate sequence used in a system constructed in accord with the invention. The CIU processes the CiuInvSumAlloc or CiuPureInvSumAlloc packet by deallocating the old descriptor by writing the newly allocated descriptor in its place, setting all subpages of new allocated page to invalid (using summaries), setting dropping register to invalid and inserting the packet (step 1). The CIU processes the RrcDeallocDesc packet by inserting the packet without any modification to CIU directory state.

As the deallocate packet traverses the Ring:0, RspBsy is asserted by any CIU which has the descriptor allocated (steps 2,4,6).

The RRC:0 empties the CiuInvSumAlloc or RrcDeallocDesc request if RspBsy is asserted, indicating that the descriptor is allocated in other caches within the Ring:0 (step 3). If RspBsy is not asserted, the RRC:0 the deallocate packet must now completely traverse the Ring:0 to check all local caches for this page being allocated, since the packet has only traversed the portion of the Ring:0 between the deallocating cache and the RRC0. The RRC:0 passes the packet, setting the RRC bit, clearing RspBsy and InvBsy and transitions to Page:PendDeallocate. The RRC bit is used to indicate that the packet has passed the RRC0. If the RRC cannot process the packet due to refresh or ecc error it sets InvBsy and processes the deallocate packet on the next revolution. Subsequent deallocate.!RRC packets received, while PagePendDeallocate are emptied, since the cells which issued these deallocate packets will not assert RspBsy on the current revolution of the first deallocate packet. The reason that the RRC:0 negates RspBsy on the first deallocate packet is handle the window where a cell which issued the subsequent deallocate packet asserted RspBsy on the first partial revolution of the first deallocate packet.

If the deallocate packet is CiuPureInvSumAlloc, the RRC:0 extracts the packet, sets pkt.cmd_pend_dealloc and forwards the packet to the local RRC:1 skipping to step 8 (RRC:1 processing). CiuPureInvSumAlloc can only be issued by a cell which owns all subpages within the page, guaranteeing that any other allocated descriptors have all subpages invalid. Thus the RRC:0 skips sending the CiuPureInvSumAlloc packet around the Ring to determine if any cells have the page allocated. The page will be allocated by the RRC is one of the cells within the Ring:0 subsequently requests a subpage within the page.

All remotely originated packets received from Ring:1 when in Page:PendDealloc state, are returned unmodified to the Ring:1. If a sva_read_ro packet is returned(-Ring:0 state was SPState:Ro), another Ring:0 will supply a copy of the subpage. A recombine.data is returned since the cell and RRC pair descriptors are about to be deallocated. Page destroy sequences always set all subpages to invalid prior to deallocation, so that SpState:{Nex,Ex} will not be present.

If the configuration does not contain an RRC, both InvBsy and RRC will be negated. The original requestor empties the deallocate packet if packet.request_id matches cell_address, !InvBsy and !RRC (step 5).

The RRC:0 empties the deallocate.RRC packet after it full Ring:0 traversal (step 7), if caches have indicated the page is allocated by asserting RspBsy. Negation of RspBsy indicates that no caches within the Ring:0 have the page allocated. The RRC:0 extracts the deallocate packet, sets pkt.cmd_pend_dealloc and forwards the packet to the local RRC:1. Both RRC:0 and RRC:1 must be in Page:PendDealloc prior to the descriptor being deallocated to prevent race conditions.

The RRC:1 processes the packet by transitioning to Page:PendDealloc, sets pkt.cmd_dealloc_page, extracts the packet and forwards the packet back to RRC:0 (step 8). All remotely originated packets received from Ring:1 when in Page:PendDealloc state, are returned unmodified to the Ring:1.

The RRC:0 processes the packet by deallocating the descriptor, transitioning to Page:None, extracts the packet and forwards the packet back to RRC:1 (step 9). The RRC:1 processes the returning packet by also deallocating the descriptor, transitioning to Page:None, and emptying the packet.

Page and subpage oriented packets are handled specially when in Page:PendDeallocate state. Other page level packets, such as CiuInvSum.nodata, CiuInvSumAllocate.no_data and CiuExSum.nodata are busied. Remotely originated subpage requests are busied by RRC:0 and RRC:1. Locally originated subpage requests are uneffected in RRC0, since the requesting local cache has an allocated descriptor will prevent the RRC pair from deallocating its descriptor. Locally originated subpage requests are busied by RRC:1, since the RRC pair has committed to deallocate the descriptor. The descriptor will be subsequently re-allocated on the next request after the page has been deallocated. Locally originated packets which are forwarded by RRC0_between steps 7 through 9, will also be busied by the RRC:1. Locally originated requests processed after step 9 by RRC0, are guaranteed to be processed after step 10 by RRC:1, and the descriptor will be re-allocated.

Page Create

The memory system assumes that system software guarantees that an existing page in memory is not created. System software must also guarantee that a page is not simultaneously created by more than one cache. Memory System hardware does not immediately detect these conditions.

Mpsa instruction provides an anchored descriptor in the local cache for an SVA page. If the descriptor already existed prior to the mpsa, its anchor flag is set. Otherwise, the local cache allocates a descriptor as described under page deallocate/reallocate section above.

The local cache then issues a ciu_ex_sum.nodata packet in as a result of a mpdw.allex instruction and transitions all subpages within the page to owned. The RRC:0 extracts the ciu_ex_sum.nodata packet, allocates the descriptor if necessary and forwards the request to RRC:1. If Page:PendDealloc, the RRC:0 passes the request and sets pkt. InvBsy. RRC:1 extracts the packet, allocates the descriptor if necessary, transitions all subpages to SpState:Owner and forwards the request back to RRC:0. RRC:0 inserts the packet, and transitions all subpages within the page to SpState:Ex. The originating CIU extracts the packet, returns the packet to the CCU and the CCU returns completion status to the local processor.

A mpdw instruction is then issued to clear the anchor bit.

Page Destruction Issues

Pages can be destroyed in three manners. Any time a page is destroyed, all subpages within the page must be exclusively owned by the local Cache. First, when pure pages are deallocated, they are destroyed. The CiuPureInvSumAlloc packet indicates that a pure page is being deallocated. Secondly, when a descriptor's address is changed, the old page is destroyed, but the contents of the old page are present in the new page. The RrcDeallocDesc packet indicates that the local RRCs should dealloc the page. Thirdly, the page and its contents are explicitly destroyed. The CiuInvSum packet indicates that the local RRCs should set all subpages to invalid state.

When a page is destroyed, the CiuPureInvSumAlloc, RRcDeallocDesc and CiuInvSum packets traverse the Ring:1 to clear out any remote pending or Reissue state for the page. Three separate packet types are required, since the local Cache and RRC actions for the three cases are different.

Page Destroy

Mpsa instruction provides an anchored descriptor in the local cache for an SVA page. If the descriptor already existed prior to the mpsa, its anchor flag is set. Otherwise, the local cache allocates a descriptor as described under page deallocate/reallocate section above.

The mfsva instruction is used to cause the local cache to obtain exclusive ownership of all subpages.

The local cache then issues a ciu_inv_sum.nodata packet in as a result of a mpdw.allinv instruction and transitions all subpages within the page to invalid. The RRC:0 extracts the ciu_inv_sum.nodata packet, and forwards the request to RRC:1. If Page:PendDealloc, the RRC:0 passes the request and sets pkt. InvBsy. RRC:1 extracts the packet, transitions all subpages to SpState:Inv and forwards the request back to RRD:0. RRC:0 inserts the packet, and transitions all subpages within the page to SpState:Inv. The originating CIU extracts the packet, returns the packet to the CCU and the CCU returns completion status to the local processor.

The page destroy sequence and ciu_inv_sum.no data in particular do not deallocate the local cache or local RRC pair descriptors. The local cache and local RRC pair descriptors are not deallocated until the descriptor is reused.

Change Descriptor

Change descriptor page address is logically a destroying the old page followed by creating a new page which happens to have the same data. The memory system assumes that system software guarantees that an existing page in memory is not created. System software must also guarantee that a page is not simultaneously created by more than one cache. Memory System hardware does not immediately detect these conditions.

Change descriptor used three instructions, mpdw, mrdd and mrwd. Mpdw instruction side effects the local cell (CCU and CIU) only and is not inserted on the Ring:0.

The RRC Deallocate Descriptor (mrdd) instruction from the CCU reserved memory system opcodes. The CCU issues a RrcDeallocDesc.nodata packet when decoding this instruction from the CEU. !mO supplies the page address to be deallocated, in an identical manner to other memory system instructions. The CIU inserts this packet onto the Ring:0. The RRC copies the packet and initiates a deallocation sequence. If the RRC is unable to copy or process the packet, it sets packet.RspBsy (responder busy). The CIU extracts the returning RrcDeallocDesc.nodata packet and passes it to the CCU. If RspBsy is set the request is reissued by the CCU. If RspBsy is clear, the CCU returns a successful completion status to the CEU. If an RRC:0 is not configured, the returning packet, RrcDeallocDesc.nodata.!RspBsy, is identical to the original request, and causes the CCU to return a successful completion status to CEU. This instruction has no effect on CCU or CIU data structures. The addition of this instruction is transparent to the CEU.

The RRC Write Descriptor (mrwd) instruction from the CCU reserved memory system opcodes. The CCU issues a RrcWrDesc.nodata packet when decoding this instruction from the CEU. !mO supplies the page address to be allocated, in an identical manner to other memory system instructions. The CIU inserts this packet onto the Ring:0. The RRC:0 extracts the packet. The local RRC:1 allocates the descriptor if required, sets the descriptor all exclusive, writes RRC resident descriptor bits (ownerlimit) and extracts the packet, sending it back to the Ring:0. The RRC:0 allocates the descriptor if required, sets the descriptor all exclusive, writes RRC resident descriptor bits (ownerlimit) and inserts the packet onto Ring:0. If the RRCs are unable to process the packet, packet.RspBsy is set. The CIU extracts the returning RrcWrDesc.nodata packet and passes it to the CCU. If RspBsy is set the request is reissued by the CCU. If RspBsy is clear, the CCU returns a successful completion status to the CEU. If an RRC:0 is not configured, the returning packet, RrcWrDesc.nodata.!RspBsy, is identical to the original request, and causes the CCU to return a successful completion status to CEU. This instruction has no effect on CCU or CIU data structures. The addition of this instruction is transparent to the CEU.

The change descriptor sequence is:
1—Anchor old page (mpsa).
2—Gather all subpages of old page with exclusive ownership.
3—Deallocate RRC descriptor (mrdd) (old page).
4—Write new RRC descriptor (mrwd) (new page).
5—Write new descriptor in cell and clear anchor bit (mpdw).

Mrdd and mrwd instructions are not required if the tag portion of descriptor is not being changed. Additionally, gathering all subpages with exclusive ownership might not be required to change some descriptor bits as discussed above. Atomic and transient atomic state are preserved in the Cell. The RRC subpage state only records non-exclusive and exclusive ownership with atomic and transient atomic falling in the later category. The RRC does maintain pending getw state which is lost by the change sequence. The getw requestor(s) will timeout.

RDU:0 Page Operations Rules

Allocation rules are enumerated under RDU:0 Basic Rules.

Packets From Connected Ring:1

---

Packet.nodata, Originated by Remote Ring:0
CiuInvSumAlloc,
CiuPureInvSumAlloc,
RrcDeallocDesc,
RrcWrDesc,
CiuUpdateState,
CiuWrDesc
CiuInvSum,
CiuExSum: error,
Packet.nodata, Originated by Local Ring:0
CiuInvSumAlloc,
CiuPureInvSumAlloc,
RrcDeallocDesc: if page_not_allocated error
    else if pkt.cmd_dealloc_page
      (extract,Page:None.deallocate page)
    else error;
RrcWrDesc,
CiuInvSum,
CiuExSum: (insert,-);
CiuUpdateState,
CiuWrDesc: error;
Packet.data
CiuPureInvSumAlloc,
CiuInvSumAlloc,
RrcDeallocDesc,
RrcWrDesc,
CiuUpdateState,
CiuWrDesc
CiuInvSum,
CiuExSum: error;
Packets From Ring:0
Packet.nodata, Originated by Remote Ring:0
CiuInvSumAlloc,
CiuPureInvSumAlloc,
RrrDeallocDesc,
RrcWrDesc,
CiuUpdateState,
CiuWrDesc,
CiuInvSum,
CiuExSum: error;
Packet.nodata, Originated by Local Ring:0
CiuInvSumAlloc,
RrcDeallocDesc: if page_not_allocated error
    else if Page:PendDealloc
      if pkt.rrc
        if pkt.RspBsy (empty,-)
        else (extract.cmd_pend_
          dealloc,-)
      else (empty,-)
    else if pkt.RspBsy (empty,-)
    else
    (pass.!RspBsy.!InvBsy.rrc,Page:PendDealloc);
CiuPureInvSumAlloc:
    if page_not_allocated error
    else if !Page:PendDealloc
    (extract.cmd pend dealloc,-)
    else (pass.InvBsy,-);
RrcWrDesc: if page_not_allocated allocate_page;
    if Page:PendDealloc (pass.InvBsy,-)
    else (extract,write desc);
CiuInvSum: if page_not_allocated allocate_page;
    if Page:PendDealloc (pass.InvBsy,-)
    else (extract, set all subpages invalid);
CiuExSum: if page_not_allocated allocate page;
    if Page:PendDealloc (pass.InvBsy,-)
    else (extract, set all subpages exclusive);
CiuUpdateState,
CiuWrDesc: error,
Packet.data
CiuInvSumAlloc,
CiuPureInvSumAlloc,
RrcDeallocDesc,
RrcWrDesc,
CiuUpdateState,
CiuWrDesc,
CiuInvSum,
CiuExSum: error,
RDU:1 Page Operations Rules
Allocation rules are enumerated under RDU:1 Basic Rules.
Packets From Connected Ring:0
Packet.nodata. Originated by Local Ring:0
CiuInvSumAlloc,
RrcDeallocDesc: if page_not_allocated error
    else if pkt.cmd_pend_dealloc
      if Page:None
      (extract.cmd_dealloc_page,Page:PendDealloc)
      else error,
    else if pkt.cmd_dealloc
      if Page:PendDealloc
      (empty,Page:None.deallocate page)
      else error;
    else error,
CiuPureInvSumAlloc,
RrcDeallocDesc: if page_not_allocated error
    else if pkt.cmd_pend_dealloc
      if Page:None (insert,-)
      else error,
    else if pkt.cmd_dealloc
      if Page:PendDealloc
      (empty,Page:None.deallocate page)
      else error,
    else error;
RrcWrDesc: if page_not_allocated allocate_page;
    if Page:None (extract,write desc)
    else error;
CiuInvSum: if page_not_allocated allocate_page;
    if Page:None (insert,-))
    else (extract.error,-);
CiuExSum: if page_not_allocated allocate page;
    if Page:None (extract, set all subpages exclusive)
    else error-,
CiuUpdateState,
CiuWrDesc: error,
Packet.nodata, Originated by Remote Ring:0
CiuPureInvSumAlloc,
CiuInvSumAlloc,
RrcDeallocDesc,
RrcWrDesc,
CiuUpdateState,
CiuWrDesc,
CiuInvSum,
CiuExSum: error,
Packet.data
CiuPureInvSumAlloc,
CiuInvSumAlloc,
RrcDeallocDesc,
RrcWrDesc,
CiuUpdateState,
CiuWrDesc: error,
Packets From Ring:1
Packet.nodata, Originated by Local Ring:0
CiuPureInvSumAlloc,
RrcDeallocDesc: if page_not_allocated error
    else if pkt.cmd_pend dealloc
      (extract.cmd_dealloc_page,
      Page:PendDealloc)
    else (extract.error,-);
CiuInvSum: (extract, set all subpages invalid)
CiuInvSumAlloc,
RrcWrDesc
CiuExSum,
CiuUpdateState,
CiuWrDesc: error,
Packet.nodata, Originated by Remote Ring:0
CiuPureInvSumAlloc,
RrcDeallocDesc,
CiuInvSum: (pass,set all subpages invalid)
CiuInvSumAlloc,
RrcWrDesc

```
                -continued
        CiuExSum,
        CiuUpdateState,
        CiuWrDesc: (pass.error,-);
        Packet.data
        CiuPureInvSumAlloc,
        CiuInvSumAlloc,
        RrcDeallocDesc,
        RrcWrDesc,
        CiuUpdateState,
        CiuWrDesc
        CiuInvSum,
        CiuExSum: error;
```

Special Operations
RRC Extract Buffer Full

An Extract Buffer flow control algorithm is required since the peak packet rate exceeds the rate the RRC can empty the buffer. The control algorithm is based on the principle of maximizing foreward progress in conjunction with reducing system loading. Prioritizing the allocation of system resources to completing requests in progress achieves both of these goals since completing a request simultaneously reduces system loading and achieves most efficient forward progress.

A packet which cannot be extracted or copied into the Extract Buffer is handled based on whether the packet is Originated by this RRC. If the packet is not originated by this RRC, it is handled based on whether the packet does not carry data, carries read only data or carries ownership. The packet busy bits, RspBsy and InvBsy (conveniently situated late in the packet), and SpState and Pend1 subpage state fields are used to cause the standard protocol to do the right thing.

For all packets which were originated by this RRC, pkt.TimeStamp is cleared so that the packet can circle the Ring again.

For all packets which were not originated by this RRC, pkt.TimeStamp is also cleared so that the packet can circle the Ring if necessary. All page operations are considered as nodata request packets. For packets not carrying data, both RspBsy and InvBsy are set. RspBsy and nodata are set for sva_read_ro.data responses and duplicates are emptied. Ownership packets are passed and RRC:1 transitions to Pend1:ReIssue. Pend1:Reissue state is used by RRC:1 to prevent spurious missing_page_error (page fault) by differentiating between the case of a remotely originated ownership packet that wasn't extracted to satisfy a pending request and a missing page. When set Pend1:Reissue indicates that the RRC:1 might have missed a potential non-RRC originated response packet to an RRC originated request. If the RRC:1 originated request returns without a response and Pend1:ReIssue then the returning request is busied by the RRC causing the requesting processor cell or RRC to reissue the request, thereby preventing a spurious page fault. RRC:0 uses the SpState field to prevent missing_page_error. The RRC:0 SpState field records whether a read only copy or ownership is within the Ring:0 to satisfy the request. If the RRC:0 originated request returns without a response and a sufficient copy or ownership exists within the Ring:0, the request is reissued.

The following paragraphs analyze the behavior of all cases.

RRC:0 From Ring:1; and RRC:1 From Ring:0

Packets received by RRC:1(0) from Ring:0(1) are usually inserted onto the Ring:1(0). Under certain circumstance the packet is re-routed back to the other RRC. This is accomplished by immediately extracting the inserted packet. An example is a locally originated request of the same type as a pending request (sva_read_ex while in Pend1:Ro) processed in RRC:1. RspBsy is asserted and the request is returned to the local Ring:0.

If the Extract Buffer cannot accept the re-routed packet, it is held in the insert buffer until the extract buffer is not full and an empty packet is available. The rules notation insert.extract, indicates a re-routed packet which follows this behavior.

| RRC:0 From Ring:0. Packets Originated by Local Ring:0 | |
|---|---|
| Request packet | Will return to originator (maybe getting satisfied along the way) and get re-issued if necessary. |
| ReadOnly Data Carrying packet | Will return to originator (maybe getting satisfied along the way) and get reissued if necessary. |
| Ownership Data Carrying packet | Will return to originator to satisfy request. But if there was a pending request from another Ring:0 this packet should have been snarfed. When that packet returns to RRC:1, the RRC:1 will notice that ownership is still contained within the Ring:0 and return the request back to Ring:0. |
| RRC:0. From Ring:0. Packets Originated by Remote Ring:0 | |
| Request packet | Will circle the Ring:0 (maybe getting satisfied along the way), and will be extracted on the next encounter with the RRC:0. |
| ReadOnly Data Carrying packet | Will circle the Ring:0 (maybe getting satisfied along the way), and will be extracted on the next encounter with the RRC:0. |
| Ownership Data Carrying packet | Will circle the Ring:0 (maybe getting snarfed along the way), and will be extracted on the next encounter with the RRC:0. |
| RRC:1. From Ring:1. Packets Originated by Local Ring:0 | |
| Request packet | Will circle the Ring:0 (maybe getting satisfied along the way), and will be extracted on the next encounter with the RRC:0. |
| ReadOnly Data Carrying packet | Will circle the Ring:0 (maybe getting satisfied along the way), and will be extracted on the next encounter with the RRC:0. |
| Ownership Data Carrying packet | Will circle the Ring:0 (maybe getting snarfed along the way), and will be extracted on the next encounter with the RRC:0. |
| RRC:1. From Ring:1. Packets Originated by Remote Ring:0 | |
| Request packet | Will return to originator (maybe getting satisfied along the way) and get re-issued if necessary. |
| ReadOnly Data Carrying packet | Will return to originator (maybe getting satisfied along the way) and get reissued if necessary. |
| Ownership Data Carrying packet | Will return to originator to satisfy request. But if there was a pending request from the Ring:0 connected to this RRC, this packet should have been snarfed. When that packet returns to RRC:1, the RRC:1 will notice that ownership is still contained within the Ring:0 and return the request back |

-continued to Ring:0.

Ring Freezing

Figure 16:
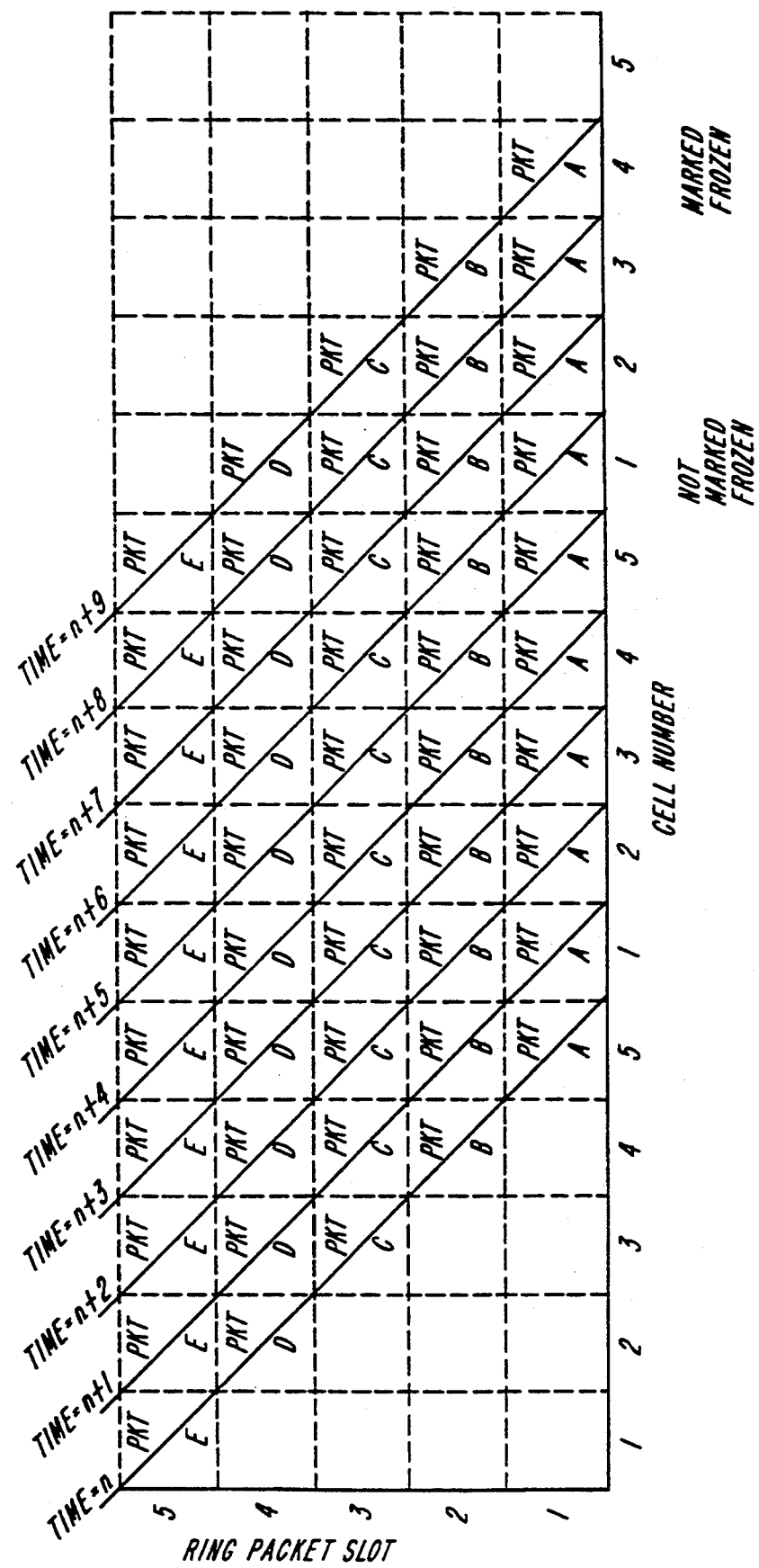
FIG. 16 depicts a full ring freeze in a system constructed in accord with the invention.

Freeze bit is used by a cell to freeze all packets on the Ring from a single revolution. Freezing a Ring means that every packet on a Ring is in a state where no member on a Ring can change or copy any information in the packets. A cell freezes a Ring by systematically asserting Freeze bit in every packet that passed by it until every packet on the Ring was frozen. During the freeze time, each cell is free to perform any operation without having to process to any Ring packets. Once each Ring packet has been frozen, the cell unfreezes each packet it had frozen, starting at the first packet it froze, until all packets it froze where unfrozen. If a condition which initiates a Ring Freeze sequence is detected during unfreezing, Ring Freeze sequence is immediately started. The RRC must remember the packets which it previously froze, that are being refrozen. FIG. 16 depicts a full ring freeze. The lightly shaded region depicts packet slots not marked as frozen, while the darkly shaded region depicts those marked as frozen.

To handle multiple cells attempting to freeze a Ring, each cell behaves almost as it would if there were only on cell trying to freeze the Ring. However, the cell must only unfreeze packets which it marked frozen. Therefore each cell must keep track of the packets it marked frozen.

A cell keeps track of which packets it marked frozen by knowing the first and the last packet it marked as frozen. This simplication is possible since the freezing mechanism guarantees that any given cell freezing sequence freezes one contiguous string of packets. Thus the begin and end freeze packets can be maintained using counters rather than a shift register.

Ring freeze can be initiated by two methods, Full Ring Freeze and Full-1 Ring Freeze. Since cmd. Freeze is in the early portion of the packet command, status leading to a Ring freeze must be known early in packet processing. Full ring freeze is when the Freeze bit is used for the first packet to be frozen. When the status required for Ring Freeze is not available early enough in packet processing, Full-1 Ring Freeze method can be used.

Full:1 Ring Freeze method does not freeze the first packet to be frozen. Instead the packet busy bits, RspBsy and InvBsy (conveniently situated late in the packet), and SpState and Pendl subpage state fields are used to cause the standard protocol to do the right thing (Fz:SingleEccErr state). The remaining packets are marked frozen and unfrozen in the same manner as Full Ring Freeze method.

The first packet is handled in a manner identical to that described in Extract Buffer Full section for packets which cannot be extracted or copied into the extract buffer.

Refresh

Refresh is accomplished in a distributed manner by each RRC independently controling it refresh when enabled by RiuMasterConfig.RefreshEnable. Each 8 msec., 512 refreshes must be performed. The interval between refreshes is 15.6 usec and is specified in Ring clocks by RiuRefreshInterval location.

A single refresh requires one packet processing time. Thus refresh can only be performed during empty, or frozen packets, since these packet require no processing. The RRC attempts perform refresh in the background by using all empty, frozen and invisible packet times for refresh. The RRC keeps track of the number of refreshes it has performed up to a limit of 31 by incrementing RiuRefreshCount.NumRef for each refresh. At the end of each refresh interval NumRef is decremented by one. If NumRef was zero, then a refresh is immediately forced by the RRC using Full Ring Freeze method (NumRef is not incremented for the first frozen packet). All RRCs can store up multiple refreshes equal to the number of formated packets in the Ring. Full Ring Freeze refresh method is only required if the Ring was full utilized for extended periods of time. Otherwise, refresh adds no additional overhead. The refresh interval must be adjusted 0.94 usec (15.6*31/512) to 14.7 usec to account for the effect of saving up, up to 31 refreshes.

ECC Correctable Error

When the RRC detects a correctable ECC error, additional packet times are required to correct the data structure. Ring freezing is used to allow multiple packet times for the correction and re-lookup.

When a correctable ECC error is detected, the RRC initiates Full-1 Ring Freeze method, since the ECC error is not know early in packet processing. The first packet is handled as described in Extract Buffer Full section and the remaining packets are marked frozen for one revolution. The corrected data structure re-written, saved in RDU and then used to reprocess the packet which cause the ecc error after one Ring revolution. Only RRC originated packets will be processed, non-originated packets are extracted by another cell within the Ring. Saving the corrected packet allows RRC originated packets to be correctly processed for single bit (correctable) hard errors.

The RRC sets pkt.RrcFault in the packet corresponding to the correctable ECC error. The RRC also asserts pkt.UnMarkedFault on RRC originated packets when uncorrectable ECC errors are detected.

The requesting processor cell interprets the RrcFault bit in the following manner. The RrcFault bit indicates that an RRC fault was detected and logged by an RRC. If the remaining fault bits (MarkedFault, LocalFault, DescFault, and UnMarkedfault) are clear then the packet request was successfully completed. If the returning packet was busied, the originating cell should signal a fault with RrcAtt status and not retry the request. Other CIUs and CCUs handle this packet normally. If additional fault bits are set, the actions specified by these bits override the actions of RrcFault bit.

RDU:0 Rules previously defined RDU:0 Subpage and Page rules are reference by these rules.

```
if pkt.frozen (pass,cond_refresh)
else if pkt_empty /* from insert buffer */
    if pkt.nodata
        if    !OriginateLocal
              if Fz:Freeze (pkt.freeze,-)
              else if Fz:SingleEccErr
              (insert.RspBsy.InvBsy.RrcFault,-)
              else use Rules(Packets From
              Connected Ring:1,
              Packet.nodata,Originated by
```

-continued
```
            Remote Ring:0)
        else /* OriginateLocal */
            if Fz:Freeze (pkt.freeze,-)
            else if Fz:SingleEccErr
                (insert.RspBsy.InvBsy.RrcFault,-)
            else use Rules(Packets From
                Connected Ring:1,
                Packet.nodata,!Originated by
                Remote Ring:0)
    else /* pkt.data */
        if Fz:None use Rules(Packets From
            Connected Ring:1, Packet.data,-)
        else if Fz:Freeze (pkt.freeze,-)
        else /* Fz:SingleEccErr */
            if pkt.duplicate (empty,-)
            else if pkt.sva_read_ro
                (insert.nodata.RspBsy.InvBsy.RrcFa
                ult,-)
            else (insert,-); /* ownership
                packets */
    else (pass,cond_refresh);
else/* !pkt_empty */
    if pkt.nodata
        if  !OriginateLocal
            if Fz:Freeze (pkt.freeze,-)
            else if Fz:SingleEccErr
                (pass.RspBsy.InvBsy.RrcFault,-)
            else use Rules(Packets From
                Ring:0, Packet.nodata,Originated
                by Remote Ring:0)
        else /* OriginateLocal */
            if Fz:Freeze (pkt.freeze,-)
            else if Fz:SingleEccErr
                (insert.RspBsy.InvBsy.RrcFault,-)
            else use Rules(Packets From
                Ring:0, Packet.nodata,!Originated
                by Remote Ring:0)
    else /* pkt.data */
        if Fz:None use Rules(Packets From
            Ring:0,Packet.data,-)
        else if Fz:Freeze (pkt.freeze,-)
        else /* Fz:SingleEccErr */
            if pkt.duplicate (empty,-)
            else if pkt.sva_read_ro
                (insert.nodata.RspBsy.InvBsy.RrcFa
                ult,-)
            else (insert,-); /* ownership
                packets */
```

RDU:1 Rules

Previously defined RDU:1 Subpage and Page rules are reference by these rules.

```
if pkt.frozen (pass,cond_refresh)
else if pkt_empty
        if  pkt.nodata
            if  OriginateLocal
                if Fz:Freeze (pkt.freeze,-)
                else if Fz:SingleEccErr
                    (insert.RspBsy.InvBsy.RrcFault,-)
                else use Rules(Packets From
                    Connected Ring:0,
                    Packet.nodata,Originated by
                    Remote Ring:0)
            else/* !OriginateLocal */
                if Fz:Freeze (pkt.freeze,-)
                else if
                    Fz:SingleEccErr(insert.RspBsy.InvB
                    sy.RrcFault,-)
                else use Rules(Packets From
                    Connected Ring:0,
                    Packet.nodata,!Originated by
                    Remote Ring:0)
        else /* pkt.data */
            if Fz:None use Rules(Packets From
                Connected Ring:0, Packet.data,-)
            else if Fz:Freeze (pkt.freeze,-)
            else /* Fz:SingleEccErr */
                if pkt.duplicate (empty,-)
                else if pkt.sva_read_ro
                    (insert.nodata.RspBsy.InvBsy.RrcFa
                    ult,-)
                else (insert,-); /* ownership
                    packets */
        else (pass,cond_refresh);
    else /* pkt_empty */
        if pkt.nodata
            if OriginateLocal
                if Fz:Freeze (pkt.freeze,-)
                else if Fz:SingleEccErr
                    (pass.RspBsy.InvBsy.RrcFault,-)
                else use Rules(Packets From
                    Ring:1, Packet.nodata,Originated
                    by Remote Ring:0)
            else/* !OriginateLocal */
                if Fz:Freeze (pkt.freeze,-)
                else if Fz:SingleEccErr
                    (insert.RspBsy.InvBsy.RrcFault,-)
                else use Rules(Packets From
                    Ring:1, Packet.nodata,!Originated
                    by Remote Ring:0)
        else /* pkt.data */
            if Fz:None use Rules(Packets From
                Ring:1,Packet.data,-)
            else if Fz:Freeze (pkt.freeze,-)
            else /* Fz:SingleEccErr */
                if pkt.duplicate (empty,-)
                else if pkt.sva_read_ro
                    (insert.nodata.RspBsy.InvBsy.RrcFa
                    ult,-)
                else (insert,-); /* ownership
                    packets */
```

Ring:0 Rules Assumptions

The following changes are required to packet specification, Ring specification, CCU rules and CIU rules for Ring:N operation.

Cell Descriptor Deallocation

Cell descriptor deallocation has changed.

Write Descriptor

As currently defined, the RRC must perform two operations to implement the write descriptor operation. The RRC deallocates the descriptor at the old SVA and allocates the same descriptor at the new address. These two operations require two packet times with the deallocate address in the packet address field and allocate address in packet dataword0. The new sequence described under the section "Change Descriptor" describes how the two RRC operations required for write descriptor (mpdw) are divided into two separate instructions and CCU requests.

CiuUpdateState

Ciu_update_state is not required to be sent on Ring, assuming its only use is to change ciu pending state to invalid.

Packet Operations

Three RRC related operations have been added, RrcDeallocDesc, RrcWrDesc and CiuPureInvSumAlloc. The page_fault operation has been deleted, since it is not required for Rrc operation. The following table specifies the revised encodings.

| Operation[4:0] | Name | Comment |
| --- | --- | --- |
| 00000 | sva_read_ro | |

-continued

| Operation[4:0] | Name | Comment |
|---|---|---|
| 00001 | duplicate | |
| 00010 | release | |
| 00011 | recombine | |
| 00100 | sva_read_ex | |
| 00101 | write_invalidate | |
| 00110 | get | |
| 00111 | get_and_wait | |
| 01000 | ciu_wr_descr | |
| 01001 | ciu_update_state | |
| 01010 | ciu_inv_sum | |
| 01011 | ciu_ex_sum | |
| 01100 | reserved | page_fault deleted |
| 01101 | ciu_id_drop_req | |
| 01110 | spa_read_request | |
| 01111 | spa_write_request | |
| 10xxx | reserved | |
| 11000 | RrcDeallocDesc | added |
| 11001 | RrcWrDesc | added |
| 11010 | Ciu_inv_sum_alloc | |
| 11011 | ciu_oure_inv_sum_alloc | added |
| 111xx | reserved | |

Invalidator and Responder Busy

The definition of invalidator busy and responder busy as a function of each packet operation is specified in the table below. On certain operations these bits are also set to indicate that the a cell or Ring:0 has the page allocated (descriptor match). This information is used by RRC:0 to determine whether a page is allocated in any additional cells within the Ring:0 during a cell deallocate sequence.

| Operation | ResponderBusy | InvalidatorBusy |
|---|---|---|
| sva_read_ro.no_data | responder busy or pending invalidate | set if descriptor match |
| sva_read_ro.data | responder busy or pending invalidate | |
| release.data | | |
| release.no_data | | |
| recombine.data | | |
| duplicate.data | responder busy or pending invalidate | |
| recombine.nodata | set if descriptor match | |
| sva_read_exc.nodata | responder busy | invalidator busy |
| sva_read_exc.data | responder busy | invalidator busy |
| write_invalidate.nodata | | invalidator busy |
| get.no_data | responder busy | invalidator busy |
| get.data | | invalidator busy |
| get_and_wait.nodata | responder busy | invalidator busy |
| get_and_wait.data | | invalidator busy |
| ciu_wr_descr.data | responder busy | |
| ciu_updata_state.nodata | responder busy | |
| ciu_inv_sum.nodata | responder busy | |
| ciu_ex_sum.nodata | responder busy | |
| ciu_ld_drop_req.nodata | | |
| ciu_inv_sum_allocate.nodata | set if descriptor match | invalidator busy |
| RrcDeallocDesc | responder busy | |
| RrcWrDesc | responder busy | |
| spa_read_request | responder busy | |
| spa_write_request | responder busy | |

Packet Subpage Sate Field

The following table lists valid subpage states as a function of packet operation.

| Operation | Subpage States |
|---|---|
| sva_read_ro.no_data | |
| sva_read_ro.data | ro |
| duplicate.data | ro |
| release.data | ex |
| release.no_data | |
| recombine.data | nex,ex,at,tat |
| recombine.no_data | |
| sva_read_ex.no_data | |
| sva_read_ex.no_data | |
| sva_read_ex.data | nex,ex,tex,at,tat |
| write_invalidate.no_data | |
| get.no_data | |
| get.data | |
| get_and_wait.no_data | |
| get_and_wait.data | |
| ciu_wr_descr.data | |
| ciu_update_state.no_data | inv,ro,ex |
| ciu_inv_sum.no_data | |
| Page_fault.data | |
| ciu_ld_drop_req.no_data | |
| ciu_inv_sum_allocate.no_data | |
| RrcDeallocDesc | |
| RrcWrDesc | |
| spa_read_request | |
| spa_write_request | |

Ring Freezing

Ring freezing is used to handle ECC single bit errors and foreground refresh.

Packet Pcopy

Assign pkt.cmd[33] as Pcopy bit for CIU, RIU and RRC usage. Always initialized to clear by inserting CIU. Always set by RRC:1 to indicate the packet was copied from Ring:1. Packets which are copied from Ring:1 with Pcopy set, are not required to be returned to RRC:1 or Ring:1 and are emptied by RRC:0 after successfully traversing Ring:0.

Packet Freeze

Assign pkt.cmd[32] as Freeze bit for CIU, RIU usage. Always initialized to clear by inserting CIU or RIU. When set indicates that the contents of the packet are ignored by all cells. Must be cleared by the same cell which sets it. When clear, the packet is interpreted normally. Valid for empty and non-empty packets.

Packet Invalidate Lookahead

Change packet.cmd[13] to reserved. Name packet.cmd[28] as cmd_lookahead[0] with the following encoding:

| packet.cmd[28] | Description |
|---|---|
| 0 | NoLookahead |
| 1 | Lookahead |

Pkt.Lookahead always overrides data to indicate the packet is short.

Packet RRC Bit

Assign packet.cmd[8] as RRC bit. Always initialized to clear and passed by CCU and CIU. Used by sva_read_ro, recombines and release to indicate that the packet should be reissued if no cell within Ring:0 picks up the subpage.

Packet RrcFault Bit

The definition of RrcFault bit has been changed RCC attention. The RrcFault bit indicates that an RRC fault was detected and logged by an RRC. If the remaining fault bits (MarkedFault, LocalFault, DescFault, and UnMarkedFault) are clear then the packet request was successfully completed. If the returning packet was busied, the originating cell should signal a fault with RrcAtt status and not retry the request. Other CIUs and CCUs handle this packet normally. If additional fault bits are set, the actions specified by these bits override the actions of RrcFault bit.

Packet RrcCma

Rename pkt.cmd[23:16] to RrcCmd for RRC and RIU usage. RrcCmd is currently used to pass state between RRC:0 and RRC:1 for deallocate sequences.

| packet.cmd[23:16] | Description |
|---|---|
| 00000000 | none |
| 00000001 | cmd_pend_dealloc |
| 00000010 | cmd_dealloc_page |
| 00000011 | reserved |
| 000001xx | reserved |
| 00001xxx | reserved |
| 0001xxxx | reserved |
| 001xxxxx | reserved |
| 01xxxxxx | reserved |
| 1xxxxxxx | reserved |

Cell Treatment Of CEU Aborted Requests

Packets which are returned busy, corresponding to CEU aborted CCU requests should not be reissued by the CCU. System error conditions signalled to the local cache, which in turn, signal the local processor, causing an abort are guaranteed to get the local processors and local caches attention without hanging up.

Control Locations

Addressing

SPA space addresses are 64 bits, and are divided into two parts; a cell address and a cell address offset. The cell address specifies a particular cell in the hierarchy of Rings. The offset specifies a particular location within a cell.

Cell Address Structure

A cell address specifies the location of a cell within the three defined levels of the Ring interconnection hierarchy, Ring:2, Ring:1 and Ring:0. The leaf cell address is constructed hierarchically from Ring:2Address, Ring:1Address and Ring:0Address. The three Ring:nAddress fields are used to construct absolute or relative hierarchical addresses to leaf or non-leaf cells.

Referring to the table below, there are three types of Ring:nAddresses; normal address, local address and routing address. A normal address is an absolute reference to one of 128 cells within the level of ring hierarchy. The cccccc field specifies the absolute cell number. A local address is a relative reference within level n−1 of ring the hierarchy. A routing address is used to address non-leaf cells within the hierarchy. The rrrrrr field within the routing address specifies the ring number or routing to Ring:n+1 for non-leaf cell access. Local address and Routing encodings are synonyms.

| Ring:nAddr | Description |
|---|---|
| 0ccccccc | Normal Address |
| 1xxxxxxx | Local Address |
| 1xrrrrrr | Routing Ring:n+1 |

Cell addressing modes are categorized into leaf cell addressing and non-leaf (RRC) cell addressing. Cell addressing mode is determined by the combination of address types within the Cell Address.

Leaf cell relative mode allows a cell to address itself without knowledge of its actual full Cell Address. Ring:2Addr, Ring:1Addr and Ring:0Addr specify local address. Leaf cell relative to local Ring:0 mode allows a cell to address other cells within its local Ring:0, without knowledge of Ring:1Addr or Ring:2Addr. Ring:0Addr field specifies the leaf cell addressed. Leaf cell relative to local Ring:1 mode allows a cell to address other cells within its local Ring:1, without knowledge of its actual Ring:2Addr. Ring:1Address specifies Ring:0 number within the local Ring:2 and Ring:0Address specifies the cell number withip the Ring:0. Leaf cell within a Ring:2 mode allows a specific leaf cell within the system to be accessed with the full cell address. Ring:2Address, Ring:1Address and Ring:0Address fields hierarchically specify the Ring:1, Ring:0 and cell number of the accessed leaf cell.

RRC:1 (non-leaf) pair relative to local Ring:1 mode, allows a non-local RRC:1 pair to be addressed without knowledge of Ring:2Address. Ring:2Addr type is local, Ring:1Addr type is normal to specify a non-leaf cell within Ring:1 and Ring:0Addr type is routing to specify routing. RRC:0 interleave configuration and Ring:0Addr field are used to route the packet to the specified Ring:1. RRC:1 pair mode allows a RRC:1 pair to be addressed by specifying Ring:2Addr and Ring:1Addr. RRC:2 pair mode allows an RRC:2 pair to be addressed by specifying Ring:2Addr, Ring:1Addr routing and Ring:0Addr routing.

| Ring:2Addr | Ring:1Addr | Ring:0Addr | Cell Addressing Mode |
|---|---|---|---|
| local | local | local | Leaf cell relative |
| local | local | normal | Leaf cell relative to local Ring:0 |
| local | normal | normal | Leaf cell relative to local Ring:1 |
| normal | normal | normal | Leaf cell relative to Ring:2 |
| local | normal | routing | RRC:1 pair relative to local Ring:1 |

| Ring:2Addr | Ring:1Addr | Ring:0Addr | Cell Addressing Mode |
|---|---|---|---|
| normal | normal | normal | RRC:1 pair |
| normal | routing | routing | RRC:2 pair |
| normal | routing | normal | reserved, detected by RRC:0 |

SPA[39] controls whether the addressed RRC or its partner is accessed.

Routing of Interconnect Packets (SVA,SPA)

SVA request packets are routed based on RRC directory lookup, packet command, match of pkt.RequestorId and CellAddress, RRC rules and interleave configuration.

SPA request packets are routed based on packet command, match of pkt.Addr[63:40] and cell address, match of pkt.RequestorId and CellAddress and interleave configuration. If pkt.RequestorId and CellAddress match, the packet is a returning response and is forwarded back to the requesting leaf cell. Otherwise if pkt.RequestorId and CellAddress match, the packet is a request for the non-leaf or child leaf cell depending on CellAddress mode.

Packet RequestorId Match and SPA address decode are a function of the Ring level the RRC is connected to.

| RRC Ring Level | RRC Cell Address | | |
|---|---|---|---|
| | Ring:2Addr | Ring:1Addr | Ring:0Addr |
| SVA and SPA Packet RequestId Match | | | |
| 0 | =pkt.RequestId [23:16] | =pkt.RequestId [15:8] | =pkt.RequestId [7:0] |
| 1 | =pkt.RequestId [23:16] | =pkt.RequestId [15:8] | not compared |
| 2 | =pkt.RequestId [23:16] | not compared | not compared |
| Packet SPA Address Decode | | | |
| 0 | =pkt.Address [63:56] | =pkt.Address [55:48] | =pkt.Address [47:40] |
| 1 | =pkt.Address [63:56] | =pkt.Address [55:48] | not compared |
| 2 | =pkt.Address [63:56] | not compared | not compared |

Interleave configuration parameters are RduMasterConfig.RingInterleave, RduMasterConfig.RingValue, and IbuMasterConfig.LinkInterleave.

SPA packet requests to leaf cells and non-leaf cells are routed identically. SPA packet requests are routed by an RRC bank based on Interleave Value matching Ring:n Address field of cell address, where n corresponds to the level of the routing RRC. RingInterleave configuration determines which bits from Ring:n Address[3:0] are matched. For non-leaf cell access, RingAddr[3:0] specifies the exact routing path. For leaf cell access, an exact routing path between the requesting and accessed Ring:0s is not required. The routing is based on the cell addressed. Access to non-leaf Ring:2 devices requires that both Ring:0 and Ring:1 fields of cell address be specified.

| RingInterleave Config | Interleave Value | SVA Interleave | SPA Interleave |
|---|---|---|---|
| One way | xxxx | — | — |
| Two way | xxxv | SVA[14] | RingAddr[0] |
| Four way | xxvv | SVA[15:14] | RingAddr[1:0] |
| Eight way | xvvv | SVA[16:14] | RingAddr[2:0] |
| Sixteen way | vvvv | SVA[17:14] | RingAddr[3:0] |

In configurations where both RRC banks connect to a single InterRingLink, incoming packets are routed to one bank based on IbuMasterConfig.LinkInterleave and a single address bit.

| Link Interleave | SVA Interleave | SPA Interleave | |
|---|---|---|---|
| | | Leaf Cell | Non-Leaf Cell |
| 00 | SVA[14] | SPA[14] | RingAddr[0] |
| 01 | SVA[15] | SPA[15] | RingAddr[1] |
| 10 | SVA[16] | SPA[16] | RingAddr[2] |
| 11 | SVA[17] | SPA[17] | RingAddr[3] |

Offset Structure

The offset portion of an SPA selects a particular control register in the RRC pair, SPA[39] specifies whether the addressed RRC or its partner is accessed.

| SPA[39] | Description |
|---|---|
| 0 | addressed RRC |
| 1 | partner of addressed RRC | when in each unit, control locations are grouped by type and location offset. The range of locations offsets for each type are specified with its individual description.

Cell_Address[38:32]—Unit Number

Bank A and bank B units are associated with subring A (odd ring number) and B (even ring number) respectively. Units are only accessible when accessed over the subring with which they are associated as specified by the Cell Address Ring:n Addr field.

| Unit | Name |
|---|---|
| 00 | RDUA (bank A) |
| 02 | RDUB (bank B) |
| 01 | IBUA (bank A) |
| 03 | IBUB (bank B) |
| 10 | RIUA0 (bank A) |
| 11 | RIUA1 (bank A) |
| 12 | RIUB2 (bank B) |
| 13 | RIUB3 (bank B) |
| 04-0f | reserved |
| 14-7f | reserved |

Cell_Address[31:28]—Location Type

The locations types for unit numbers 0×0 and 0×2, which address RDUs are:

| Type | Name |
|---|---|
| 0 | RduMasterConfig |
| 1 | L2FreeListPrtTable |
| 2 | L3FreeListPrtTable |
| 3 | L1TableDirect |
| 4 | L2PTableDirect |
| 5 | L2VTableDirect |
| 6 | L3PTableDirect |
| 7 | L3VTableDirect |
| 8 | SvaRulesTable |
| 9-a | reserved |
| b | L1TableLookup |
| c | L2PTableLookup |
| d | L2VTableLookup |
| e | L3PTableLookup |
| f | L3VTableLookup |

The locations types for unit numbers 0×10 through 0×13, which address RIUs are:

| Type | Name |
|---|---|
| 0 | RiuMasterConfig |
| 1 | RiuCellAddress |
| 2 | LookupCommand |
| 3 | RiuRefreshInterval |
| 4 | RiuRefreshCount |
| 5-f | reserved |

The locations types for unit numbers 0×1 and 0×3, which address IBUs are:

| Type | Name |
|---|---|
| 0 | IbuMasterConfig |
| 1 | IbuRefreshCount |
| 2 | IbuRefreshInterval |
| 3 | IRBPushPointer |
| 4 | IRBPopPointer |
| 5 | IRBCommitPointer |
| 6 | CommitPktNumber |
| 7 | IbuXmitSeqNum |
| 8 | IbuRcvSeqNum |
| 9 | EQPushPointer |
| 10 | EQPopPointer |
| 11 | EQPopData |
| 12 | RPQPopData |
| 13-15 | reserved |

Routing Directory

Figure 9A:
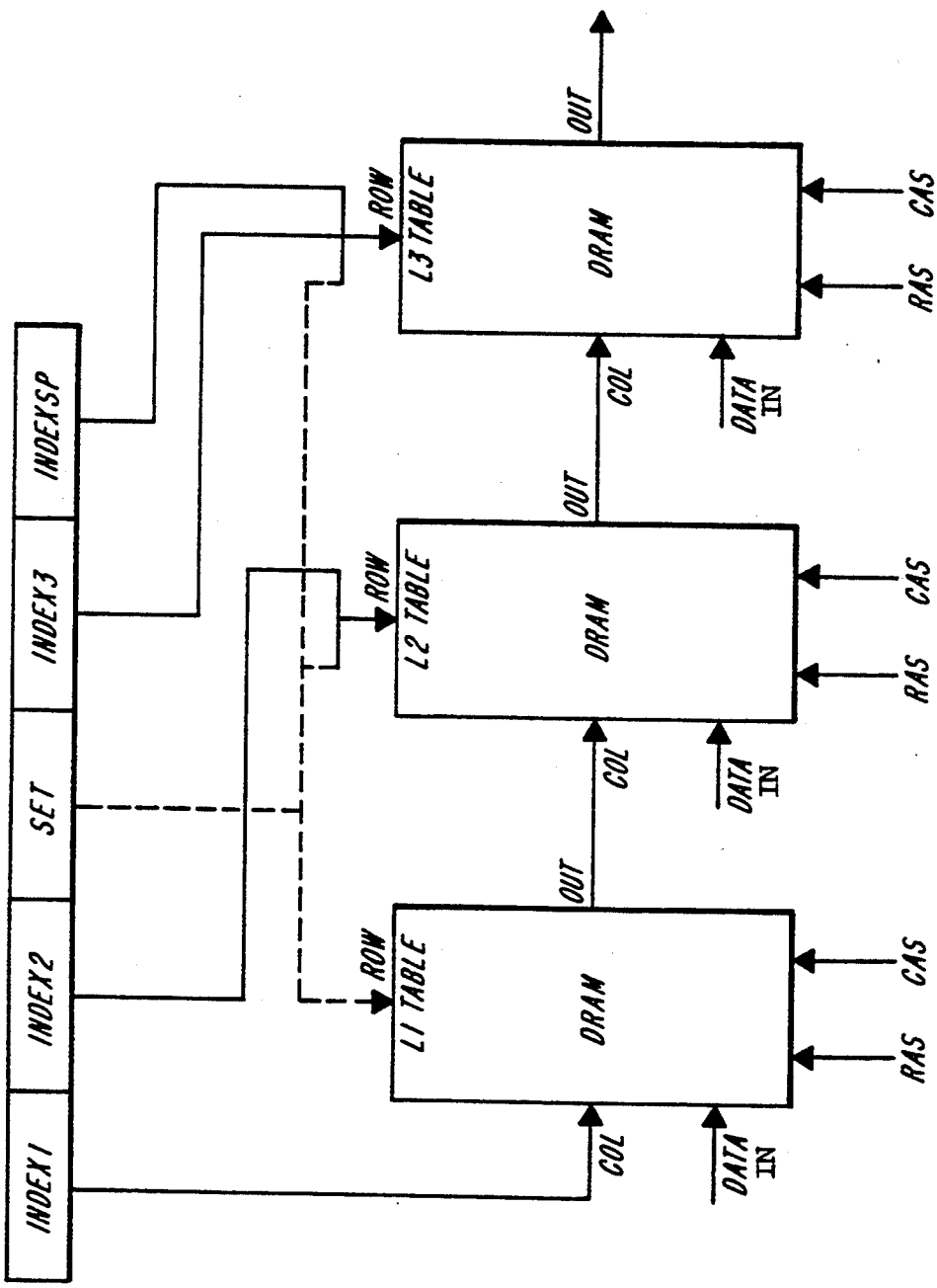

FIG. 9A depict an array of dynamic random access memories (DRAM's) configured in accord with a preferred practice of the invention to implement a routing directory of the type shown in FIG. 9. The array includes three DRAM's serving as the L1 table, the L2 table, and the L3 table, respectively. The DRAM's are of conventional design, each including a row-address input, a column-address input, a row-address strobe (RAS), a column-address strobe (CAS), a data input, and an output. Each DRAM responds to the application of an address on the row-address input and the column-address input, simultaneous with assertion of the RAS and CAS signals, for either applying to its output a signal representative of the data stored in the entry corresponding to the specified row/column address, or for storing the signal received at its data input to that entry.

In the illustrated DRAM array, the L1 table DRAM includes Level1 entries that are referenced via application of a descriptor's set field to the row-address input and the index1 field to the column-address input. The L2 table DRAM includes Level2 entries that are referenced via application of the descriptor's concatenated set and index2 fields to the row-address input, and the L2Entry pointer (output by the L1 table) to the column-address input. The L3 table DRAM includes Level3 entries that are referenced via application of the descriptor's concatenated set, index3 and indexsp fields to the row-address input, and the L3Entry pointer (output by the L2 table) to the column-address input.

Figure 20:
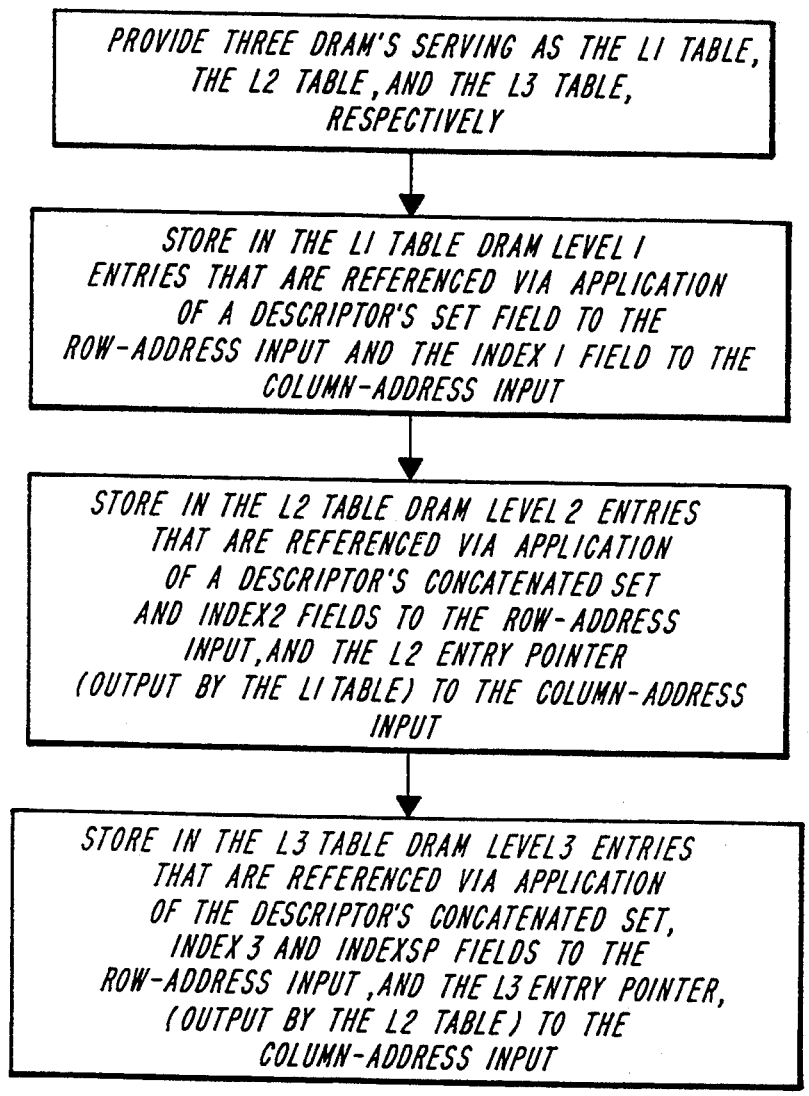

An illustration of a method for storing the aforementioned information in the DRAM array is provided in FIG. 20.

A routing directory configured in the manner shown in FIG. 9A is capable of accessing and updating (including allocating and deallocating) information relating to a descriptor in a fixed time period, which time period is dependent on the number of tables (i.e., three), but which is independent of both the degree of associativity of the directory and the value of the descriptor being accessed.

This may be understood with respect to an exemplarly look-up operation performed on a candidate descriptor received by the routing directory. For example, in timing interval #1, the descriptor set field is applied to the row-address input of the L1 table DRAM with RAS asserted. In timing interval #2, the index1 portion of that descriptor is applied to the column-address input of the L1 table DRAM with CAS asserted. At the same time (i.e., in interval #2), the concatentated descriptor set and index2 fields are applied to the row-address input of the L2 table DRAM with RAS asserted.

In timing interval #3, the L1 table DRAM outputs an L2 Entry pointer which is applied to the column-address input of the L2 table DRAM with CAS asserted. At the same time, the concatentated descriptor set, index3 and indexsp fields are applied to the row-address input of the L3 table DRAM with RAS asserted.

In timing interval #4, the L2 table DRAM outputs an L3 Entry pointer which is applied to the column-address input of L3 table DRAM with CAS asserted. Information relating to the descriptor is subsequently output, in timing interval #5, by the L3 table DRAM.

Figure 21:
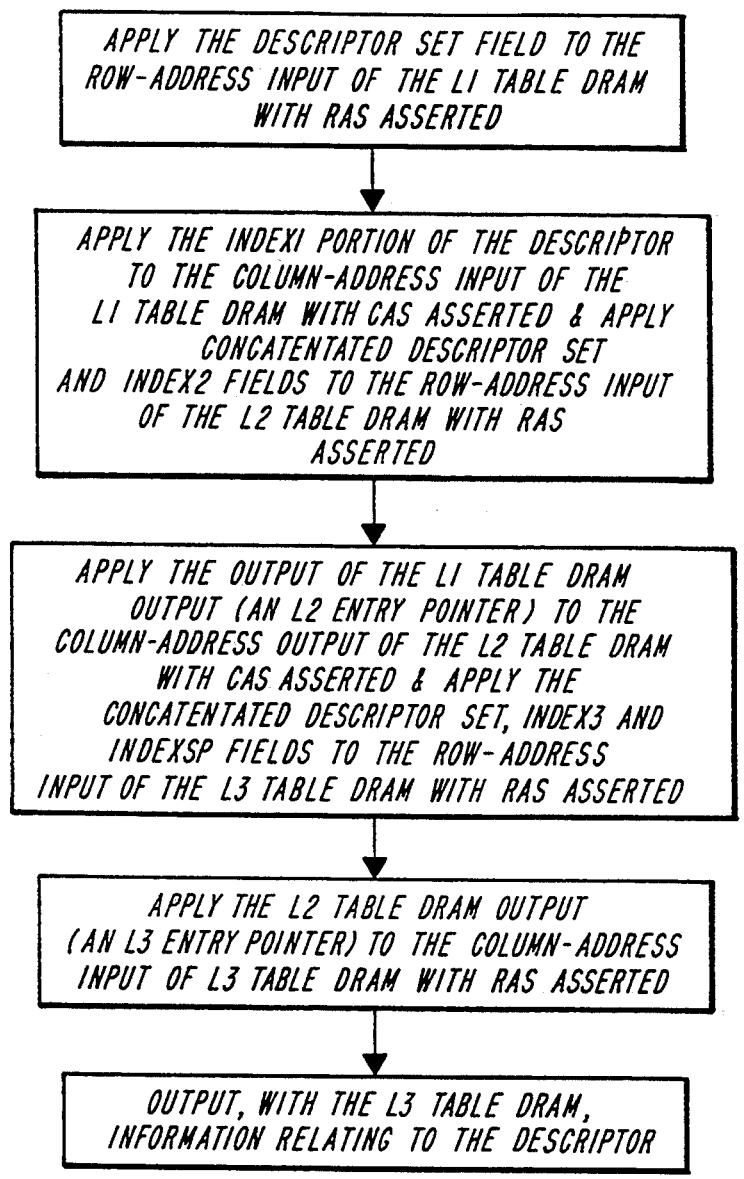

The aforementioned look-up operations are depicted in FIG. 21.

The illustrated routing directory can similarly perform rapid, fixed-interval updating operations on the directory contents by applying update information to the data inputs of the DRAM's, as necessary, during the look-up process.

SUMMARY

Those skilled in the art will appreciate that the embodiments described above are exemplary only, and that other apparatuses and methods—including modifications, additions and deletions—fall within the scope and spirit of the invention.

By way of example, it will be appreciated that the central processing unit and subcache included within the processing cells of the illustrated embodiment may be replaced by other logic circuitry capable of operating on, or in conjunction with, data allocated to those cells.

In view of the foregoing, what we claim is:

1. An associative memory for information-representative signals representative of information relating to a plurality of descriptors, each descriptor including a set portion and (n) other portions, where (n) is an integer greater than or equal to two, said associative memory having an associativity of two to the (q)th power, where (q) is an integer greater than or equal to one, said associative memory comprising A. input means for receiving a candidate descriptor,
  B. directory means for storing and accessing said information-representative signals, said directory means including:
    i. (n) table means including table means(n) for storing said information-representative signals and table means (j), where (j) where (j) represents successive integers between (1) and (n−1), inclusive, for storing pointer-representative signals, and
    ii. each said table means (j) including a plurality of entry means, each for storing a (q)-bit pointer-representative signal directed to at least one respective entry means of table means (j+1), said table means (n) including a plurality of entry means, each for storing an information-representative signal relating to at least one said descriptor, iii. each said entry means of table means (1) being accessible as a function of a common set portion and a common portion (1) of a plurality of descriptors with which that entry means is respectively associated, said table means (1) including memory means responsive to values of a common set portion and a common portion (1) of a candidate descriptor for accessing the entry means of table means (1) respectively associated with that candidate descriptor and for generating a pointer signal representative of the pointer stored therein, iv. each said entry means of table means (m), where (m) represents successive integers between (2) and (n), being accessible as a function of values of a common set and a common portion (m) of a plurality of descriptors with which such table means (m) entry means is respectively associated, and a value of a pointer signal of the respective table means (m−1) entry means with which such table means (m) entry means is respectively associated, each said table means (m) including memory means responsive to values of a common set and a common portion (m) of candidate descriptors with which such table means (m) entry means is respectively associated, as well as to a value of a pointer signal of the respective table means (m−1) entry means with which such table means (m) entry means is respectively associated, for accessing the entry means of table means (m) respectively associated with that candidate descriptor and for generating a signal representative of the information stored therein, C. look-up means connected to said input means and to said directory means for determining whether said directory means stores an information-representative signal relating to said candidate descriptor, and for generating a signal representative of that determination, and D. update means, coupled to said input means and to said look-up means and to said directory means, selectively responsive to a determination that an information-representative signal relating to said candidate descriptor is not stored in said directory means for updating at least one of said (n) table means to include a signal representative of said candidate descriptor.

2. An associative memory according to claim 1, wherein said directory means includes means for accessing an information-representative signal, if any, relating to said candidate descriptor in a time period that is dependent upon (n), and that is independent of (q), and that is independent of the value of any portion of that candidate descriptor.

3. An associative memory according to claim 2, wherein
   A. the memory means of table means (1) comprises a memory element including
      i) address input means for receiving signals representative of values of a set portion and a portion (1) of said candidate descriptor,
      ii) means responsive to that input signal for generating a signal representative of the pointer stored in the entry means of table means (1) entry means corresponding to those values,
      i) row-address input coupled to output means of table means (t-1) for receiving a pointer-representative signal output thereby,
      ii) a column-address input for receiving a signal representative of the value of a set portion and a portion(t) of said candidate descriptor,
      iii) means responsive to said signals received by said row-address input and said column-address input for generating an information-representative signal stored in the table means(t) entry means corresponding to the value represented thereby,
      iv) means for outputting that information-representative signal.

4. An associative memory according to any of claims 1 or 3, wherein
   A. said look-up means includes means responsive to a determination that said table means(n) stores an information-representative signal relating to said candidate descriptor for accessing that information-representative signal, and
   B. means for generating a signal representative of said accessed information-representative signal.

5. An associative memory according to any of claims 1 or 3, wherein at least one said table means (n) entry means comprises means for storing a sub-data signal representative of information relating to one or more descriptors having a common portion (n+1), if any, said sub-data signals being arranged for access as a function of
   i) the value of said set portion,
   ii) the value of the pointer-representative signal of the respective table means (n−1) entry means corresponding to that table means (n) entry means,
   iii) the value of the common (n) portion with which that table means (n) entry means is associated, and
   iv) the value of the common (n+1) portion, if any, with which that sub-data signal is associated.

6. An associative memory according to any of claims 1 or 3, wherein said look-up means includes means for determining whether table means (j), where (j) represents at least one integer between one and (n), includes an entry means associated with respective portions of said candidate descriptor.

7. An associative memory according to claim 6, wherein said look-up means includes means responsive to a determination that table means (k), where (k) represents at least one integer between one and (n−1), includes an entry means associated with a common set portion and with common other portions (p) of said candidate descriptor, where (p) represents successive integers between 1 and (k), inclusive, for generating a signal representative of the pointer-representative signal stored in that entry means.

8. An associative memory according to claim 6, wherein said look-up means includes means responsive to a determination that means (k), where (k) represents at least one integer between one and (n−1), does not include an entry means associated with a common set portion and with common other portions (p) of said candidate descriptor, where (p) represents successive integers between 1 and (k), inclusive, for generating a level (k) miss signal indicative of such determination.

9. An associative memory according to claim 8, wherein said directory means includes update means responsive to said level (k) miss signal for updating at least one of said (n) table means entry means to include an information-representative signal relating to said candidate descriptor.

10. An associative memory according to claim 9, comprising
A. free list means comprising physical storage space,
B. said update means including means responsive to said level (k) miss signal for allocating in said free list means physical storage space for one or more entry means for table means (k), where (k) represents at least one integer between 2 and (n), and
C. said update means further including means for generating signal representative of a pointer to that allocated physical storage space and storing that pointer-representative signal in a corresponding entry means of table means (k−1).

11. An associative memory according to claim 10, including deallocate means selectively responsive to a deallocated signal for deallocating an entry means of table means (k), where (k) represents a least one integer between 2 and (n).

12. An associative memory according to any of claims 1 or 3, wherein (n) is 3.

13. An associative memory according to claim 12 wherein each said descriptor includes a set portion, a first tag portion, a second tag portion, and a page portion, each said portion being an information signal representing a value, said (n) table means including:
A. an L1 table means including a plurality of L1 entry means for storing digital signals representative of pointers to respective L2 rentry means, said L1 entry means being associated with one or more of said descriptors having common set and first tag portions, said L1 entry means being arranged for access as a function of the values of those common set and first tag portions,
B. an L2 table means including a plurality of L2 entry means for storing digital signals representative of pointers to respective L3 entry means, said L2 entry means being associated with one or more of said descriptors having common set and second tag portions, each said L2 entry means being arranged for access as a function of
  i) value of a pointer-representative signal of the respective L1 entry means,
  ii) the value of the common set and second tag portions with which that L2 entry means is associated, and
C. an L3 table mans including a plurality of L3 entry means for storing signals representative of information relating to said one or more descriptors that have a common set and page portions, each said L3 entry means being arranged for access as a function of
  i. a value of a pointer-representative signal of the respective L2 entry means, and
  ii) the value of the common set and page portions with which that L2 entry means is associated.

14. An associative memory according to claim 13, wherein at least one said L3 entry means comprises means for storing a subpage signal representative of information relating to one or more descriptors that have common subpage portions, said subpage signals being arranged for access as a function of
  i) the value of the pointer-representative signal of the respective L2 entry means of that L3 entry means,
  ii) the value of the common set and page portions with which that L3 means is associated, and
  iii) the value of the common subpage portion with which that subpage signal is associated.

15. An associative memory according to claim 13, wherein said look-up means includes means for determining whether said L1 table means includes an L1 entry that corresponds to the set and first tag portions of said candidate descriptor and that includes a valid L2 pointer.

16. An associative memory according to claim 15, wherein said look-up means includes means responsive to a determination that said L1 table means includes an L1 entry means that corresponds to the set and first tag portions of said candidate descriptor that and that includes a valid entry pointer for generating a signal representative of that pointer.

17. An associative memory according to claim 16, wherein said look-up means includes means responsive to said L2 pointer-representative signal for determining whether said L2 table means includes an L2 entry corresponding to the set and second tag portions of said candidate descriptor.

18. An associative memory according to claim 17, wherein said look-up means includes means responsive to a determination that said L2 table means includes an L2 entry means corresponding to the set and second tag portions of said candidate descriptor for generating a signal representative of the L3 pointer stored in that entry means.

19. An associative memory according to claim 17, wherein said look-up means includes means responsive to a determination that said L2 table means does not include an L2 entry means corresponding an L2 miss signal.

20. An associative memory according to claim 19, including
A. means for allocating in said L3 table means an L3 means corresponding to said set and page portions of said candidate descriptor, and for storing in said L2 entry means corresponding to the set and second tag portion of said candidate descriptor a signal representative of a pointer to that L3 entry means, and
B. means for in said L3 entry means corresponding to said set and page portion said candidate descriptor at least default information relating to that descriptor.

21. An associative memory according to claim 17, wherein said look-up means includes means responsive to said L3 pointer-representative signal for identifying in said L3 table means an L3 entry means corresponding to said portion of said candidate descriptor, and for generating of said information stored in that entry means.

22. An associative memory according to claim 15, wherein said look-up means includes means responsive to a determination that said L1 table means does not include an L1 entry means corresponding to the set and first tag portions of said candidate descriptor and including a valid L2 entry pointer for generating an L1 miss signal.

23. An associative memory according to claim 22, comprising
A. free list means comprising physical storage space,
B. said directory means includes update means responsive to said L1 miss signals for updating said directory means, said update means including
  i) means for selectively allocating in said free list means physical storage space for an L2 entry means corresponding to the set and second tag portions of said candidate descriptor, and for storing in the L1 entry means corresponding to the set and first tag portions of said candidate descriptor a signal representative of a pointer to that L2 entry means, ii) means for selectively allocating in said free list means physical storage space for an L3 entry means corresponding to said set and page portions of said candidate descriptor, and for storing in the L2 entry means corresponding to the set and second tag portions of said candidate descriptor a signal representative of a pointer to that L3 entry means, and iii) means for storing in said L3 entry means corresponding to said set and page portions of said candidate descriptor information relating to that descriptor.

24. An associative memory according to claim 23, including deallocate means selectively responsive to a deallocate signal for deallocate signal for deallocating an entry means of at least one of said L2 table means and said L3 table means.

25. A method for storing and accessing information-representative signals representative of information relating to a plurality of descriptors, each descriptor including a set portion and (n) other portions, where (n) is an integer greater than or equal to two, said associative memory having an associativity of two to the (q)th power, where (q) is an integer greater than or equal to one, the method comprising A. inputting a candidate descriptor, B. providing a directory for storing and accessing said information-representative signals, said directory including:

i) (n) tables, including table (n) for storing said information-representative signals and tables (j), where (j) represents successive integers between (1) and (n−1), inclusive, for storing pointer-representative signals, and ii) each said table (j) including a plurality of entries, each for storing a (q) bit pointer-representative signal directed to at least one respective entry of table (j+1), said table (n) including a plurality of entries, each for storing an information-representative signal relating to at least one said descriptor, iii) each said entry of table (1) being accessible as a function of a common set portion and a common portion (1) of a plurality of descriptors with which that entry is respectively associated, said table means (1) including memory means responsive to values of a common set portion and a common portion (1) of a candidate descriptor for accessing the entry means of table means (1) respectively associated with that candidate descriptor and for generating a pointer signal representative of the pointer stored therein, iv) each said entry of table (m), where (m) represents successive integers between (2) and (n), being accessible as a function of values of a common set and a common portion (m) of a plurality of descriptors with which such table (m) entry is respectively associated, and a value of a pointer signal of the respective table (m−1) entry with which such table (m) entry is respectively associated, each said table means (m) including memory means responsive to values of a common set and a common portion (m) of candidate descriptors with which such table means (m) entry means is respectively associated, as well as to a value of a pointer signal of the respective table means (m−1) entry means with which such table means (m) entry means is respectively associated, for accessing the entry means of table means (m) respectively associated with that candidate descriptor and for generating a signal representative of the information stored therein, C. determining whether said director stores an information-representative signal relating to said candidate descriptor, and generating a signal representative of that determination, and D. responding to a determination that an information-representative signal relating to said candidate descriptor is not stored in said directory for updating at least one said (n) tables to include a signal representative of said candidate descriptor.

26. A method according to claim 25, comprising accessing an information-representative signal, if any, relating to said candidate descriptor in a timer period that is dependent upon (n), and that is independent of (q), and that is independent of the value of any of said portions of that candidate descriptor.

27. A method according to claim 26, comprising

A. providing, as the memory means of table (1), a memory element including i) address input means for receiving signals representative of values of a set portion and a portion (1) of a candidate descriptor, ii) means responsive to that input signal for generating a signal representative of the pointer stored in the entry of table (1) entry corresponding to those values, iii) means for outputting that pointer representative signal, B. providing, as the memory means of each said table (t), for (t) representing successive integers between (2) and (n), a memory element including i) a row-address input coupled to output means of table (t−1) for receiving a pointer-representative signal output thereby, ii) a column-address input for receiving a signal representative of the value of a set portion and a portion (t) of said candidate descriptor, iii) means responsive to said signals received by said row-address input and said column-address input for generating an information-representative signal stored in the table (t) entry corresponding to the value represented thereby, iv) means for outputting that information-representative signal.

28. A method according to any of claims 25 or 27, comprising

A. responding to a determination that said table (n) stores an information-representative signal relating to said candidate descriptor for accessing that information-representative signal, and B. generating a signal representative of that accessed information-representative signal.

29. A method according to any of claims 25 or 27, comprising

A. selectively storing in at least one of said table (n) entries a sub-data signal representative of information relating to one or more descriptors having a common portion (n+1), if any, and B. arranging said sub-data signals for access as a function of
   i) the value of said set portion,
   ii) the value of the pointer-representative signal of the respective table (n−1) entry corresponding to that table (n) entry,
   iii) the value of the common (n) portion with which that table (n) entry is associated, and
   iv) the value of the common (n+1) portion, if any, with which that sub-data signal is associated.

30. A method according to any claims 2 or 27, comprising determining whether table (j), where (j) represents at least one integer between one and (n), includes an entry associated with respective portions of said candidate descriptor.

31. A method according to claim 30, comprising responding to a determination that table (k), where (k) represents at least one integer between one and (n−1), includes an entry associated with a common set portion and with common other portions (p) of said candidate descriptor, where (p) represents successive integers between 1 and (k), inclusive, for generating a signal representative of the pointer-representative signal stored in that entry.

32. A method according to claim 30, comprising responding to a determination that table (k), where (k) represents at least one integer between one and (n−1), does not include an entry associated with a common set portion and with common other portions (p) of said candidate descriptor, where (p) represents successive integers between 1 and (k), inclusive, for generating a level (k) miss signal indicative of such determination.

33. A method according to claim 32, comprising responding to said level (k) miss signal for updating at least one of said (n) tables entries to include an information-representative signal relating to said candidate descriptor.

34. A method according to claim 33, comprising
A. providing free list means comprising physical storage space,
B. responding to said level (k) miss signal for allocating in said free list means physical storage space for one or more entries for table (k), where (k) represents at least one integer between 2 and (n), and
C. generating a signal representative of a pointer to that allocated physical storage space and storing that pointer-representative signal in a corresponding entry of table (k−1).

35. A method according to claim 34 including responding to a deallocate signal for deallocating an entry of table (k), where (k) represents at least one integer between 2 and (n)

36. A method according to any of claims 25 or 27, wherein (n) is 3.

37. A method according to claim 36, wherein each said descriptor includes a set portion, a first tag portion, a second tag portion, and a page portion, each said portion being a information signal representing a value, comprising
A.
   providing an L1 table including a plurality of L1 entries for storing digital signals representative of pointers to respective L2 entries, said L1 entry being associated with one or more of said descriptors having common set and first tag portions,
   arranging said L1 entries for access as function of the values of those common set and first tag portions,
B.
   providing an L2 table including a plurality of L2 entries for storing digital signals representative of pointers to respective L3 entries, said L2 entry being associated with one or more of said descriptors having common set and second tag portions,
   arranging said L2 entries for access as a function of
      i) a value of a pointer-representative signal of the respective L1 entry,
      ii) the value of the common set and second tag portions with which that L2 entry is associated, and
C. providing an L3 table including a plurality of L3 entries for storing signals representative of information relating to said one or more descriptors that have a common set and page portions, each said L3 entry being arranged for access as a function of
   i) a value of a pointer-representative signal of the respective L2 entry, and
   ii) the value of the common set and page portions with which that L2 entry is associated.

38. A method according to claim 37, comprising
A. Storing in at least one said L3 entries a subpage signal representative of information relating to one or more descriptors that have common subpage portions,
B. arranging said subpage signals for access as a function of
   i) the value of the pointer-representative signal of the respective L2 entry of that L3 entry,
   ii) the value of the common set and page portions with which that L3 means is associated, and
   iii) the value of the common subpage portion with which that subpage signal is associated.

39. A method according to claim 37 comprising determining whether said L1 table includes an L1 entry that corresponds to the set and first tag portions of said candidate descriptor and that includes a valid L2 pointer.

40. A method according to claim 39, comprising responding to a determination that said L1 table includes an L1 entry that corresponds to the set and first tag portions of said candidate descriptor that and that includes a valid entry pointer for generating a signal representative of that pointer.

41. A method according to claim 40, comprising responding to said L2 pointer-representative signal for determining whether said L2 table includes an L2 entry corresponding to the set and second tag portions of said candidate descriptor.

42. A method according to claim 41, comprising responding to a determination that said L2 table includes an L2 entry corresponding to the set and second tag portions of said candidate descriptor for generating a signal representative of the L3 pointer stored in that entry.

43. A method according to claim 41, comprising responding to a determination that said L2 table does not include an L2 entry corresponding to the set and second tag portions of said candidate descriptor for generating an L2 miss signal.

44. A method according to claim 43, comprising
A. allocating in said L3 table an L3 entry corresponding to said set and page portions of said candidate descriptor, and for storing in said L2 entry corresponding to the set and second tag portion of said candidate descriptor a signal representative of a pointer to that L3 entry, and B. storing in said L3 entry corresponding to said set and page portion of said candidate descriptor at least default information relating to that descriptor.

45. A method according to claim 41, comprising responding to said L3 pointer-representative signal for identifying in said L3 table an L3 entry corresponding to said portion of said candidate descriptor, and for generating of said information stored in that entry.

46. A method according to claim 39, comprising responding to a determination that said L1 table does not include an L1 entry corresponding to the set and first tag portions of said candidate descriptor and including a valid L2 entry pointer for generating an L1 miss signal.

47. A method according to claim 46, comprising

A. providing free list means comprising physical storage space,

B. responding to said L1 miss signal for updating said director, said responding step including
  i) selectively allocating in said free list means physical storage space for an L2 entry corresponding to the set and second tag portions of said candidate descriptor, and for storing in the L1 entry corresponding to the set and first tag portions of said candidate descriptor a signal representative of a pointer to that L2 entry,
  ii) selectively allocating in said free list means physical storage space for an L3 entry corresponding to said set and page portions of said candidate descriptor, and for storing in the L2 entry corresponding to the set and second tag portions of said candidate descriptor a signal representative of a pointer to that L3 entry, and
  iii) storing in said L3 entry corresponding to said set and page portions of said candidate descriptor information relating to that descriptor.

48. A method according to claim 47, selectively responding to a deallocate signal for deallocating an entry of at least one of said L2 table and said L3 table.

* * * * *